United States Patent [19]
Minowa et al.

[11] Patent Number: 5,792,021
[45] Date of Patent: Aug. 11, 1998

[54] AXLE TORQUE ESTIMATING SYSTEM FOR A VEHICLE EQUIPPED WITH AN AUTOMATIC TRANSMISSION SYSTEM, AND AXLE TORQUE CONTROLLING SYSTEM

[75] Inventors: Toshimichi Minowa, Ibaraki-ken; Hiroshi Kimura; Junich Ishii, both of Katsuta; Takashi Shiraishi, Ibaraki-ken; Naoyuki Ozaki, Katsuta, all of Japan

[73] Assignee: Hitachi, Ltd., Japan

[21] Appl. No.: 661,558

[22] Filed: Jun. 11, 1996

Related U.S. Application Data

[63] Continuation of Ser. No. 120,552, Sep. 14, 1993, Pat. No. 5,573,476.

[30] Foreign Application Priority Data

Sep. 16, 1992 [JP] Japan ................... 4-246720
Nov. 17, 1992 [JP] Japan ................... 4-307169

[51] Int. Cl.[6] .................................................. B60K 41/02
[52] U.S. Cl. ................... 477/107; 477/109; 477/110; 477/156
[58] Field of Search ................... 477/109, 110, 477/111, 156, 107

[56] References Cited

U.S. PATENT DOCUMENTS

| | | | |
|---|---|---|---|
| 4,350,058 | 9/1982 | Miller | 477/154 |
| 4,353,272 | 10/1982 | Schneider et al. | 477/110 X |
| 4,813,307 | 3/1989 | Hiramatsu et al. | 477/131 |
| 4,933,851 | 6/1990 | Ito et al. | 477/109 X |
| 5,046,383 | 9/1991 | Butts et al. | 477/120 |
| 5,060,541 | 10/1991 | Shimanaka | 477/154 X |
| 5,086,670 | 2/1992 | Nitz et al. | 477/143 X |
| 5,094,125 | 3/1992 | Bota | 477/109 X |
| 5,152,192 | 10/1992 | Koenig et al. | 477/120 |
| 5,239,895 | 8/1993 | Kroger | 477/109 |
| 5,292,288 | 3/1994 | Kashiwabara et al. | 477/156 X |
| 5,303,614 | 4/1994 | Sasaki et al. | 477/158 |
| 5,325,740 | 7/1994 | Zhang et al. | 477/110 |
| 5,335,568 | 8/1994 | Kammerl et al. | 477/109 |
| 5,407,401 | 4/1995 | Bullmer et al. | 477/109 X |
| 5,429,561 | 7/1995 | Wakahara et al. | 477/156 |
| 5,468,196 | 11/1995 | Minowa et al. | 477/110 X |
| 5,476,425 | 12/1995 | Shiraishi et al. | 477/109 |
| 5,613,920 | 3/1997 | Uno et al. | 477/109 |

FOREIGN PATENT DOCUMENTS

| | | |
|---|---|---|
| 0 330 408 | 8/1989 | European Pat. Off. |
| 0 529 138 | 8/1991 | European Pat. Off. |

(List continued on next page.)

OTHER PUBLICATIONS

U.S. Patent Application No. 07/859,987, filed on Mar. 30, 1992.
Control Technology of Electronically-Controlled Automatic Transmissions with Feedback Control; Automotive Technology, vol. 42, No. 8, 1988, pp. 1004–1011.

*Primary Examiner*—Khoi Q. Ta
*Attorney, Agent, or Firm*—Evenson, McKeown, Edwards & Lenahan, P.L.L.C.

[57] ABSTRACT

A controller (100 in FIG. 1) for relieving a gear shift shock in a vehicle, comprising an input torque calculation portion (131) which calculates the input torque ($T_t$) of the stepped automatic transmission mechanism of the vehicle from engine r.p.m. ($N_e$) and turbine r.p.m. ($N_t$), a shift start recognition portion (134) which recognizes the real mechanical shift start timing of the stepped automatic transmission mechanism in accordance with the change of the input torque ($T_t$), a line-pressure correction magnitude calculation portion (142) which calculates a line-pressure correction magnitude ($\Delta PL$) during the gear shift operation of the stepped automatic transmission mechanism when the shift start has been recognized, a standard line pressure calculation portion (143) which calculates a standard line pressure (PL), and a command line pressure calculation portion (144) which adds the line-pressure correction magnitude ($\Delta PL$) to the standard line pressure (PL) and which delivers the resulting sum to a valve (52) for controlling the oil pressure of the hydraulic circuit of the stepped automatic transmission mechanism.

23 Claims, 39 Drawing Sheets

FOREIGN PATENT DOCUMENTS

| | | |
|---|---|---|
| 0 512 726 | 11/1992 | European Pat. Off. . |
| 0 554 892 | 8/1993 | European Pat. Off. . |
| 2 074 100 | 1/1971 | France . |
| 38 21 245 | 1/1989 | Germany . |
| 4110366 | 10/1991 | Germany ............................ 477/109 |
| 41 12 413 | 11/1991 | Germany . |
| 41 15 821 | 11/1991 | Germany . |
| 42 10 416 | 12/1992 | Germany . |
| 63-254256 | 10/1988 | Japan . |
| 63-263248 | 10/1988 | Japan . |
| 64-4544 | 1/1989 | Japan . |
| 402121561 | 5/1990 | Japan ..................... 477/158 |
| 4-265431 | 9/1992 | Japan . |
| 4-308333 | 10/1992 | Japan . |
| 405087227 | 4/1993 | Japan ..................... 477/109 |
| 405099305 | 4/1993 | Japan ..................... 477/109 |

F I G. 21
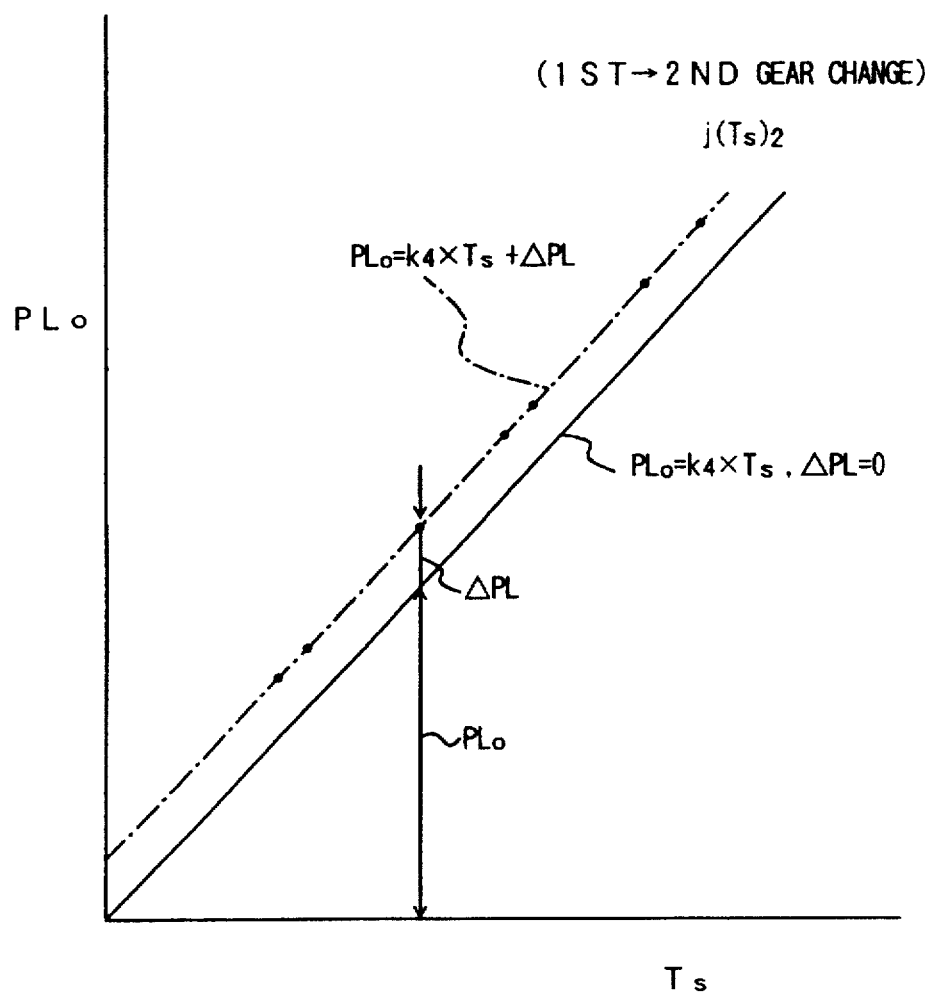

AXLE TORQUE ESTIMATING SYSTEM FOR A VEHICLE EQUIPPED WITH AN AUTOMATIC TRANSMISSION SYSTEM, AND AXLE TORQUE CONTROLLING SYSTEM

This is a continuation of application Ser. No. 08/120,552, filed Sep. 14, 1993, now U.S. Pat. No. 5,573,476.

BACKGROUND OF THE INVENTION

1. Field of the Invention

The present invention relates to a control system for a vehicle equipped with an automatic transmission system which is constructed having a torque converter and a stepped automatic transmission mechanism. More particularly, it relates to a control system which relieves gear shift shock in the gear shift operation of such an automatic transmission system.

2. Description of the Related Art

By way of example, a prior-art control system of the type specified above is disclosed in the official gazette of Japanese Patent Application Laid-open No. 263248/1988. The control system is furnished with a timer in order to control the pressure of working oil which is supplied to the gear shift clutch of a stepped automatic transmission mechanism under the gear shift operation thereof. Thus, when a predetermined time period has lapsed since the generation of a gear shift signal, this control system subjects the oil pressure to a correction control on the assumption that the transmission mechanism has actually started the shift operation.

Other examples intended to relieve the gear shift shock of a transmission mechanism are disclosed in the official gazettes of Japanese Patent Applications Laid-open No. 254256/1988 and No. 4544/1989. In the former control system, when the revolution speed or r.p.m. (revolutions per minute) of the input shaft of the transmission mechanism has reached a predetermined r.p.m. value, the output of an engine is subjected to a correction control on the assumption that the transmission mechanism has actually started its shift operation. In the latter control system, the point of time at which the shift operation of the transmission mechanism has actually been started is determined on the basis of a change gear ratio which is the ratio between the r.p.m. values of the input shaft and output shaft of the transmission mechanism, whereupon the output of an engine is subjected to a correction control.

With the control system of Japanese Patent Application Laid-open No. 263248/1988, however, in a case where at least one of the r.p.m. of an engine, the running load of a vehicle, etc. has changed during the gear shift operation, a time period from the generation of the shift signal to the actual start of a mechanical gear shift or the duration of the shift operation changes. Therefore, the timing of the oil pressure correction control in the shift operation deviates, and the shock of the shift operation cannot be sufficiently reduced.

It is unsatisfactory to try to recognize the start of the shift operation on the basis of the change gear ratio of the transmission mechanism as in the control system of Japanese Patent Application Laid-open No. 4544/1989. More specifically, as illustrated in FIG. 9, the change of the change gear ratio is not readily discernible in the vicinity of a time $t_1$ at which the transmission mechanism actually starts its mechanical gear shift, and the shift start is this much later (at a time corresponding to a point A). Likewise, in the control system of Japanese Patent Application Laid-open No. 254256/1988, the change of the r.p.m. of the input shaft of the transmission mechanism is not clearly apparent in the vicinity of the time $t_1$, and the shift start is recognized much later.

As stated above, none of the prior-art techniques can precisely determine the time at which the transmission mechanism actually starts the gear shift. Therefore, the oil pressure control or engine output control of the transmission mechanism cannot be performed at an appropriate timing, so the shift shock cannot be sufficiently reduced.

SUMMARY OF THE INVENTION

It is therefore an object of the present invention to provide a driving force control system for a vehicle in which the time of the actual shift start of a speed change gear is precisely determined, and the oil pressure correction control, the engine output correction control or the like of the speed change gear is performed at an appropriate timing, so that the shock of a gear shift can be reduced.

One embodiment of the driving force control system; of the present invention, comprises signal output means for generating a shift signal which indicates a gear shift position of a stepped automatic transmission mechanism; means for determining a shift start recognition parameter; based on predetermined vehicle operating parameters (selected from a plurality of vehicle operating parameters such as, input torque of the stepped automatic transmission mechanism, output torque of the stepped automatic transmission mechanism, rate of change of engine r.p.m., rate of change of torque-converter output shaft r.p.m., rate of change of r.p.m. of an output shaft of the stepped automatic transmission mechanism, acceleration of the vehicle, or an oil line pressure in a hydraulic circuit); shift start recognition means for recognizing an actual mechanical shift start timing of the stepped automatic transmission mechanism in response to a change in the value of the shift start recognition parameter when on the shift signal delivered from the shift signal output means has changed; means for calculating a value for a gear shifting; manipulated variable for diminishing variation of axle torque during the gear shift operation of the stepped automatic transmission mechanism; and means for delivering the calculated gear shifting manipulated variable to an axle torque control means after the recognized shift start timing.

Practicable examples of the axle torque control means include a line pressure control valve which controls the oil line pressure of the hydraulic circuit for actuating the stepped automatic transmission mechanism, a throttle valve which regulates a flow rate of air into the engine, a fuel injection valve which feeds fuel into the engine, and an ignition device which ignites the fuel in the engine at an appropriate timing.

The driving force control system according to the invention; preferably also comprises means for determining a shift ending recognition parameter; based on predetermined vehicle operating parameters (selected from a plurality of vehicle operating parameters such as, r.p.m. ratio of the torque converter, rate of change of the r.p.m. ratio, and a change gear ratio of the stepped automatic transmission mechanism) and shift ending recognition means for identifying a shift ending time; which precedes the ending at actual mechanical shifting of the stepped automatic transmission mechanism, based on a change of the shift ending recognition parameter.

In operation, the input torque of the stepped automatic transmission mechanism is proportional to the square of the engine r.p.m. and therefore changes considerably at the start of a gear shift operation. Similarly, since the acceleration of the vehicle is obtained by dividing the torque by the weight of the vehicle, the effective radius of each tyre, etc., it also changes considerably at the start of the gear shift operation. Likewise, the output torque of the stepped automatic transmission mechanism, the rate of change of the engine r.p.m., the rate of change of the r.p.m. of the torque-converter output shaft (turbine), and the rate of change of the r.p.m. of the output shaft of the stepped automatic transmission mechanism all change considerably during the gear shift operation. Therefore, if any of these parameters is measured, the time of the shift start can be determined precisely by detecting a; change of the parameter. Further, since the line pressure of the hydraulic circuit for driving and controlling the automatic transmission mechanism changes before the shift start of this mechanism, the time of the shift start also be recognized without delay measuring the line pressure.

In the present invention, therefore, the input or output torque of the stepped automatic transmission mechanism, the acceleration of the vehicle, the line pressure of the hydraulic circuit, or the like is measured (or calculated), and the timing of a shift start is recognized in response to a change of the measured or calculated value.

The gear shifting manipulated variable calculation means calculates the gear shifting manipulated variable that is provided to the; the axle torque control device, for example, the throttle valve, the fuel injection valve, the ignition device, or the oil pressure solenoid of the hydraulic circuit or noted previously. By way of example, in one embodiment of the invention the manipulated variable is calculated on the basis of the deviation between the actual axle torque and a target axle torque, the latter being set so as to prevent a torque change that is so sudden that it can be felt as a gear shift shock. The manipulated variable thus obtained is delivered to the axle torque manipulation means after the determined shift start timing.

Accordingly, correction control of the axle torque can be performed at the appropriate timing, and the shift shock can be relieved.

BRIEF DESCRIPTION OF THE DRAWINGS

FIG. 21 is a diagram for explaining the learning correction of the line pressure setting function in the second embodiment of the present invention;

PREFERRED EMBODIMENTS OF THE INVENTION

Various embodiments according to the present invention will be described below in conjunction with the accompanying drawings.

The first embodiment of the present invention will be described with reference to FIGS. 1~10.

Figure 2:
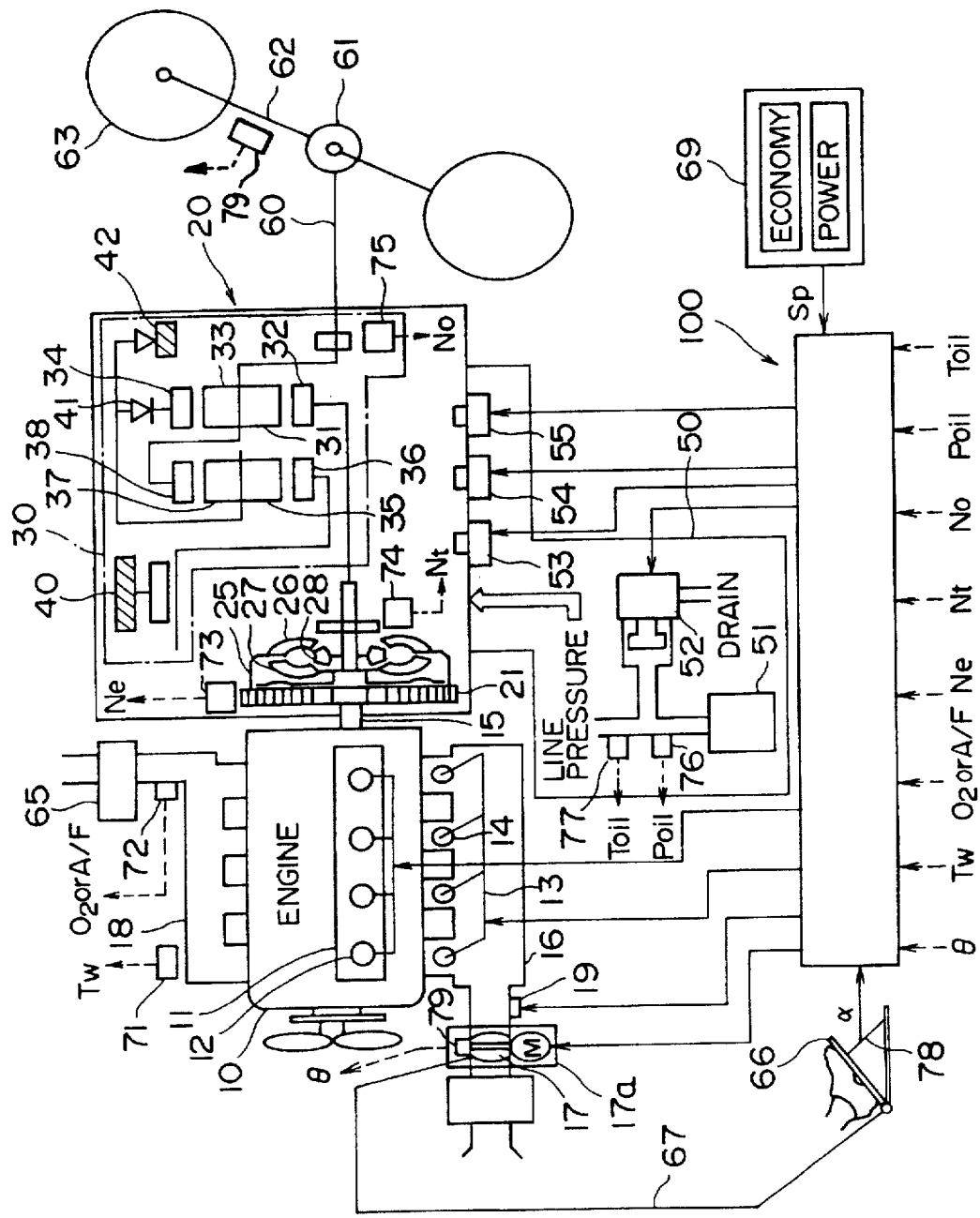
FIG. 2 is an explanatory diagram showing the construction of an engine as well as an automatic transmission system and their associated components in the first embodiment of the present invention.

FIG. 2 shows the schematic construction of the engine and automatic transmission system of a vehicle along with their associated components.

The engine 10 is a four-cylinder engine in this embodiment. It is provided with an ignition device 11. The ignition device 11 has four ignition plugs 12 in correspondence with the number of cylinders of the engine 10. An intake pipe 16 for drawing air into the cylinders of the engine 10 is furnished with a throttle valve 17 by which the flow rate of the air to pass through the intake pipe 16 is regulated, a fuel injection device 13 which injects fuel, and an ISC (Idle Speed Control) valve 19 by which the flow rate of the air to be fed into the engine 10 during the idling of this engine is controlled. The throttle valve 17 is connected with an accelerator pedal 66 by a wire 67 in order that the valve opening thereof may change substantially linearly relative to the manipulated variable of the accelerator pedal 66. Attached to the accelerator pedal 66 is an accelerator opening sensor 78 which measures the opening $\alpha$ of this accelerator pedal. The fuel injection device 13 has four fuel injection valves 14 in correspondence with the number of cylinders of the engine 10. A radiator (not shown) for cooling the engine 10 is furnished with a water temperature sensor 71 which measures the temperature $T_w$ of cooling water contained in this radiator. An exhaust pipe 18 for emitting exhaust gas from the engine 10 into the open air is furnished with a catalyzer 65 and an air-fuel ratio sensor (or an $O_2$ sensor) 72 for measuring an air-fuel ratio A/F (or an oxygen percentage $O_2$)A A flywheel 21 is mounted on the crankshaft 15 of the engine 10. Attached to the flywheel 21 is an engine r. p. m. sensor 73 which detects the revolution speed or r. p. m. of the crankshaft 15, in other words, that of the engine 10 (engine r. p. m. $N_e$). The flywheel 21 is directly connected with the pump 26 of a torque converter 25. Herein, the torque converter 25 is configured of the pump 26, a turbine 27 and a stator 28. The output shaft of the turbine 27, namely, that of the torque converter 25 is directly connected with a stepped automatic transmission mechanism 30. A turbine r. p. m. sensor 74 for measuring the revolution speed or r. p. m. of the turbine 27 (turbine r. p. m. $N_t$) is attached to the output shaft of the torque converter 25. The stepped automatic transmission mechanism 30 includes planetary gear mechanisms 31, 35, a band brake 40, and clutches 41, 42. The plurality of planetary gear mechanisms 31, 35 are disposed in correspondence with the number of gear shift stages. These planetary gear mechanisms 31, 35 are respectively configured of sun gears 32, 36 which are located centrally of the corresponding mechanisms; planetary gears 33, 37 which revolve round the corresponding sun gears 32, 36; and internal gears 34, 38 which are formed with teeth on the inner circumferential sides thereof and with which the corresponding planetary gears 33, 37 mesh. In FIG. 2, for the brevity of illustration, only the two planetary gear mechanisms 31 and 35 are depicted as corresponding to the first speed and second speed of the automobile. The output shaft of the torque converter 25 is directly connected with the sun gear 32 of the rear planetary gear mechanism 31. The planetary gear 33 of the rear planetary gear mechanism 31 is directly connected with a propeller shaft 60, and the internal gear 38 of the front planetary gear mechanism 35. Both the internal gear 34 of the rear planetary gear mechanism 31 and the planetary gear 37 of the front planetary gear mechanism 35 have their rotations regulated by a forward one-way clutch 41. In addition, the planetary gear 37 of the front planetary gear mechanism 35 has its rotation regulated by a low one-way clutch 42. The band brake 40 can be applied to the rotary shaft of the sun gear 36 of the front planetary gear mechanism 35. Owing to the operations of the band brake 40, forward one-way clutch 41 and low one-way clutch 42, the rotations of the various gears are regulated to realize the first speed, second speed, reverse etc. of the vehicle. A vehicle speed sensor 75 is mounted on the output shaft of the stepped automatic transmission mechanism 30, namely, the propeller shaft 60 in order to measure the revolution speed or r. p. m. $N_o$ of this shaft ($N_o \propto V$ denoting the speed of the vehicle). The propeller shaft 60 is connected with rear wheels 63 through a differential 61 as well as a rear-wheel driving axle 62. The stepped automatic transmission mechanism 30 is equipped with a hydraulic control circuit 50 which actuates the band brake 40, forward one-way clutch 41 and low one-way clutch 42, and the actuation of which makes it possible to perform a transmission control, a lockup control, a line pressure control, an engine braking control, etc. The hydraulic control circuit 50 is provided with a hydraulic pump 51, and also elements for the aforementioned controls. The elements include a line pressure control valve 52 which adjusts the pressures of hydraulic lines, a lockup control valve 53 which serves to perform the lockup control, and transmission control valves 54 and 55 which change-over the plurality of hydraulic lines, thereby causing the band brake 40 etc. to switch the operations. Further, the hydraulic control circuit 50 is provided with a line pressure sensor 76 for measuring the line pressure (denoted by symbol $P_{oil}$), and an oil temperature sensor 77 for measuring the temperature (denoted by symbol $T_{oil}$) of oil contained in the hydraulic line. The automatic transmission system 26 in this embodiment is constructed having the torque converter 25, the stepped automatic transmission mechanism 30 and the hydraulic control circuit 50 as explained above.

The hydraulic control circuit 50 is controlled by a controller or control unit 100. The controller 100 is supplied with the cooling water temperature $T_w$, air-fuel ratio A/F, engine r. p. m. $N_e$, turbine (torque-converter output shaft) r. p. m. $N_t$, transmission output shaft r. p. m. $N_o$ ($\propto$ the vehicle speed V), oil pressure $P_{oil}$, oil temperature $T_{oil}$ and accelerator pedal opening $\alpha$ from the water temperature sensor 71, air-fuel ratio sensor 72, engine r. p. m. sensor 73, turbine r. p. m. sensor (torque-converter output shaft r. p. m. sensor) 74, vehicle speed sensor (transmission output shaft r. p. m. sensor) 75, oil pressure sensor 76, oil temperature sensor 77 and accelerator pedal opening sensor 78, respectively. Thus, the control unit 100 calculates the optimum gear shift position, line pressure, etc. on the basis of the supplied signals and delivers control signals to the actuators of the transmission control valves 54, 55, line pressure control valve 52, etc.

It should be noted that; in an engine provided with a device which is capable of controlling the quantity of air independently of the manipulated variable of the accelerator pedal 66 (for example, an electronic throttle valve 17a which is not mechanically linked with the accelerator pedal 66), a throttle valve opening sensor 79 is mounted for measuring the opening θ of the electronic throttle valve 17a. The signal θ from the sensor 79 is also input to the controller 100. In addition, the controller 100 is supplied with a signal $S_p$ from a mode switch 69 which changes-over an economy mode and a power mode. The mode switch 69 is mounted on or near a console panel so as to be readily manipulated by the driver of the vehicle. Here, the economy mode is a mode in which the transmission system is upshifted while the vehicle speed V is low. On the other hand, the power mode is a mode in which the transmission system is upshifted after the vehicle speed V has become somewhat higher.

Figure 1:
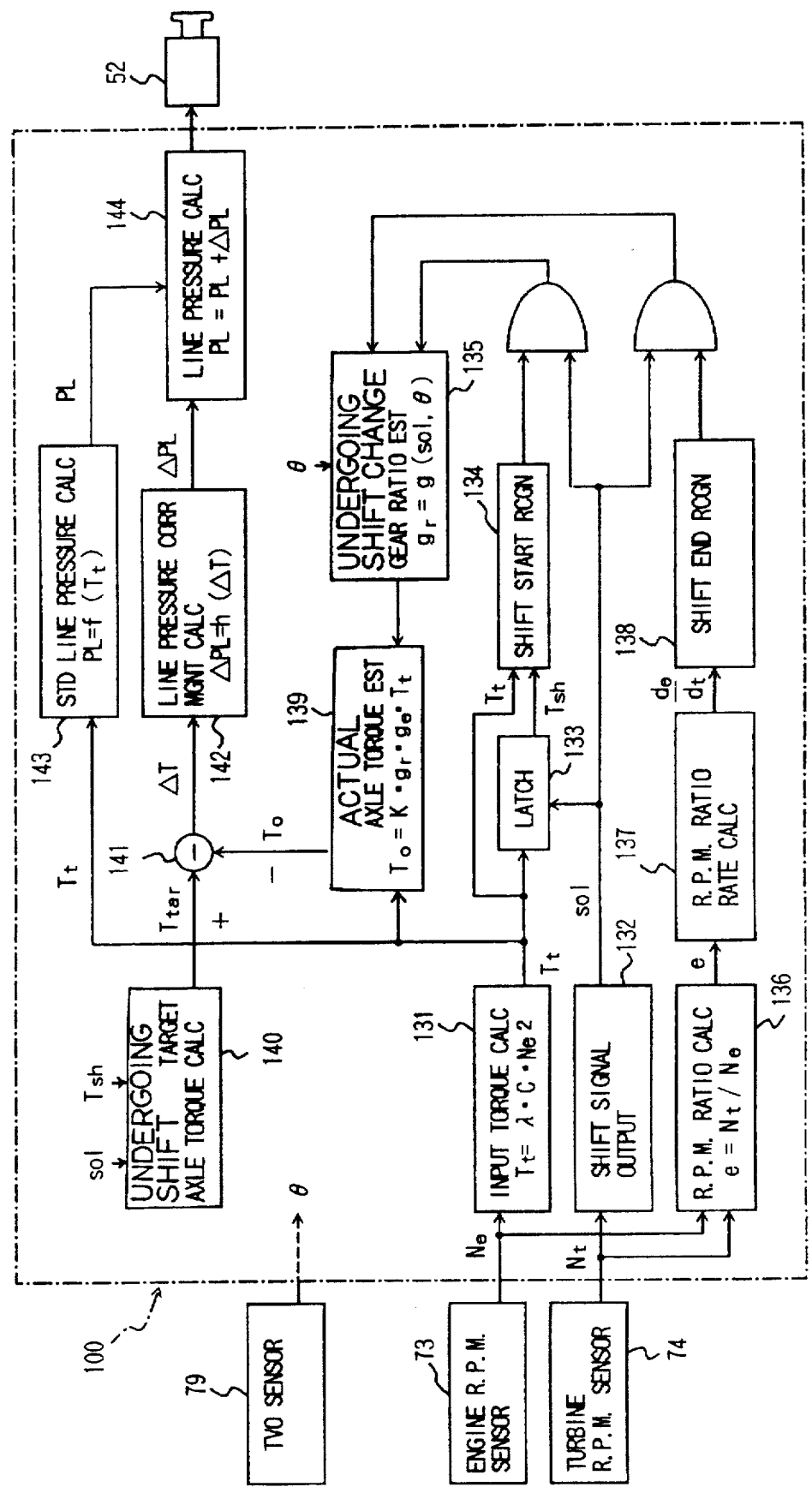
FIG. 1 is a functional block diagram of a controller in the first embodiment of the present invention.

As shown in FIG. 1, the controller 100 includes an input torque calculation portion 131 in which torque converter characteristics are stored and which calculates the input torque (turbine torque) $T_t$ of the stepped transmission mechanism 30 from the engine r.p.m. $N_e$ and the turbine r.p.m. $N_t$ by the use of the torque converter characteristics; a shift signal output portion 132 which determines a gear shift point in accordance with the speed V of the vehicle and the manipulated variable α of the accelerator pedal 66 and which delivers a shift signal sol; a latch 133 in which the input torque $T_t$ calculated by the input torque calculation portion 131 is temporarily held in accordance with the change of the shift signal sol; a shift start recognition portion 134 which recognizes the actual start of the gear shift of the stepped transmission mechanism 30 in accordance with the changes of the latched input torque $T_t$ ($T_{sh}$) and the input torque $T_t$ subsequently calculated; a gear shifting change gear ratio estimation portion 135 which estimates a change gear ratio $g_r$ during the gear shift operation, from a change gear ratio indicated by the shift signal sol and the throttle valve opening θ and in conformity with a predetermined function $g_r=g(sol, θ)$; an r.p.m. ratio calculation portion 136 which calculates the r.p.m. ratio e of the torque converter 25; an r.p.m. ratio rate calculation portion 137 which calculates the rate of change de/dt of the r.p.m. ratio e of the torque converter 25; a shift end recognition portion 138 by which a time somewhat earlier than an actual shift end time is recognized as a shift end from the rate of change de/dt of the r.p.m. ratio e; an actual axle torque estimation portion 139 which calculates an axle torque (a torque acting on the driving axle 62) $T_o$ during the gear shift operation, from the change gear ratio $g_r$ during the gear shift operation, the gear ratio (final gear ratio) of the differential 61 and the input torque $T_t$ during the gear shift operation; a target axle torque calculation portion 140 which calculates a target axle torque $T_{tar}$ during the gear shift operation, in conformity with a function (Eq. 2, below) prepared beforehand; a subtracter 141 which evaluates the deviation ΔT between the calculated actual axle torque $T_o$ and the target axle torque $T_{tar}$; a line pressure correction magnitude calculation portion 142 which calculates a correctional line pressure ΔPL from the torque deviation ΔT; a standard line pressure calculation portion 143 which calculates an ordinary line pressure PL from the input torque $T_t$; and a line-pressure calculation portion 144 which adds the ordinary line pressure PL and the correction magnitude ΔPL and then delivers the resulting sum to the solenoid of the line pressure control valve 52 as the line pressure PL.

Figure 3:
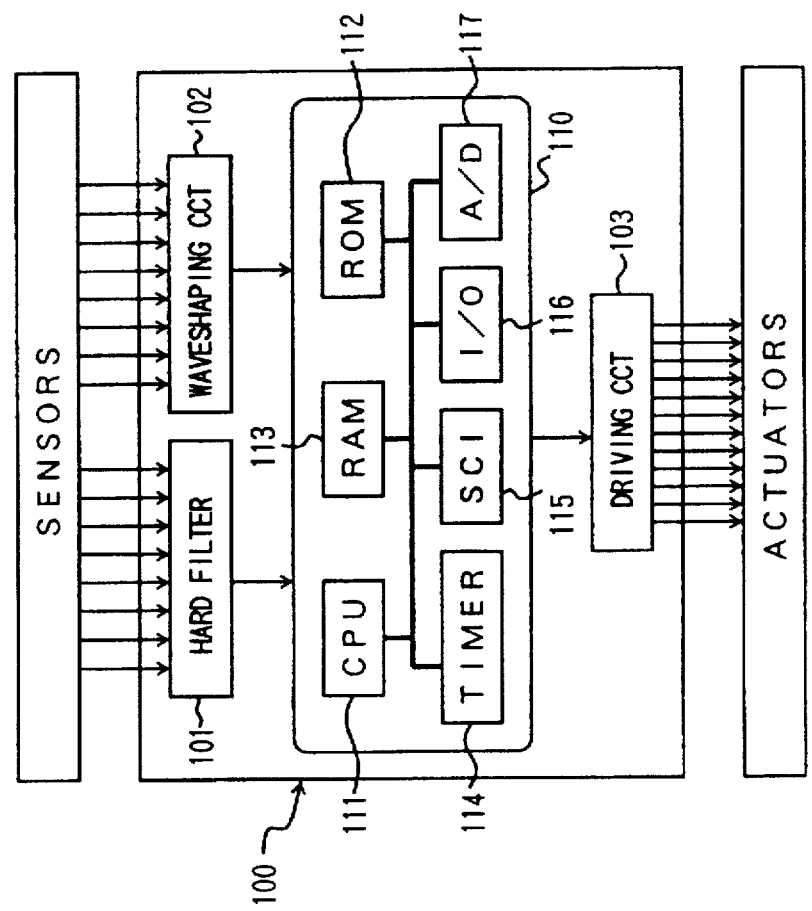
FIG. 3 is a circuit block diagram of the controller in the first embodiment of the present invention.

It should be noted that FIG. 1 depicts the functional construction of the controller 100, that is, the software architecture thereof. Hardware-wise, as shown in FIG. 3, the controller 100 is constructed having a filter 101 and a waveshaping circuit $10_2$ which receive signals from various sensors, a single-chip microcomputer 110, and a driving circuit 103 which delivers drive control signals to various actuators such as valves. The microcomputer 110 includes a CPU (Central Processing Unit) 111 which executes various calculations, a ROM (Read-Only Memory) 112 in which programs etc. for the processing of the CPU 111 are stored, a RAM (Random Access Memory, 113 in which various data etc. are temporarily stored, a timer 114, a SCI (Serial Communication Interface) circuit 115, an I/O (Input/Output) circuit 116, and an A/D (Analog-to-Digital) converter 117. Thus, the various functions of the controller 100 are fulfilled in such a way that the CPU 111 executes the predetermined calculations by the use of the programs, data etc. which are stored in the ROM 112 and the RAM 113.

Figure 4:
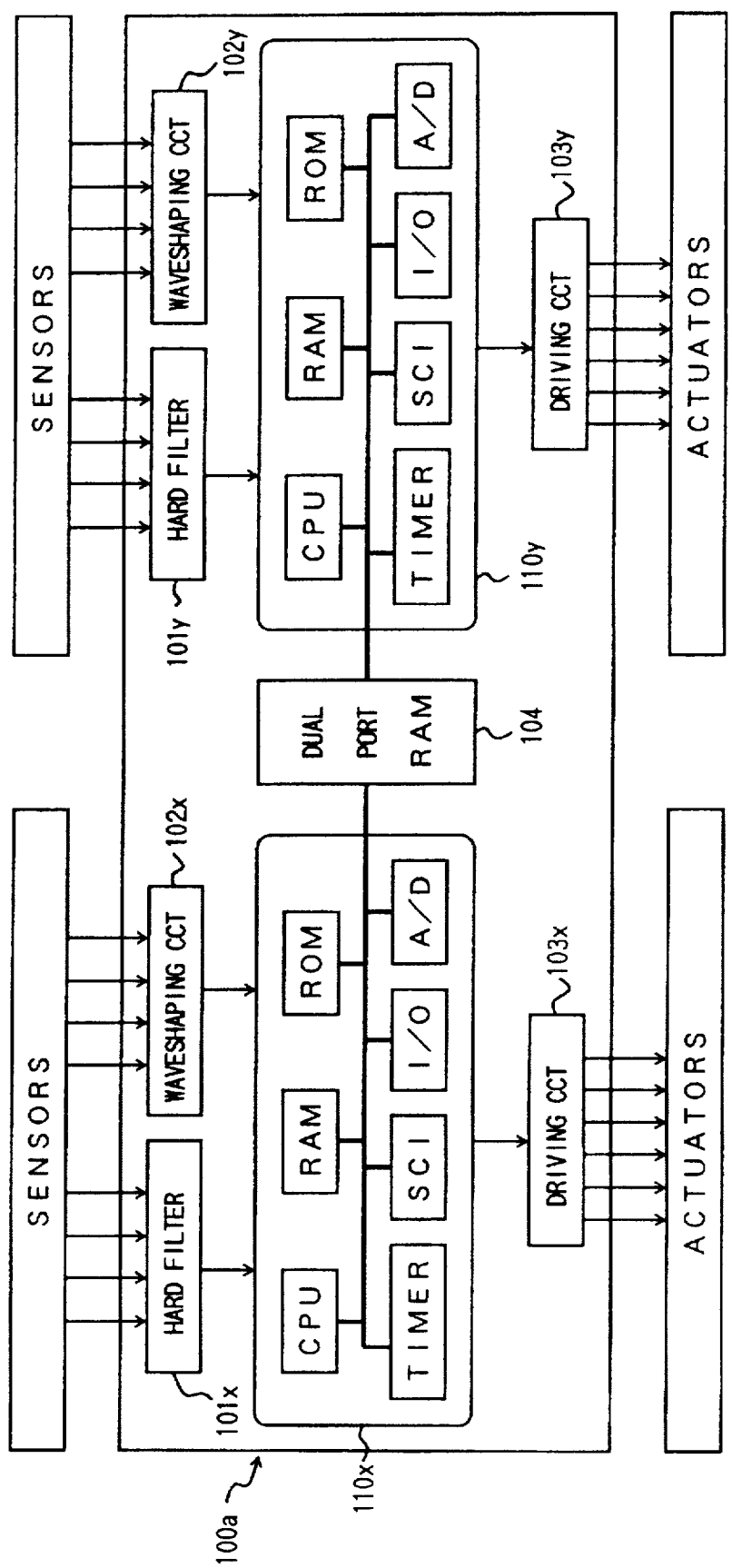
FIG. 4 is a circuit block diagram of a controller in a modification to the first embodiment of the present invention.

The above controller 100 including one single-chip microcomputer 110 is not exclusive. As shown in FIG. 4 by way of example, a controller 100a may well include a single-chip microcomputer 110x for controlling the speed change gear and a single-chip microcomputer 110y for controlling the engine. In this case, the controller 100a should preferably include two filters 101x and 101y, waveshaping circuits 102x and 102y, driving circuits 103x and 103y, etc. for the speed change gear control and for the engine control, respectively. The speed change gear controlling microcomputer 10x and the engine controlling microcomputer 110y are interconnected through a dual port RAM 104.

Figure 5:
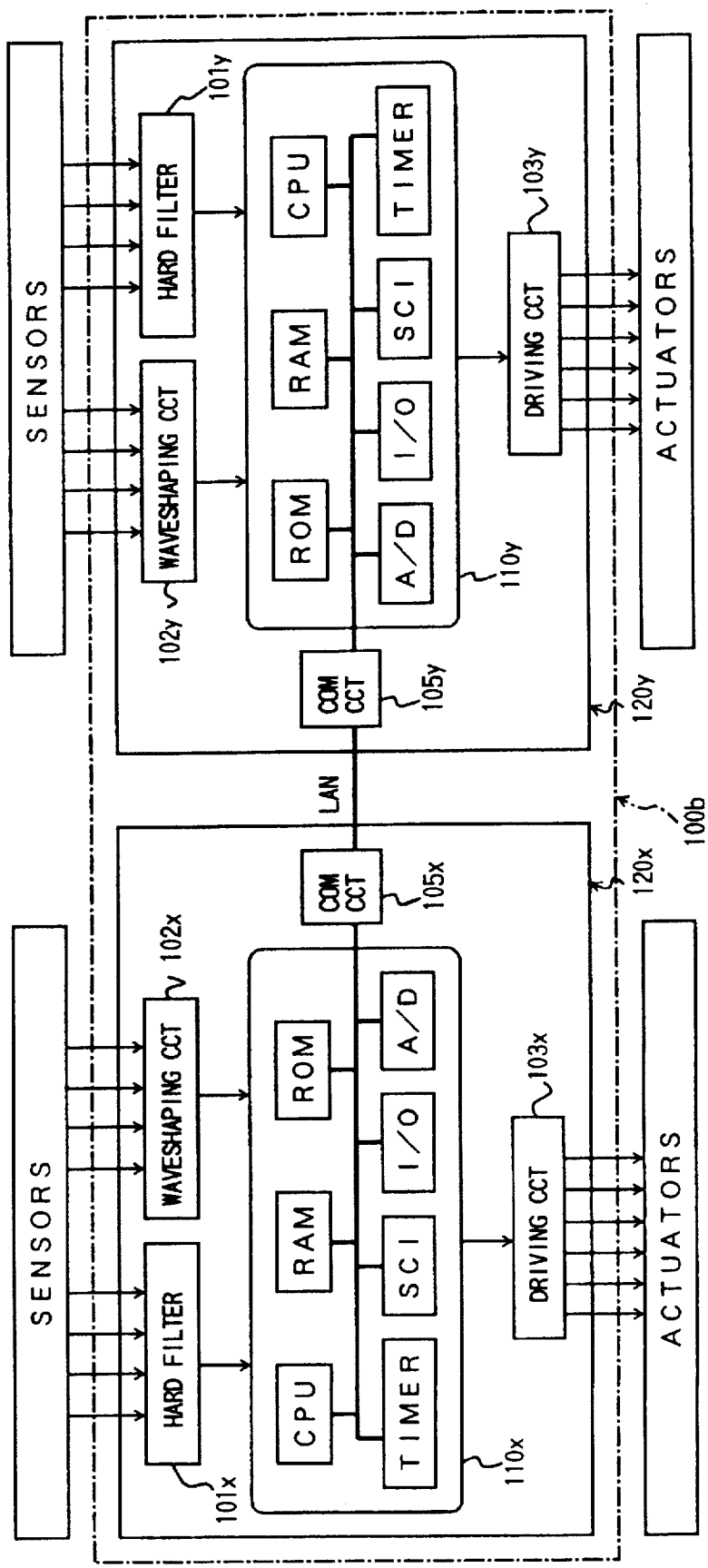
FIG. 5 is a circuit block diagram of a controller in another modification to the first embodiment of the present invention.

As shown in FIG. 5, a controller 100b may well be configured of two units 120x and 120y which are completely independent of each other for the engine control and for the speed change gear control. In this case, the respective units 120x and 120y include hard filters 101x and 101y, waveshaping filters 102x and 102y, driving circuits 103x and 103y, single-chip microcomputers 110x and 110y, and communication circuits 105x and 105y.

In the embodiment of FIG. 1, the shift signal output means (referred to previously) is constituted by the shift signal output portion; 132. The means for determining a; "shift start recognition parameter" is constituted by the engine r.p.m. sensor 73, turbine r.p.m. sensor 74 and input torque calculation portion 131, while the means for determining a shift ending; parameter grasp the engine r.p.m. sensor 73, turbine r.p.m. sensor 74, r.p.m. ratio calculation portion 136 and r.p.m. ratio rate calculation portion 137. In, addition, the shift start recognition means, is provided by the shift start recognition portion 134 and an AND circuit which performs a logical AND function between the output from the shift start recognition portion 134 and the shift signal sol from the shift signal output portion 132, while "shift end recognition means" is made up of the shift end recognition portion 138 and an AND circuit which performs a logical AND function between the output from the shift end recognition portion 138 and the shift signal sol from the shift signal output portion 132. Finally, the means for calculating a value for a gear shifting manipulated variable is provided by the line pressure correction magnitude calculation portion 142, standard line pressure calculation portion 143 and command line pressure calculation portion 144.

Now, the operation of the controller 100 in this embodiment will be described.

Figure 6:
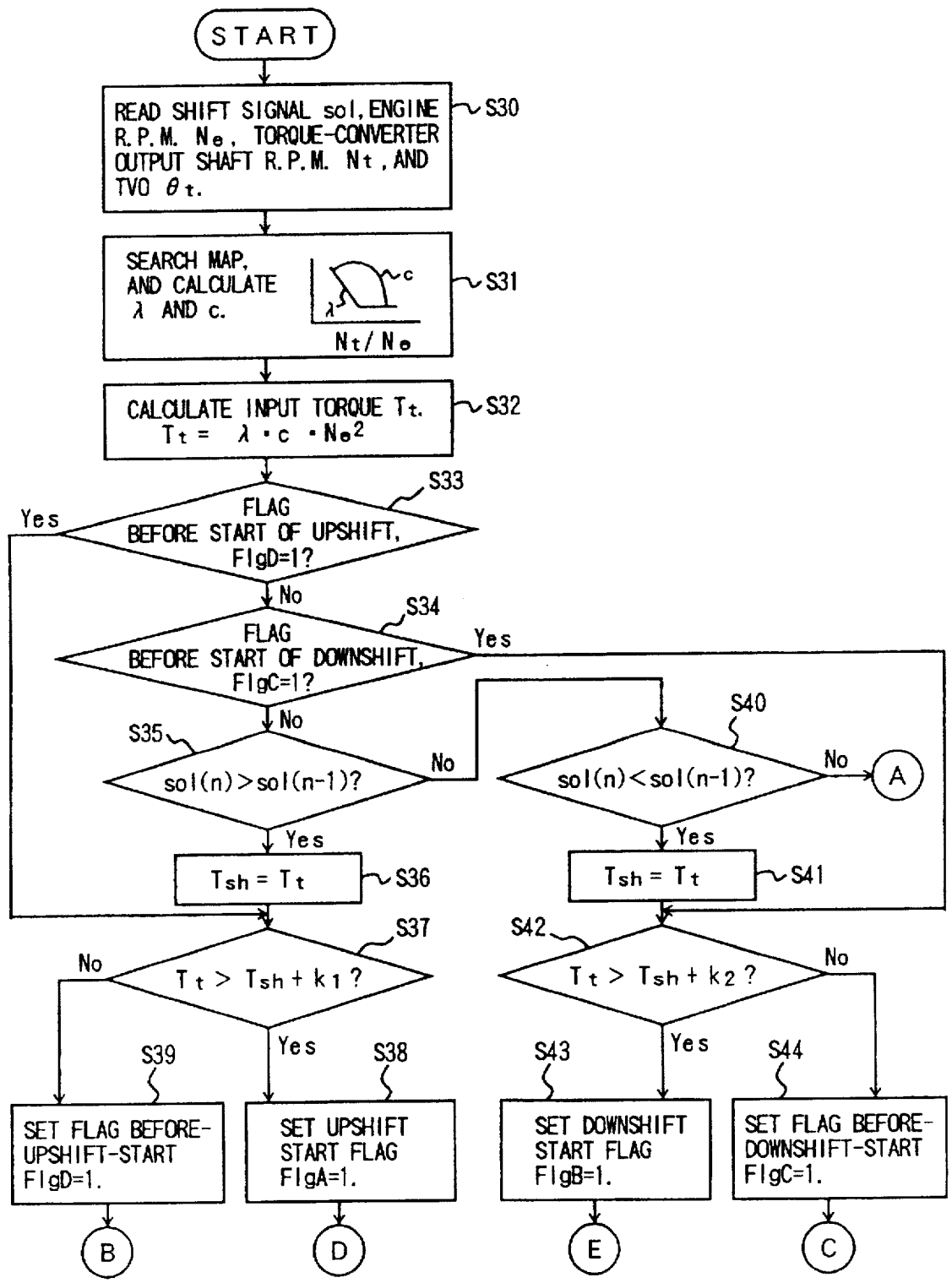
FIGS. 6 and 7 are flow charts showing shift start recognition steps in the first embodiment of the present invention.

First, the recognition of the start of the gear shift operation will be explained in conjunction with flow charts shown in FIGS. 6 and 7.

At a step S30, the corresponding portions of the controller 100 read the shift signal sol, engine r.p.m. $N_e$, torque-converter output shaft (turbine) r.p.m. $N_t$ and throttle valve opening θ. At a step S31, a torque ratio λ and a capacity coefficient c which correspond to the ratio e ($=N_t/N_e$) between the r.p.m. values of the input and output shafts of the torque converter 25 are evaluated using the torque converter characteristics. At a step S32, the input torque (=torque-converter output shaft torque=turbine torque) $T_t$ of the stepped automatic transmission mechanism 30 is calculated using (Eq. 1). The steps S31 and S32 are executed by the input torque calculation portion 131.

$$T_t = \lambda \cdot c \cdot N_e^2 \qquad \text{(Eq. 1)}$$

Whether or not a "before the start of upshift" flag, FlgD is "1" is determined (FlgD=1 before the upshift is started) at a step S33. When the flag FlgD is "1", the step S33 is followed by a step S37. In contrast, when the flag FlgD is not "1", the step S33 is followed by a step S34, at which whether or not a "before the start of downshift" flag, FlgC is "1" is determined (FlgC=1 before the downshift is started). When the flag FlgC is "1", the step S34 is followed by a step S42. In contrast, when the flag FlgC is not "1", the step S34 is followed by a step S35. Here at the step S35, the controller 100 decides if the current shift signal sol(n) is greater than the last shift signal sol (n−1). In a case where the current shift signal sol (n) is greater, the upshift is decided, and the routine proceeds to a step S36. At the step S36, the current input torque $T_t$ is stored as the signal $T_{sh}$ (in the latch 133). At the subsequent step S37, the shift start recognition portion 134 decides whether or not the input torque $T_t$ calculated anew is greater than an upshift start level ($T_{sh}+k_1$) which is obtained by adding a predetermined value $k_1$ to the latched input torque $T_{sh}$. When the new input torque $T_t$ is greater, it is decided that the stepped automatic transmission mechanism 30 has actually started the upshift, and an upshift start flag FlgA is set to "1" at a step S38. In contrast, when the new input torque $T_t$ is not greater than the shift start level ($T_{sh}+k_1$), the routine proceeds to a step S39, at which the flag FlgD before the upshift start is set to "1". Meanwhile, in a case where the current shift signal sol(n) is not greater than the last shift signal sol(n−1) at the step S35, the routine proceeds to a step S40, at which the shift start recognition portion 134 decides whether or not the current shift signal sol(n) is smaller than the last shift signal sol (n−1). If the current shift signal sol(n) is smaller, the downshift is decided, and the routine proceeds to a step S41. At the step S41, the current input torque $T_t$ is stored as the signal $T_{sh}$ (in the latch 133). At the subsequent step S42, the shift start recognition portion 134 decides whether or not the input torque $T_t$ calculated anew is greater than a downshift start level ($T_{sh}+k_2$) which is obtained by adding a predetermined value $k_2$ to the latched input torque $T_{sh}$. When the new input torque $T_t$ is greater, it is decided that the stepped automatic transmission mechanism 30 has actually started the downshift, and a downshift start flag FlgB is set to "1" at a step S43. In contrast, when the new input torque $T_t$ is not greater than the downshift start level ($T_{sh}+k_2$), the routine proceeds to a step S44, at which the flag FlgC before the downshift start is set to "1".

Figure 7:
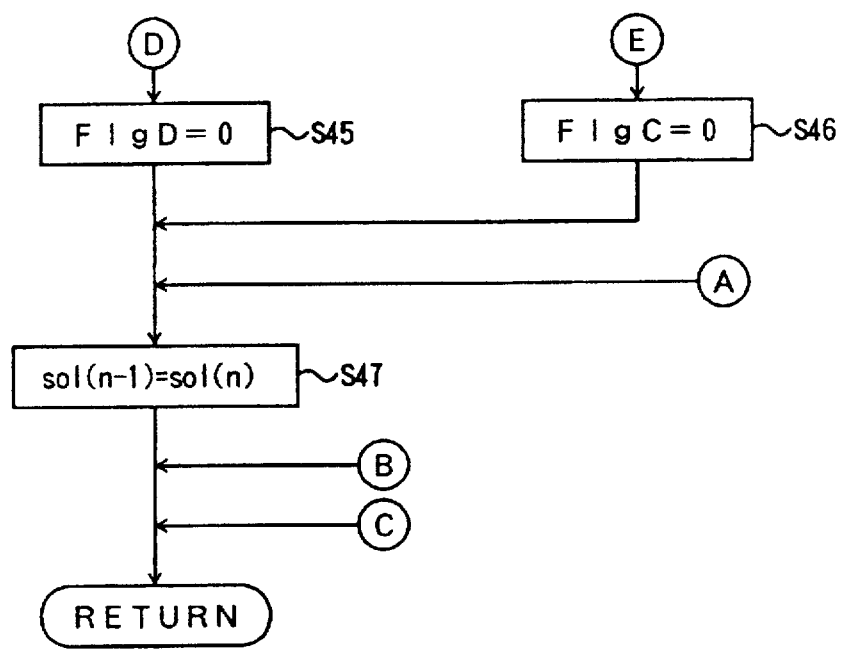

The subsequent flow of the routine is shown in FIG. 7. In the case Ⓓ (after the upshift start flag FlgA has been set to "1" at the step S38), the flag FlgD before the upshift start is set to "0" at a step S45, which is followed by a step S47. In the case Ⓔ (after the downshift start flag FlgB has been set to "1" at the step S43), the flag FlgC before the downshift start is set to "0" at a step S46, which is also followed by the step S47. Here at the step S47, the last shift signal sol (n−1) is set to the current shift signal sol (n). Thereafter, the routine returns. Further, in the case Ⓐ (on condition that the current shift signal sol(n) is not smaller at the step S40), the routine proceeds to the step S47. In both cases Ⓑ and Ⓒ (after the flag FlgD before the upshift start and the flag FlgC before the downshift start have been set to "1", respectively), the routine returns.

Figure 8:
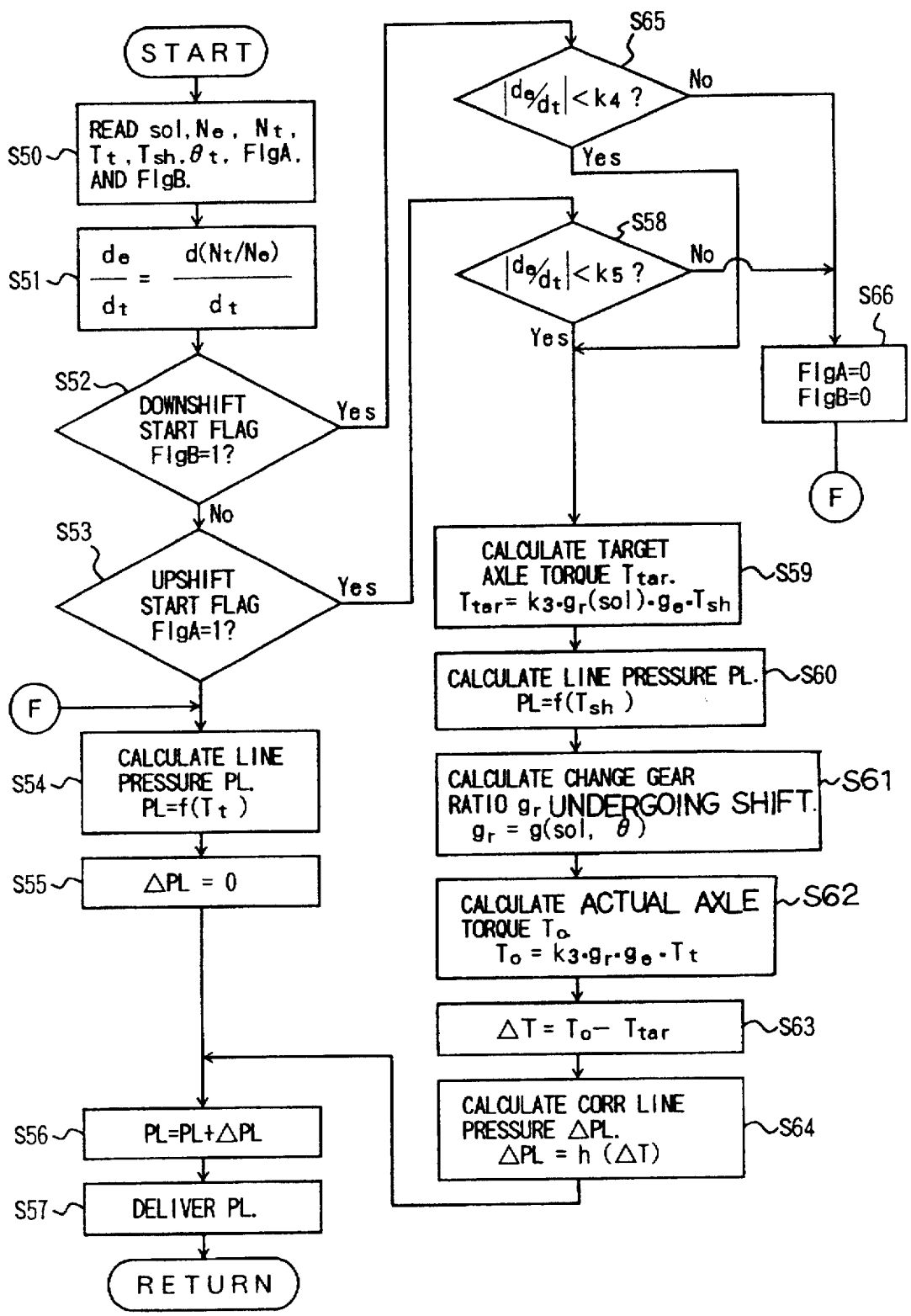
FIG. 8 is a flow chart showing control steps during a gear shift operation in the first embodiment of the present invention.

Next, the control of the controller 100 after the recognition of the shift start will be explained in conjunction with a flow chart shown in FIG. 8.

At a step S50, the corresponding portions of the controller 100 read the shift signal sol, engine r.p.m. $N_e$, torque-converter output shaft (turbine) r.p.m. $N_t$, input torque $T_t$, input torque $T_{sh}$ stored at the delivery of the shift signal sol, throttle valve opening θ, upshift start flag FlgA and downshift start flag FlgB. Subsequently, the r.p.m. ratio rate calculation portion 137 calculates the differential value de/dt of the r.p.m. ratio e ($=N_t/N_e$) at a step S51. Besides, whether or not the downshift start flag FlgB is "1" is decided at a step S52, and whether or not the upshift start flag FlgA is "1" is decided at a step S53. In a case where neither of the flags FlgB and FlgA is "1", the gear shift has not actually started. At a step S54, therefore, the standard line pressure calculation portion 143 calculates the line pressure PL of the hydraulic control circuit 50 in conformity with a predetermined function $f(T_t)$ of the input torque $T_t$. Further, the correctional line pressure ΔPL is set to "0" at a step S55. Thereafter, the line pressure calculation portion 144 calculates the value PL=PL+ΔPL at a step S56, and it delivers the duty value of the line pressure to the solenoid of the line pressure control valve 52 as an output at a step S57.

In a case where the upshift start flag FlgA is "1" at the step S53, that is, where it is decided that the upshift has been started, the routine proceeds to a step S58. Here at the step S58, in order to recognize the end of the gear shift, the shift end recognition portion 138 decides if the rate of change |de/dt| of the r.p.m. ratio e is smaller than a constant $k_5$. When this rate of change |de/dt| is smaller, it is decided that the transmission mechanism 30 is still undergoing the gear shift, and the routine proceeds to a step S59. Then, the target axle torque calculation portion 140 calculates the undergoing shift target axle torque $T_{tar}$ in conformity with (Eq. 2):

$$T_{tar} = k_3 \cdot g_r(sol) \cdot g_e \cdot T_{sh} \qquad \text{(Eq. 2)}$$

Here, symbol $k_3$ denotes a constant, symbol $g_r$(sol) denotes a function which is determined depending upon the change gear ratio given by the shift signal sol, and symbol $g_e$ denotes the gear ratio of the differential 61.

At a step S60, the standard line pressure calculation portion 143 calculates the line pressure PL in conformity with a function f ($T_{sh}$) of the input torque $T_{sh}$ stored at the change of the shift signal sol. Subsequently, at a step S61, the undergoing shift change gear ratio estimation portion 135 evaluates the change gear ratio $g_r$ during the gear shift in conformity with the function $g_r$=g(sol, θ) prepared beforehand, and at a step S62, the actual axle torque estimation portion 139 calculates the actual axle torque $T_o$ during the gear shift in conformity with (Eq. 3):

$$T_o = k_3 \cdot g_r \cdot g_e \cdot T_t \qquad \text{(Eq. 3)}$$

At a step S63, the subtracter 141 evaluates the difference ΔT ($=T_o-T_{tar}$) between the target axle torque $T_{tar}$ and the actual axle torque $T_o$. Subsequently, the line pressure correction magnitude calculation portion 142 calculates the correctional line pressure ΔPL in conformity with a function ΔPL=h(ΔT) of the difference ΔT at a step S64, which is followed by the step S56.

In a case where the downshift start flag FlgB is "1" at the step S52, that is, where it is decided that the downshift has been started, the routine proceeds to a step S65. Here at the step S65, in order to recognize the end of the gear shift, the shift end recognition portion 138 decides whether or not the rate of change |de/dt| of the r.p.m. ratio e is smaller than a constant $k_4$. When this rate of change |de/dt| is smaller, it is decided that the transmission mechanism 30 is still undergoing the gear shift, and the routine proceeds to the step S59 stated before.

On the other hand, in both a case where the rate of change |de/dt| of the r.p.m. ratio e is not smaller than the constant $k_5$ at the step S58 and a case where the rate of change |de/dt| of the r.p.m. ratio e is not smaller than the constant $k_4$ at the step S65, it is decided that the gear shift has ended. Then, the routine proceeds to a step S66, at which the upshift start flag FlgA and downshift start flag FlgB are set to "0" and which is followed by the step S54 as indicated by (F).

Next, the effects of this embodiment in the upshift operation will be explained in conjunction with a time chart shown in FIG. 9. As stated in connection with the prior art, when it is intended to recognize the start of the gear shift on the basis of the change of the change gear ratio, the change gear ratio changes only slightly at the shift start, and the shift start A is recognized considerably later than the point of time $t_1$ at which the mechanical gear shift is actually started. Even when it is intended to recognize the shift start on the basis of the change of the r.p.m. of the input shaft of the speed change gear, the shift start is similarly recognized considerably later than the point of time $t_1$ of the actual mechanical shift start though it is not illustrated in the figure.

Meanwhile, the input torque (turbine torque) $T_t$ is proportional to the square $N_e^2$ of the engine r.p.m. $N_e$ as indicated by (Eq. 1), and the variation thereof at the time of the shift start enlarges. Therefore, the time of the shift start can be recognized early and reliably by recognizing the mechanical shift start on the basis of the change of the input torque $T_t$ as in this embodiment (the shift start is recognized at a point of time $t_2$).

Accordingly, even in the case where the line pressure during the gear shift is corrected as in this embodiment, the correction can be made somewhat early, and the reduction of the shift shock can be attained.

The gear shifting line pressure correction is calculated to lower the line pressure during the gear shift. In consequence, the input torque $T_t$ diminishes, and the variation of the output torque $T_o$ decreases, so that the shift shock is relieved. It should be noted that in this regard that since the line pressure is corrected so as to lower in this embodiment, the magnitude of slip in the stepped automatic transmission mechanism 30 enlarges. Accordingly, the point of time $t_3$ at which the end of the gear shift is recognized and the point of time $t_4$ at which the gear shift is actually completed become later than in the prior art.

Next, the effects of this embodiment in the downshift operation will be explained in conjunction with a time chart shown in FIG. 10.

The downshift operation is performed in the process in which the accelerator pedal 66 is depressed to abruptly enlarge the throttle valve opening θ. As shown in the figure, therefore, the shift signal sol changes after the lapse of a certain time period from when the throttle valve opening θ begins to enlarge. The input torque $T_t$ increases with the enlargement of the throttle valve opening θ, and it exhibits first peak value in the vicinity of an actual shift start time $t_1$.

Thereafter, it decreases till an actual shift end time $t_4$. After the actual shift end time $t_4$, the input torque $T_t$ increases and overshoots until it becomes stable. In addition, the output torque $T_o$ changes similarly to the input torque $T_t$. The output torque $T_o$, however, changes more abruptly than the input torque $T_t$ due to the torque amplifying action of the stepped automatic transmission mechanism 30.

When the shift start time $t_2$ of the downshift operation is recognized based on the change of the input torque $T_t$ as in this embodiment, it is recognized earlier than the actual shift start time $t_1$ unlike that of the upshift operation. Such recognition of the shift start time $t_2$ earlier than the actual shift start time $t_1$ is effective in the case of controlling the output torque $T_o$, on the ground that the output torque $T_o$ begins to increase before the actual shift start time $t_1$. When the shift start time $t_2$ has been recognized, the line pressure correction is performed. This line pressure correction is made so that the line pressure may lower. In the case of the downshift, the lowering of the line pressure quickens the operation of engaging or disengaging the clutch of the stepped transmission mechanism 30. Therefore, the actual shift start time $t_1$ and the actual shift end time $t_4$ become earlier than respectively corresponding times $(t_1)$ and $(t_4)$ in the absence of the line pressure correction, and the time period of the downshift shortens. Moreover, the depression of the output torque $T_o$ at the shift end time $t_4$ is smaller compared with that at the shift end time $(t_4)$, so that the shift shock is reduced, though slightly.

Figure 11:
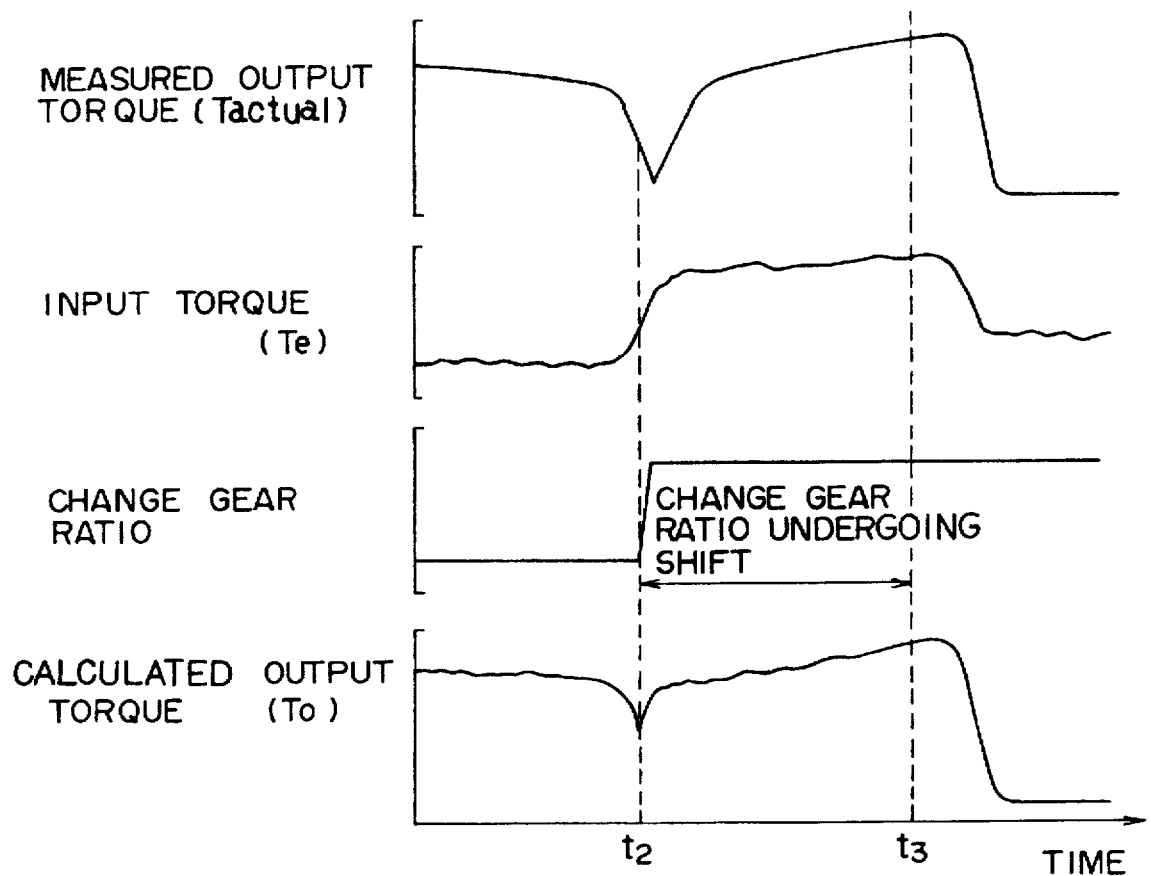
FIG. 11 is a diagram for explaining an estimated change gear ratio during a gear shift operation in an embodiment of the present invention.

By the way, in the above embodiment, the change gear ratio $g_r$ during the gear shift operation is obtained by substituting the shift signal sol and throttle valve opening θ into the function $g_r$=g(sol, θ). As shown in FIG. 11, however, the gear shifting change gear ratio $g_r$ may well be approximated so as to abruptly rise along a mere straight line of fixed gradient from a change gear ratio level before the gear shift, up to a change gear ratio level after the gear shift, at the same time as the recognition of the shift start time $t_2$. Alternatively, it may well be approximated so as to rise in steps. Even when the undergoing shift change gear ratio $g_r$ is set in this manner, the output torque $T_o$ estimated using this change gear ratio $g_r$ does not differ greatly from an actual output torque $T_{actual}$ as seen from FIG. 11, so that the controllability of the shift shock is not affected. Moreover, since the gear shifting change gear ratio $g_r$ need not be calculated with the function $g_r$=g(sol, θ), the load of the controller 100 can be lightened.

A modification to the first embodiment will be described in conjunction with a flow chart shown in FIG. 12.

Certain types of automatic transmission systems are furnished with an economy mode in which the upshift is effected while the vehicle speed is low, and a power mode in which the upshift is effected when the vehicle speed has risen to some extent, in spite of an identical throttle valve opening. This modification is directed toward an automatic transmission system which is furnished with such economy and power modes. It consists in altering the processing content of the step S50 in FIG. 8 illustrative of the control operation flow of the first embodiment, and in adding a step S59a. The other steps are the same as in the first embodiment, and shall be omitted from the description.

Figure 12:
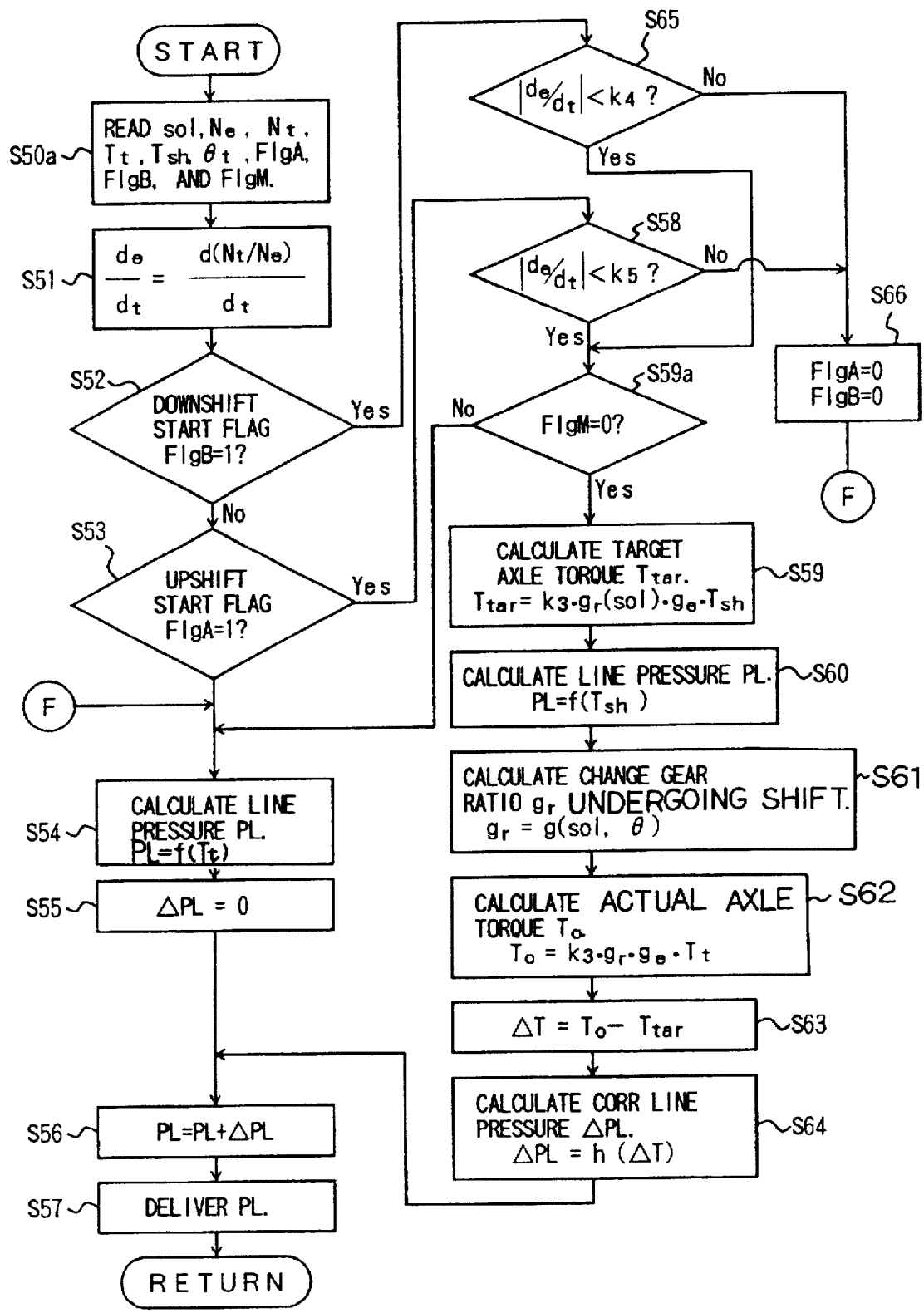
FIG. 12 is a flow chart showing control steps during a gear shift operation in a modification to the first embodiment of the present invention.

As shown in FIG. 12, at a step S50a, a mode selection flag FlgM is read along with the shift signal sol, the engine r.p.m. $N_e$, etc. (Either of the economy and power modes is selected by the driver of the vehicle manipulating the mode switch 69 shown in FIG. 2). The mode selection flag FlgM becomes FlgM=1 when the driver designates the power mode, whereas it becomes FlgM=0 when the economy mode is designated. Subsequently, the controller 100 executes the steps S51, S52, . . . , and S65 or S58. When the decision at the step S65 or S58 results in "Yes" signifying that the gear shift is progressing, whether the mode selection flag FlgM is "0" or "1" is decided at the step S59a. Subject to FlgM being "0", the economy mode is decided, and the line pressure correction control is performed (at the steps S59, . . . . S64, S56 and S57) in the same manner as in the first embodiment. In contrast, subject to FlgM being "1", the power mode is decided, and the ordinary line pressure control is performed (at the steps S54, . . . and S57) without performing the line pressure correction control.

Figure 13:
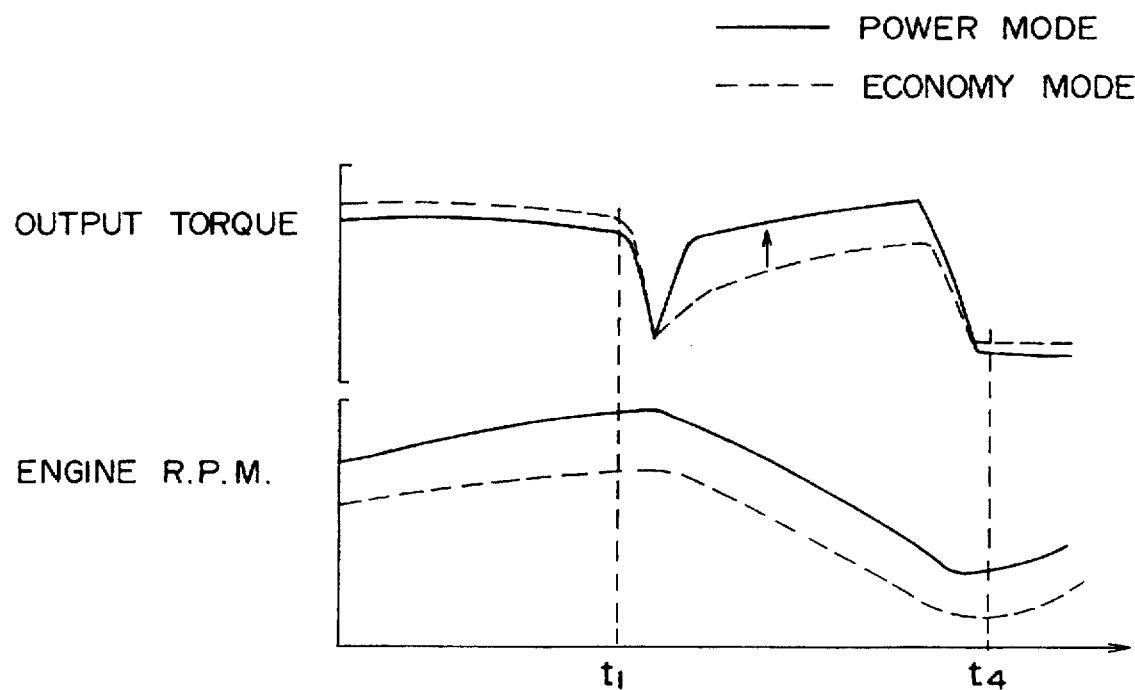
FIG. 13 is a graph showing an output torque and engine r.p.m. during a gear shift operation in each of an economy mode and a power mode.

Referring to FIG. 13, in the economy mode, the gear shift is effected while the engine r.p.m. $N_e$ is lower than in the power mode. Accordingly, the magnitude of slip of the torque converter 25 becomes larger to incur a greater shift shock than in the power mode. In this modification, therefore, the line pressure correction control is performed during the gear shift in the economy mode.

Although, in this modification, the line pressure correction control is performed in only the case of the economy mode where there is greater shift shock, it may well be performed also in the case of the power mode. Besides, although the correctional line pressure ΔPL is evaluated from the difference ΔT between the target axle torque $T_{tar}$ and the actual axle torque $T_o$ in this modification and the first embodiment, it may well be evaluated from the throttle valve opening θ, engine r.p.m. $N_e$ and vehicle speed V in conformity with a function $f_1(θ, N_e, V)$.

Now, two modifications to the first embodiment concerning the recognition of the end of the gear shift operation will be described with reference to FIGS. 14 and 15.

The first embodiment recognizes the end of the gear shift when the rate of change |de/dt| of the r.p.m. ratio e of the torque converter 25 has become, at least, the predetermined value $k_4$ after the start of the gear shift. As shown in FIG. 9, however, the shift end can also be recognized from the change gear ratio r of the stepped automatic transmission mechanism 30 or when the r.p.m. ratio e has become less the or equal to a predetermined value.

Figure 14:
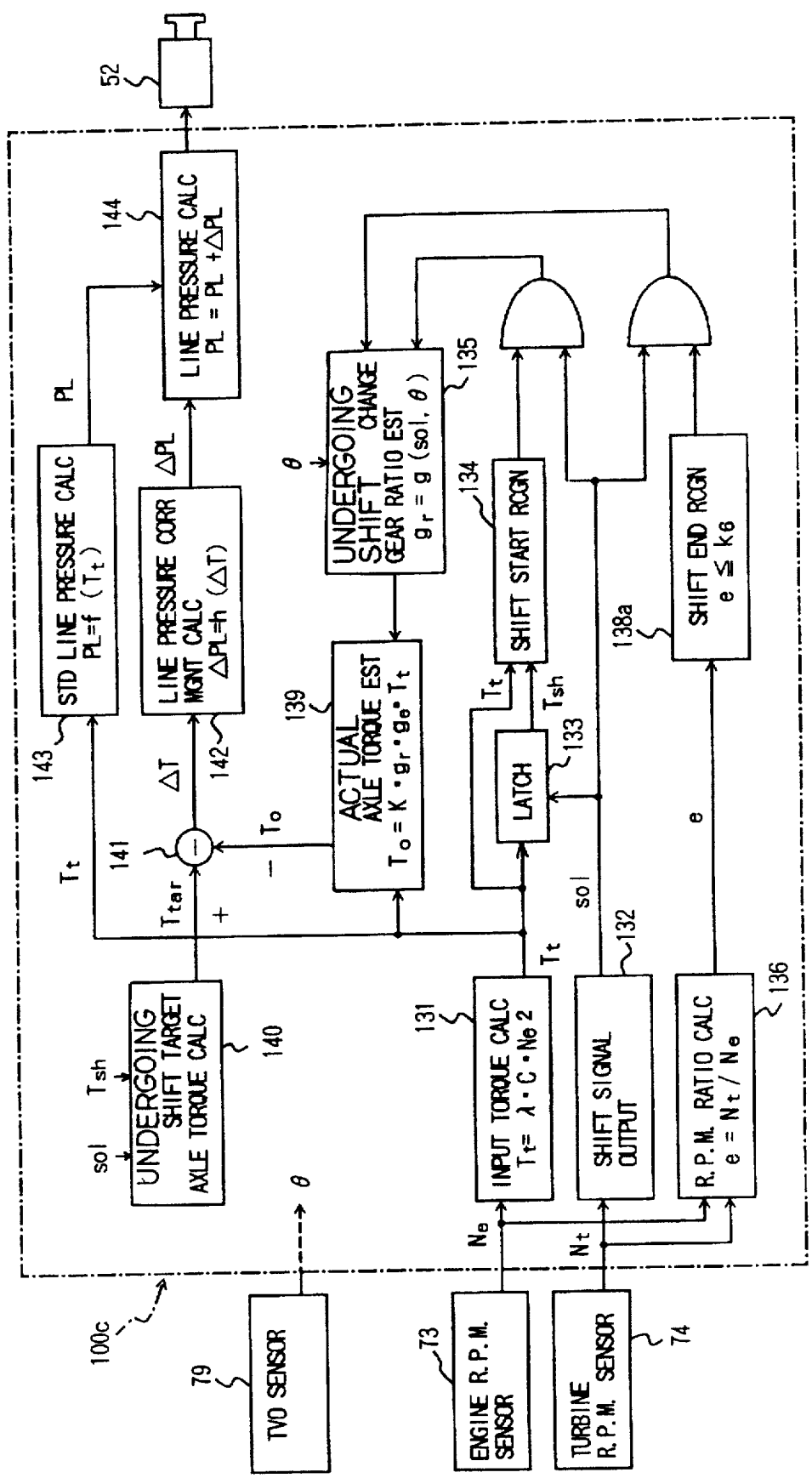
FIG. 14 is a functional block diagram of a controller in a modification (concerning shift end recognition) to the first embodiment of the present invention.

It is a controller 100c shown in FIG. 14 that recognizes the shift end when the r.p.m. ratio e has become less than or equal to the predetermined value ($k_6$). Since the controller 100c does not recognize the shift end from the rate of change |de/dt| of the r.p.m. ratio e of the torque converter 25, it does not include the r.p.m. ratio rate calculation portion 137 in the first embodiment. The r.p.m. ratio calculation portion 136 calculates the r.p.m. ratio e (=$N_t/N_e$) from the engine r.p.m. $N_e$ measured by the engine r.p.m. sensor 73 and the turbine r.p.m. $N_t$ measured by the turbine r.p.m. sensor 74, and it delivers the calculated value e_directly to a shift end recognition portion 138a. When the value e has become less than or equal to the predetermined value $k_6$, the shift end recognition portion 138a recognizes that the gear shift has ended, and it delivers a recognition signal to the AND circuit.

Figure 15:
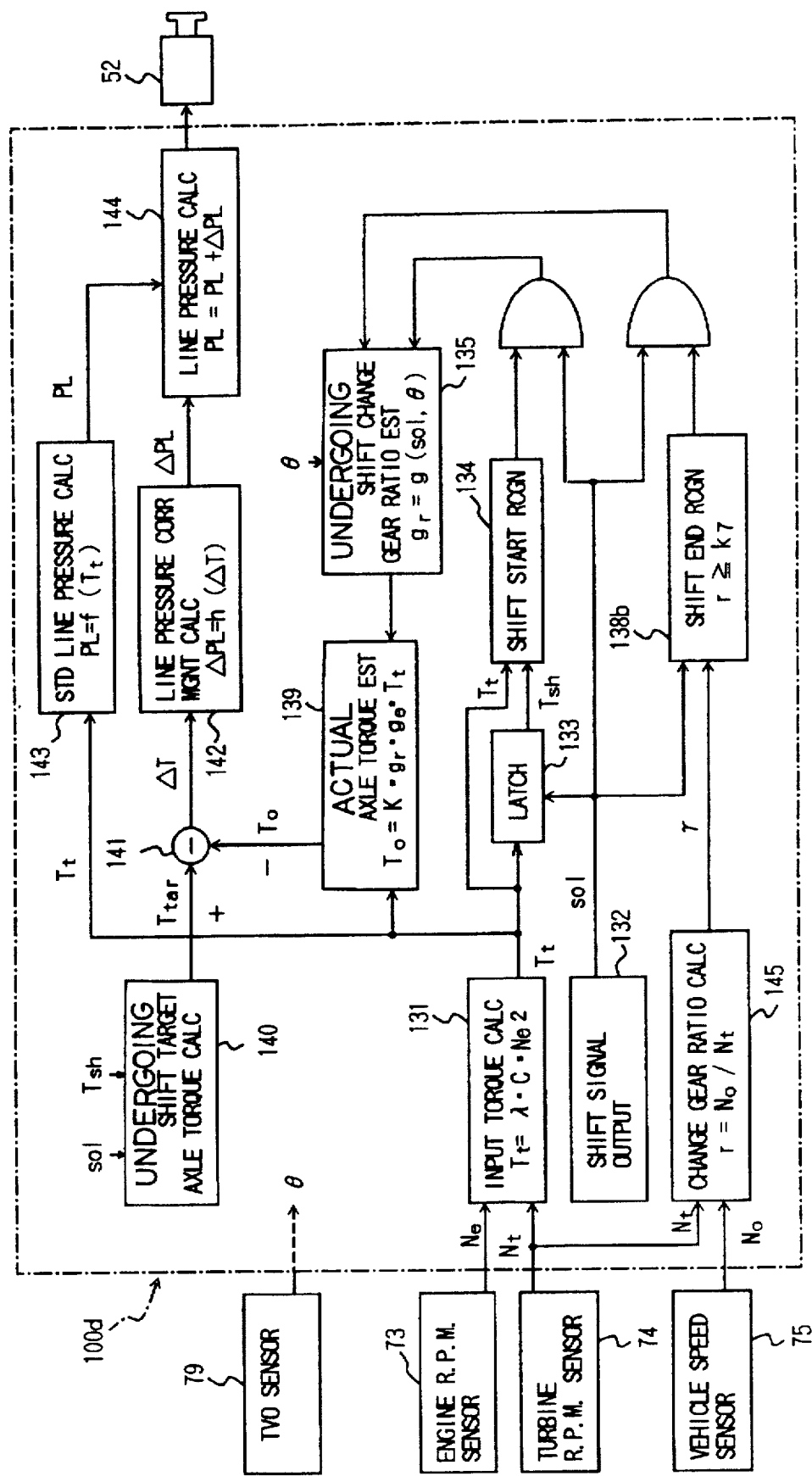
FIG. 15 is a functional block diagram of a controller in another modification (concerning the shift end recognition) to the first embodiment of the present invention.

On the other hand, a controller 100d shown in FIG. 15 recognizes the shift end from the change gear ratio r of the stepped automatic transmission mechanism 30. The change gear ratio r (=$N_o/N_t$) of the stepped automatic transmission mechanism 30 is calculated by a change gear ratio calculation portion 145 from the turbine r.p.m. $N_t$ which is the r.p.m. of the input shaft of the stepped automatic transmission mechanism 30, and the r.p.m. $N_o$ of the output shaft of the stepped automatic transmission mechanism 30 as measured by a vehicle speed sensor 75. The change gear ratio r thus obtained is delivered to a shift end recognition portion 138b.

When the change gear ratio r has become, at least, a value (in the upshift operation) $k_7$ which is slightly smaller than the change gear ratio after the gear shift as indicated by the shift signal sol, the shift end recognition portion 138b recognizes that the gear shift has ended, and it delivers a recognition signal to the AND circuit. By the way, since the value $k_7$ which is slightly smaller than the change gear ratio after the gear shift as indicated by the shift signal sol is employed as a threshold value for the recognition of the shift end, such threshold values are required for the respective change gear ratios after the ends of the gear shifts. In each of the modifications, values for the upshifts and values for the downshifts are prepared as the threshold values.

Now, the second embodiment of the present invention will be described with reference to FIGS. 16–21.

This embodiment consists in that the line pressure correction control in the first embodiment is performed by a different method. The recognition of the shift start as well as the shift end, the estimation of the actual axle torque, etc. in this embodiment are the same as in the first embodiment.

Figure 16:
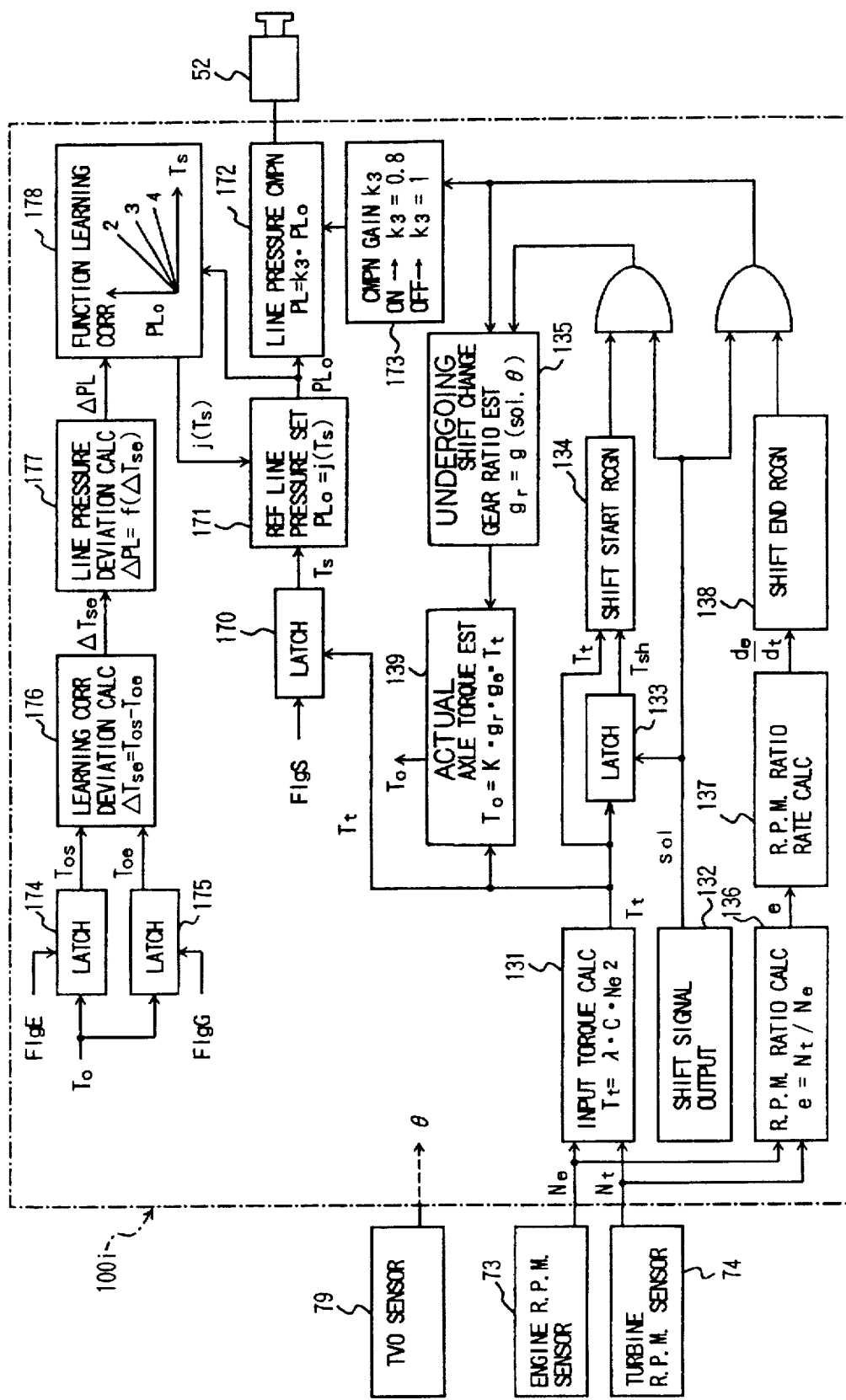
FIG. 16 is a functional block diagram of a controller in the second embodiment of the present invention.

As shown in FIG. 16, a controller 100i in this embodiment includes an input torque latch portion 170 in which an input torque $T_t$ calculated by an input torque calculation portion 131 is temporarily held, a reference line pressure setting portion 171 which sets a reference line pressure $PL_o$ by the use of a line pressure setting torque $T_s$ being the input torque $T_t$ held by the latch portion 170, a reference line pressure compensation portion 172 which alters the reference line pressure $PL_o$ between during a gear shift operation and in a predetermined time period after the end of the gear shift operation in order to establish unequal line pressures during the gear shift operation and in the predetermined time period after the shift end, a compensative gain output portion 173 which delivers a gain $k_3$ for use in altering the reference line pressure $PL_o$ in the reference line pressure compensation portion 172, a learning reference torque latch portion 174 which holds therein an actual axle torque $T_o$ at the point of time when a shift signal change decision flag FlgE has become "1", a learning torque latch portion 175 which holds therein an actual axle torque $T_o$ at the point of time when a learning timing decision flag FlgG has become "1" (the flag FlgG is a flag for deciding whether or not a time is a timing at which the actual axle torque is to be sampled as a learning torque, and FlgG=1 holds at the timing stated above), a learning-correctional deviation calculation portion 176 which calculates the deviation $ΔT_{se}$ between the axle torque (learning reference axle torque) $T_{os}$ held by the learning reference torque latch portion 174 and the axle torque (learning axle torque) $T_{oe}$ held by the learning torque latch portion 175, a line pressure deviation calculation portion 177 which calculates a line pressure deviation ΔPL corresponding to the deviation $ΔT_{se}$, and a function learning correction portion 178 which stores therein the functions $j(T_s)$ of the respective sorts of gear shifts for obtaining the reference line pressures $PL_o$ and which corrects the function $j(T_s)$ sequentially in accordance with the line pressure deviation ΔPL calculated by the line pressure deviation calculation portion 177. The function learning correction portion 178 contains a reference line pressure setting map. The reference line pressure functions $j(T_s)$ of the respective sorts of gear shifts are depicted on the map with the axis of abscissas representing the line pressure setting torque $T_s$ and the axis of ordinates representing the reference line pressures $PL_o$. The other blocks and signals of the controller 100i are the same as in the controller 100 shown in FIG. 1.

Next, the operation of the line pressure correction control in this embodiment will be described in conjunction with flow charts shown in FIGS. 17 and 18.

Figure 17:
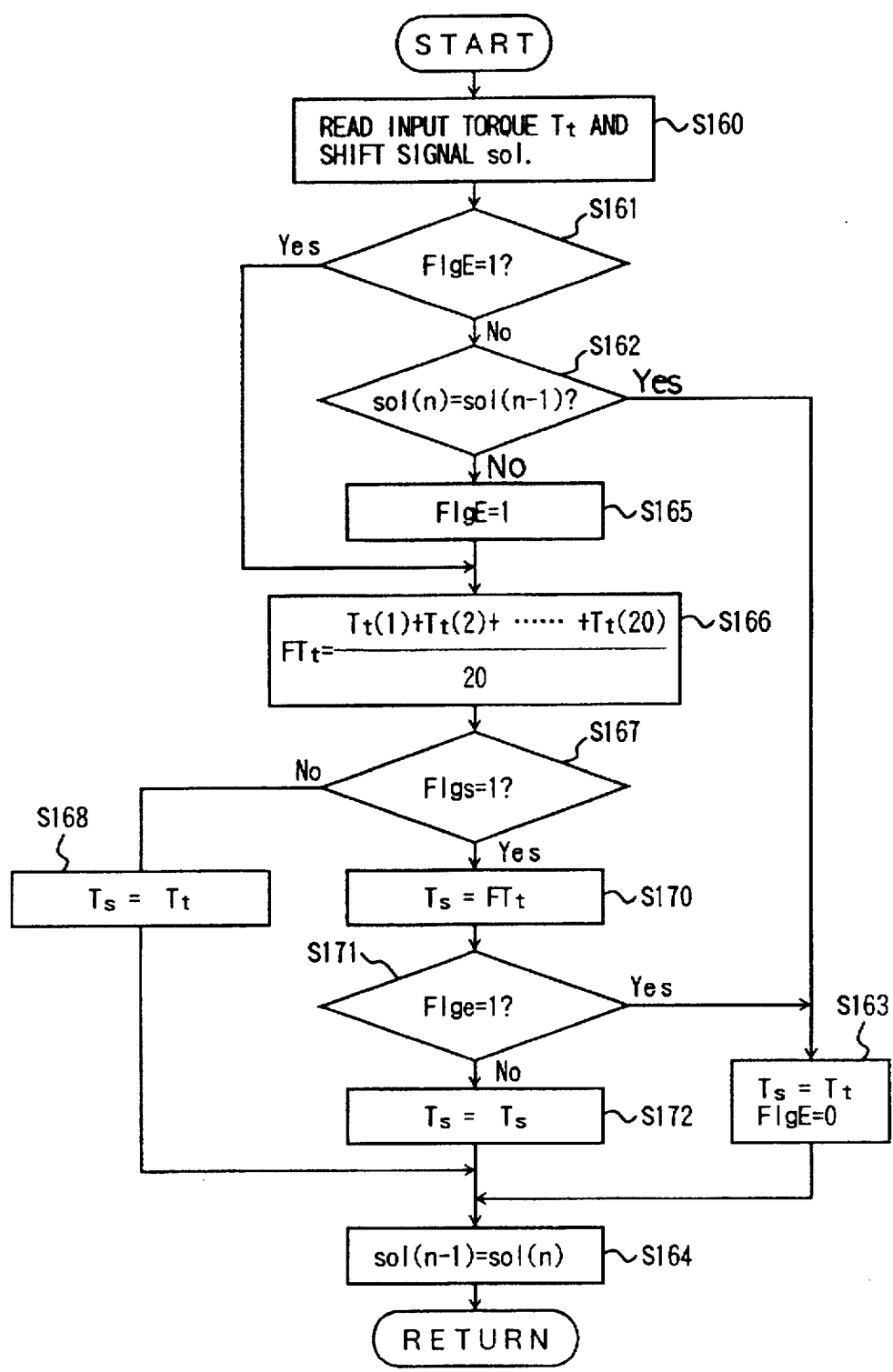
FIG. 17 is a flow chart showing a line pressure controlling operation in the second embodiment of the present invention.

As shown in FIG. 17, at a step S160, the corresponding portions of the controller 100i read the input torque (turbine torque) $T_t$ calculated by the input torque calculation portion 131 and the shift signal sol delivered from the shift signal output portion 132. Subsequently, whether or not the shift signal change decision flag FlgE for indicating the change of the shift signal sol (FlgE=1 holds when the shift signal sol has changed) is "1" is decided at a step S161. In the case of FlgE=1, the routine proceeds to a step S166. On the other hand, in the case of FlgE=0, the routine proceeds to a step S162, at which the controller 100i decides if the current shift signal sol(n) is equal to the last shift signal sol(n−1). When the shift signals sol(n) and sol(n−1) are equal, that is, when no gear shift operation is to be performed, the routine proceeds to a step S163. Here at the step S163, the read input torque $T_t$ is set as the line pressure setting torque $T_s$, and the shift signal change decision flag FlgE is set to "0". The step S163 is followed by a step S164, at which the current shift signal sol(n) is set as the last shift signal sol (n−1). Thereafter, the routine returns. Meanwhile, when the current and last shift signals sol(n) and sol(n−1) have been decided as unequal at the step S162, the routine proceeds to a step S165, at which the shift signal change decision flag FlgE is set to "1" and which is followed by the step S166. At this step S166, the input torque $T_t$ is subjected to filtering. The filtering is performed from the time of the change of the shift signal sol and for a time period in which the mechanical gear shift of the stepped automatic transmission mechanism 30 is not actually started, for example, for about 200 [msec]. Subsequently, whether or not a shift start flag Flgs is "1" (Flgs=1 holds when the start of the mechanical gear shift has been recognized) is decided at a step S167. In a case where the shift start flag Flgs is not "1", the routine proceeds to a step S168, at which the read input torque $T_t$ is set as the line pressure setting torque $T_s$ and which is followed by the step S164. On the other hand, in a case where the shift start flag Flgs has been decided as "1" at the step S167, the routine proceeds to a step S170. Here at the step S170, the input torque $FT_t$ filtered at the step S166 is set as the line pressure setting torque $T_s$, whereupon the routine proceeds to a step S171. Whether or not a shift end flag Flge is "1" (Flge=1 holds when the end of the mechanical gear shift has been recognized) is decided at the step S171. In a case where Flge=0 holds, that is, where the end of the mechanical gear shift has not been recognized, the routine proceeds to a step S172, at which the line pressure setting torque $T_s$ in the last cycle is set as the line pressure setting torque $T_s$ in the current cycle once more (the last torque $T_s$ is held) and which is followed by the step S164. On the other hand, in a case where Flge=1 holds at the step S171, that is, where the end of the mechanical gear shift has been recognized, the steps S163 and S164 are executed, and the routine returns.

Figure 18:
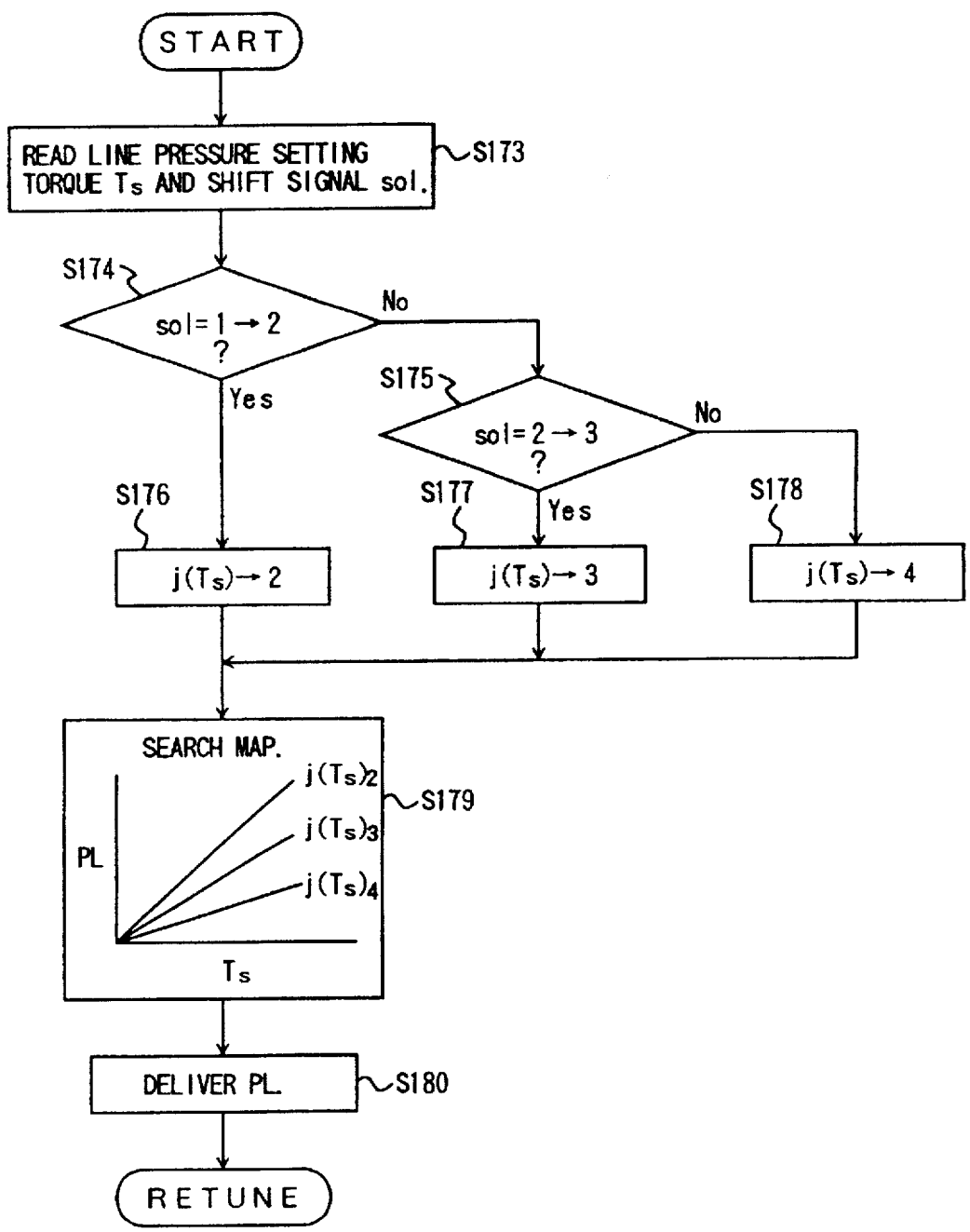
FIG. 18 is a flow chart showing a line pressure controlling operation during a gear shift operation in the second embodiment of the present invention.

As shown in FIG. 18, in actually performing the line pressure control, the corresponding portions of the controller 100i read the line pressure setting torque $T_s$ and the shift signal sol set in the flow of FIG. 17, at a step S173. Incidentally, the flow of FIG. 18 illustrates the line pressure control operation for a time period from a shift start recognition time $t_2$ to a shift end recognition time $t_3$ (refer to FIG. 19), and it is executed by the reference line pressure setting portion 171. Subsequently, whether or not the shift signal sol indicates the 1st–2nd speed change is decided at a step S174, and whether the shift signal sol indicates the 2nd–3rd speed change or 3rd–4th speed change is decided at a step S175. When the shift signal sol indicates the 1st–2nd speed change, the function No. 2 among the plurality of line pressure setting functions $j(T_s)$ prepared beforehand is employed; when the shift signal sol indicates the 2nd–3rd speed change, the line pressure setting function No. 3 is employed; and when the shift signal sol indicates the 3rd–4th speed change, the line pressure setting function No. 4 is employed (steps S176, S177 and S178). At a step S179, the line pressure setting function $j(T_s)$ selected at any of the steps S176, S177 and S178 is extracted from within the reference line pressure setting map stored in the function learning correction portion 178, and the line pressure setting torque $T_s$ is substituted into the selected function $j(T_s)$ so as to derive the line pressure PL which is to be applied for the time period from the shift start recognition time $t_2$ to the shift end recognition time $t_3$. At a step S180, the derived line pressure PL is delivered to the solenoid of the line pressure control valve 52.

Figure 19:
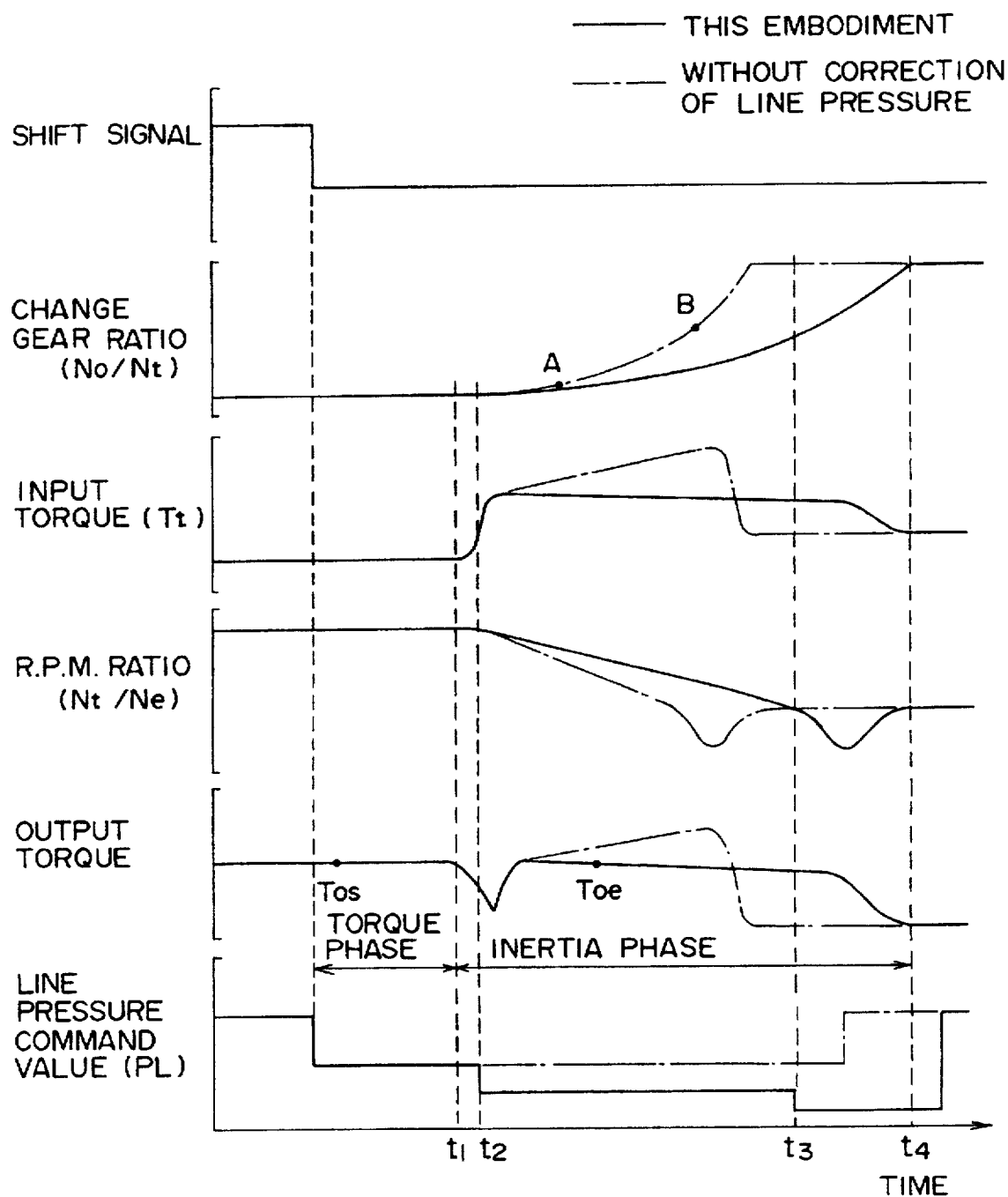
FIG. 19 is a time chart of an upshift operation in the second embodiment of the present invention.

In the line pressure control, the line pressure command value PL decreases for the time period from the shift start recognition time $t_2$ to the shift end recognition time $t_3$ as shown in FIG. 19. As in the first embodiment, therefore, the variation of the output torque $T_o$ diminishes in the meantime, and the shock of the vehicle attributed to the gear shift is reduced. Incidentally, the illustration of FIG. 19 corresponds to the upshift operation.

Figure 9:
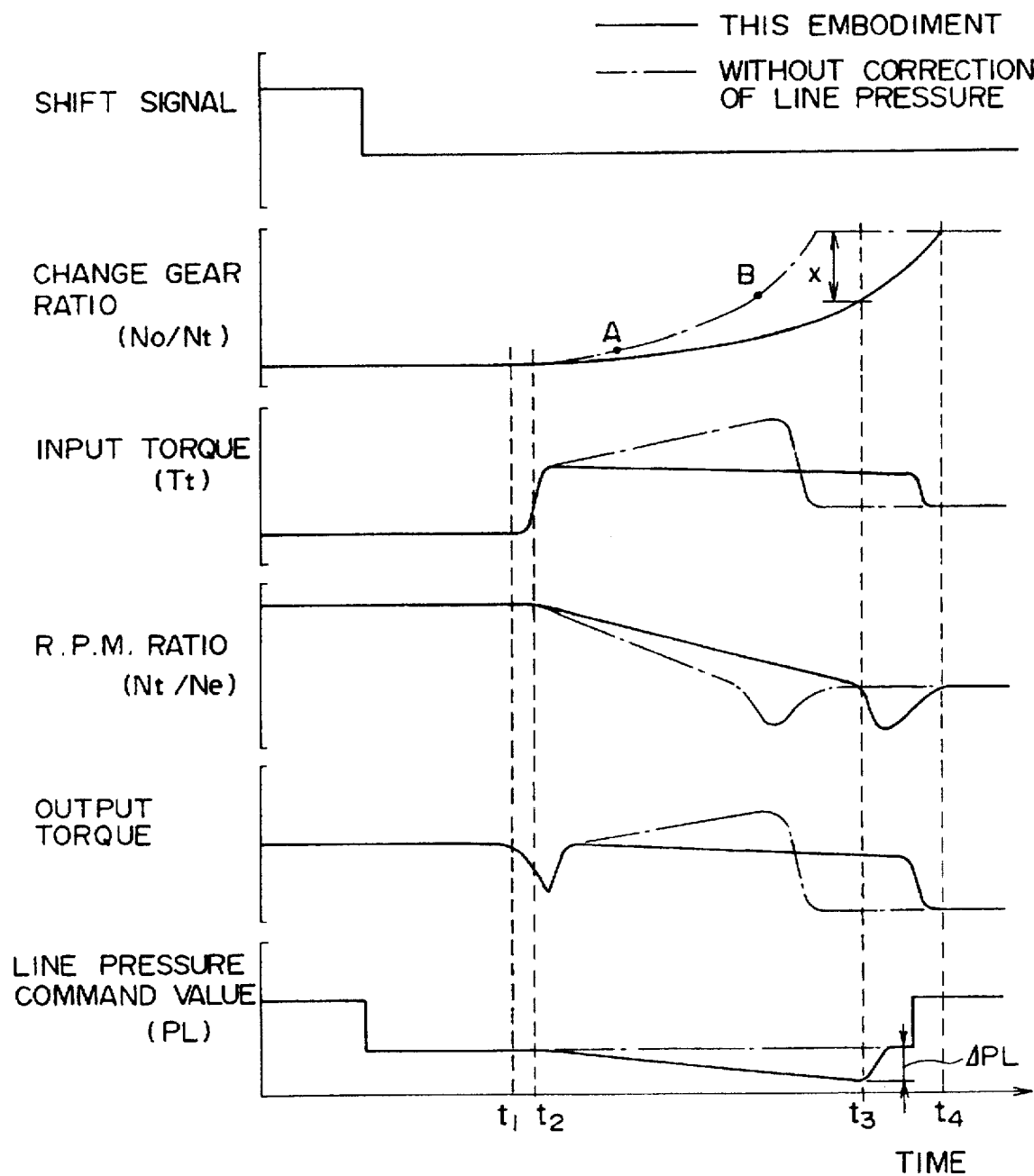
FIG. 9 is a time chart of an upshift operation in the first embodiment of the present invention.

Meanwhile, in the case where the line pressure control is performed only for the time period from the shift start recognition time $t_2$ to the shift end recognition time $t_3$ as in the first embodiment, the output torque $T_o$ decreases abruptly after the shift end recognition time $t_3$ as shown in FIG. 9, and the shift shock arises at this point. In the second embodiment, therefore, the line pressure is further lowered for a fixed time period from the shift end recognition time $t_3$ as shown in FIG. 19, whereby the abrupt depression of the output torque $T_o$ which arises after the shift end recognition time $t_3$ is prevented, to thus reduce the shift shock. The line pressure PL for the fixed time period from the shift end recognition time $t_3$ is evaluated by the line pressure compensation portion 172. More specifically, the line pressure compensation portion 172 multiplies the reference line pressure $PL_o$ evaluated by the reference line pressure setting portion 171, by 0.8 as the compensative gain $k_3$ during the gear shift operation (the predetermined time period from the shift start recognition time $t_2$ to the shift end recognition time $t_3$) and by 1 (one) as the compensative gain $k_3$ for the fixed time period from the shift end recognition time $t_3$. Thus, the line pressure compensation portion 172 supplies the solenoid of the line pressure control valve 52 with the product between the reference line pressure $PL_o$ and the compensative gain $k_3$.

This embodiment does not perform the so-called feedback control in which the torque of the driving axle (62 in FIG. 2) is controlled with the estimated actual axle torque $T_o$ as in the first embodiment, but it performs the feedforward control in which the axle torque is controlled with any of the functions $j(T_s)$ prepared beforehand for the respective gear shift positions. In the case of the feedforward control, it is difficult to cope with the discrepancies and secular changes of the transmission mechanisms 30 and torque converters 25 of the individual vehicles. This embodiment therefore performs an undergoing shift line pressure learning control in order to cope with such discrepancies and secular changes.

Figure 20:
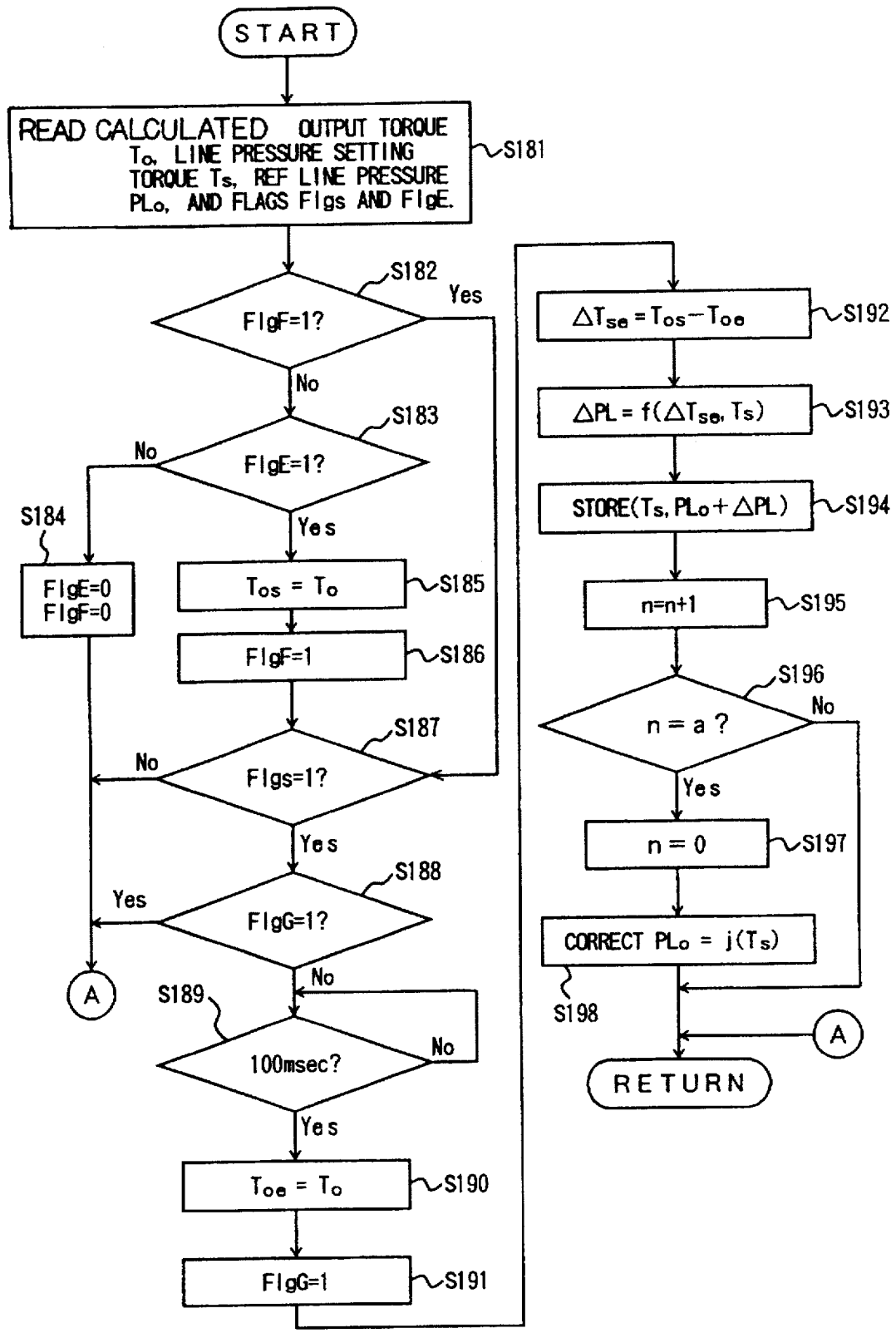
FIG. 20 is a flow chart showing a learning control operation for a line pressure setting function in the second embodiment of the present invention.

FIG. 20 is a flow chart of the undergoing shift line pressure learning control in this embodiment. At a step S181, the corresponding portions of the controller 100i read the output torque (actual axle torque) $T_o$ calculated by the actual axle torque estimation portion 139, the line pressure setting torque $T_s$ at the step S170 in FIG. 17, the reference line pressure $PL_o$ at the step S180 in FIG. 18, the shift start flag Flgs and the shift signal change decision flag FlgE (FlgE=1 holds when the shift signal sol has changed). Subsequently, whether or not a flag FlgF (for indicating that the shift signal change decision flag FlgE has become "1") is "1" is decided at a step S182. The routine proceeds to a step S183 when the flag FlgF is not "1", and to a step S187 when the flag FlgF is "1". At the step S183, whether or not the shift signal change decision flag FlgE is "1" is decided. When the flag FlgE is not "1", the routine proceeds to a step S184. Here at the step S184, the shift signal change decision flag FlgE and the learning timing decision flag FlgG (this flag serves to decide whether or not the time is the timing for sampling the learning output torque, and FlgG=1 holds when the time is the sampling timing) are respectively set to "0". Thereafter, the routine returns as indicated by symbol Ⓐ. On the other hand, when the shift signal change decision flag FlgE has been decided as "1" at the step S183, the routine proceeds to a step S185. Here at the step S185, the learning reference torque latch portion 174 latches as the learning reference output torque $T_{os}$ the estimated output torque $T_o$ at the time when the shift signal change decision flag FlgE has been decided as "1". Subsequently, the flag FlgF is set to "1" at a step S186, which is followed by the step S187. At this step S187, whether or not the shift start flag Flgs is "1" is decided. When the flag Flgs is not "1", the routine returns. In contrast, when the flag Flgs is "1", the routine proceeds to a step S188, at which whether or not the learning timing decision flag FlgG is "1" is decided. The routine returns in a case where the flag FlgG is "1", and it proceeds to a step S189 in a case where the flag FlgG is not "1", that is, where the time is not the timing for sampling the learning output torque. Whether or not a time period of, for example, 100 [msec] has lapsed since the mechanical shift start recognition time $t_2$ is decided at the step S189. On condition that 100 [msec] has lapsed, the learning torque latch portion 175 latches the estimated output torque $T_o$ on this occasion as the learning torque $T_{oe}$ at a step S190. Subsequently, the learning timing decision flag FlgG is set to "1" at a step S191, which is followed by a step S192. At this step S192, the learning-correctional line pressure deviation calculation portion 176 calculates the deviation $\Delta T_{se}$ between the learning reference output torque $T_{os}$ obtained at the step S185 and the learning torque $T_{oe}$ obtained at the step S190. Here, the character of the deviation $\Delta T_{se}$ will be briefly explained. Since the learning reference output torque $T_{os}$ is the output torque $T_o$ at the change of the shift signal sol, it is the output torque $T_o$ in a torque phase (an interval extending from the change of the shift signal sol to the point of time $t_1$ at which the mechanical gear shift is actually started) as shown in FIG. 19. Besides, since the learning torque $T_{oe}$ is the output torque $T_o$ 100 [msec] after the shift start recognition time $t_2$, it is the output torque $T_o$ after a torque depression observed at the initial stage of an inertia phase (an interval extending from the actual mechanical shift start time $t_1$ to the point of time $t_4$ at which the gear shift is actually ended, and an inertial force is acting on the driving axle 62 during the interval). That is, the learning reference output torque $T_{os}$ and the learning torque $T_{oe}$ are the output torques $T_o$ before and after the torque depression observed at the initial stage of the inertia phase, respectively. It is preferable from the viewpoint of shift shock reduction that the deviation $\Delta T_{se}$ between the output torques $T_o$ before and after the torque depression is basically 0 (zero).

Subsequently, at a step S193, the line pressure deviation calculation portion 177 calculates the line pressure deviation $\Delta PL$ in conformity with a function f whose parameters are the aforementioned deviation $\Delta T_{se}$ and the line pressure setting torque $T_s$ at the step S170 in FIG. 17. Incidentally, various controlled variables are set so that the line pressure deviation $\Delta PL$ may become 0 (zero) at the shipment of the vehicle. Further, at a step S194, the line pressure deviation $\Delta PL$ is added to the reference line pressure $PL_o$ delivered at the step S180 in FIG. 18, and the resulting sum is plotted on the reference line pressure function map as shown in FIG. 21. At a step S195, "1" is added to the number of times n of plotting. Whether or not the number of times n of plotting has reached a predetermined number of times a is decided at a step S196. The routine proceeds to a step S197 when it has the number of times a has been reached, and it returns when not. At the step S197, the number of times n of the plotting is reset to 0 (zero). Besides, at a step S198, the corresponding one of the reference line pressure functions $j(T_s)$ is corrected on the basis of the plurality of reference line pressures $PL_o$ plotted on the reference line pressure function map. Concretely, in a case shown in FIG. 21 by way of example where the initialized reference line pressure function $j(T_s)$ is expressed as $j(T_s)=k_4 \times T_s$, and where the plurality of plotted reference line pressures $PL_o$ are rectilinearly approximated as $PL_o=k_4 \times T_s + \Delta PL$, this function is set as a new reference line pressure function $j(T_s)=k_4 \times T_s + \Delta PL$. Since, however, the secular changes have various tendencies, the new reference line pressure function $j(T_s)$ does not always become the form as mentioned above. Such forms as $j(T_s)=(k_4 \times \Delta PL) \times T_s$, and $j(T_s)=(k_4 \times \Delta PL) \times T_s + \Delta PL$ are also considered. Incidentally, the steps S194–S198 are executed by the function learning correction portion 178. Besides, although the undergoing shift line pressure learning correction control stated above may well be performed continually, it is performed upon elapsing of a predetermined term (for example, every half year) or every predetermined traveling distance (for example, every 5000 [km]) in this embodiment.

As described above, according to this embodiment, the reference line pressure functions $j(T_s)$ are subjected to the learning corrections every predetermined time period or every predetermined traveling distance, so that the shift shocks can be prevented from becoming worse due to the secular changes.

Now, the third embodiment of the present invention will be described with reference to FIGS. 22–24.

A controller 100e in this embodiment consists in that, in order to reduce the shock of a vehicle attributed to a gear shift operation, an engine torque $T_e$ during the gear shift operation is corrected in accordance with the deviation $\Delta T$ between an estimated axle torque $T_o$ and a target axle torque $T_{tar}$ during the gear shift operation. The functions of grasping a shift start time and a shift end time, etc. are the same as in the controller 100 of the first embodiment. Accordingly, the engine torque correction in the gear shift operation will be chiefly explained below. Besides, the same functional portions (131, . . . , 139 and 141) as in the controller 100 of the first embodiment shall have identical numerals assigned thereto and shall not be repeatedly explained. This embodiment controls the throttle valve opening θ in order to control the engine torque $T_e$. Unlike the first embodiment, therefore, this embodiment is applicable only to the automatic transmission system furnished with the electronic throttle valve 17a (shown in FIG. 2).

Figure 22:
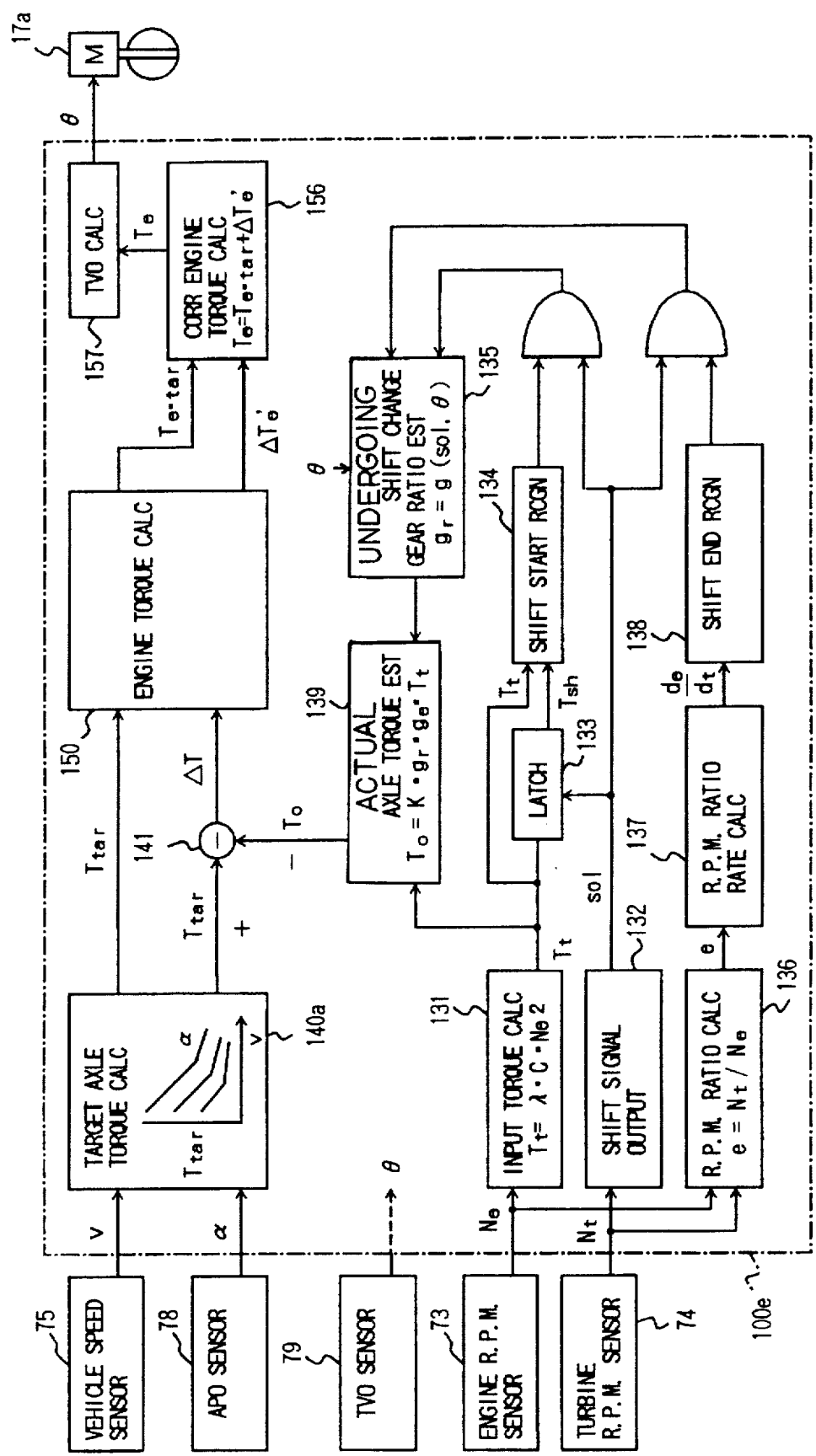
FIG. 22 is a functional block diagram of a controller in the third embodiment of the present invention.

As shown in FIG. 22, the controller 100e of this embodiment includes a target axle torque calculation portion 140a which calculates the target axle torque $T_{tar}$ from the measured vehicle speed V and accelerator pedal opening α by the use of the target axle torque map prepared beforehand, an engine torque calculation portion 150 which calculates an engine torque deviation $\Delta T_e'$ from the axle torque deviation $\Delta T$ between the target axle torque $T_{tar}$ and the calculated actual axle torque $T_o$ and which also calculates a target engine torque $T_{e\text{-}tar}$ corresponding to the target axle torque $T_{tar}$, a correctional engine torque calculation portion 156 which calculates the sum $T_e$ between the engine torque deviation $\Delta T_e'$ and target engine torque $T_{e\text{-}tar}$ calculated by the engine torque calculation portion 150, and a throttle valve opening calculation portion 157 which derives from an engine output characteristics map the throttle valve opening $\theta$ that affords the engine torque $T_e$ calculated by the correctional engine torque calculation portion 156.

Figure 23:
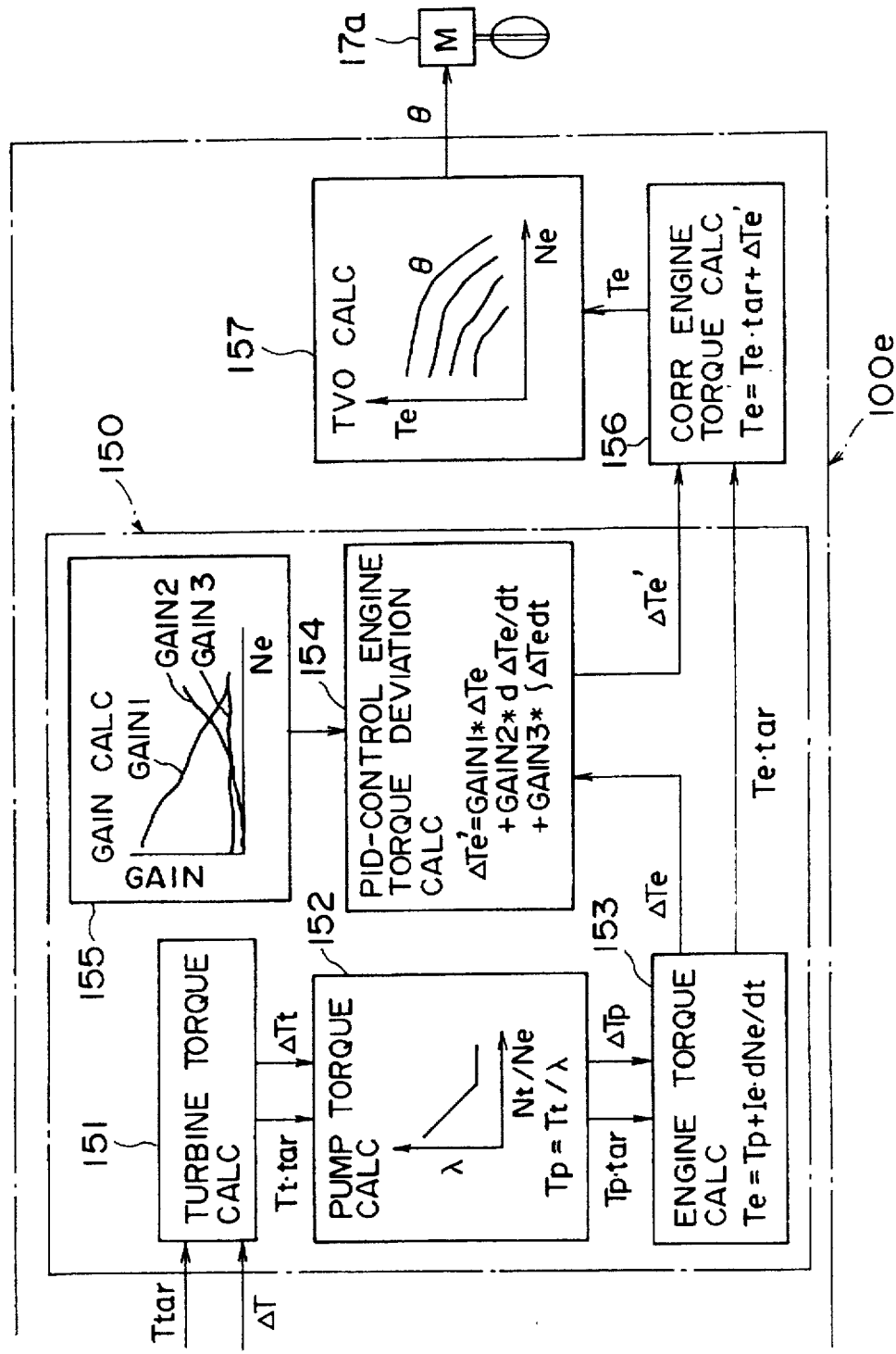
FIG. 23 is a functional block diagram of an engine torque calculation portion in the third embodiment of the present invention.

As shown in FIG. 23, the engine torque calculation portion 150 includes a turbine torque calculator 151 by which the target axle torque $T_{tar}$ and the axle torque deviation $\Delta T$ are respectively converted in terms of a target turbine torque $T_{t\text{-}tar}$ and a turbine torque deviation $\Delta T_t$, a pump torque calculator 152 by which the target turbine torque $T_{t\text{-}tar}$ and turbine torque deviation $\Delta T_t$ are respectively converted in terms of a target pump torque $T_{p\text{-}tar}$ and a pump torque deviation $\Delta T_p$, an engine torque calculator 153 by which the target pump torque $T_{p\text{-}tar}$ and pump torque deviation $\Delta T_p$ are respectively converted in terms of the target engine torque $T_{e\text{-}tar}$ and an engine torque deviation $\Delta T_e$, a PID (proportional-plus-integral-plus-derivative)-control engine torque deviation calculator 154 by which the engine torque deviation $\Delta T_e$ calculated by the engine torque calculator 153 is converted in terms of the PID-control engine torque deviation $\Delta T_e'$, and a gain calculator 155 which calculates gains for use in evaluating the PID-control engine torque deviation $\Delta T_e'$.

Next, the operation of the controller 100e in this embodiment will be described.

In the ordinary running of the vehicle other than during the gear shift operation, the target axle torque calculation portion 140a derives the target axle torque $T_{tar}$ corresponding to the vehicle speed V and accelerator pedal opening α measured by the respective sensors 75 and 78, with reference to the target axle torque map. The derived target axle torque $T_{tar}$ is delivered to the turbine torque calculator 151 of the engine torque calculation portion 150. The turbine torque calculator 151 calculates the target turbine torque $T_{t\text{-}tar}$ in such a way that the target axle torque $T_{tar}$ is divided by the gear ratio $g_e$ of the differential 61 shown in FIG. 2 and the change gear ratio indicated by the current shift signal sol. In the pump torque calculator 152, the torque ratio λ of the torque converter 25 is derived from torque converter characteristics prepared beforehand, and the target turbine torque $T_{t\text{-}tar}$ is divided by the derived torque ratio λ, thereby calculating the target pump torque $T_{p\text{-}tar}$. In the engine torque calculator 153, an inertial torque $I_e \cdot dN_e/dt$ is added to the target pump torque $T_{p\text{-}tar}$, thereby calculating the target engine torque $T_{e\text{-}tar}$. Incidentally, since the output shaft of the engine 10 and the pump 26 of the torque converter 25 are directly connected, the engine torque $T_e$ and the pump torque $T_p$ are basically equal. For the sake of a higher accuracy, however, an inertial force which is attendant upon the change of the engine r.p.m. $N_e$ is taken into consideration here. The target engine torque $T_{e\text{-}tar}$ calculated above is delivered to the correctional engine torque calculation portion 156. Here in the ordinary running other than during the gear shift operation, the engine torque deviation $\Delta T_e'$ is not delivered from the PID-control engine torque deviation calculator 154 to the correctional engine torque calculation portion 156. In the correctional engine torque calculation portion 156, accordingly, the engine torque deviation $\Delta T_e'$ is not added to the target engine torque $T_{e\text{-}tar}$, but this target engine torque $T_{e\text{-}tar}$ left intact is delivered to the throttle valve opening calculation portion 157. The throttle valve opening calculation portion 157 calculates the throttle valve opening θ from the engine torque $T_e$ and the engine r.p.m. $N_e$ measured by the engine r.p.m. sensor 73, with reference to the engine output characteristics map, and it delivers the calculated value to the actuator of the electronic throttle valve 17a. Thus, according to this embodiment, the opening of the throttle valve 17a is controlled so as to normally produce the target axle torque $T_{tar}$ corresponding to the accelerator pedal opening α and the vehicle speed v, unlike the first embodiment in the case where the throttle valve 17 and the accelerator pedal 66 are mechanically linked.

By the way, the inputs of the engine r.p.m. etc. to the functional blocks are omitted from FIG. 23 for the brevity of illustration. In actual fact, however, the shift signal sol is input to the turbine torque calculator 151, and the engine r.p.m. $N_e$ and the turbine r.p.m. $N_t$ are input to the pump torque calculator 152 in order to find the torque ratio λ. Besides, the engine r.p.m. $N_e$ from the engine r.p.m. sensor 73 is input to the engine torque calculator 153, the gain calculator 155 and the throttle valve opening calculation portion 157.

In the gear shift operation, the actual axle torque $T_o$ during the time period from the shift start time grasped by the shift start recognition portion 134 to the shift end time grasped by the shift end recognition portion 138 is calculated by the actual axle torque estimation portion 139 in the same manner as in the first embodiment. On the other hand, the target axle torque $T_{tar}$ is evaluated by the target axle torque calculation portion 140a in the same manner as in the ordinary running. The deviation $\Delta T$ between the target axle torque $T_{tar}$ and the calculated actual axle torque $T_o$ is evaluated by the subtracter 141. The turbine torque calculator 151 of the engine torque calculation portion 150 is supplied with the target axle torque $T_{tar}$ and the axle torque deviation $\Delta T$. In the turbine torque calculator 151, the target turbine torque $T_{t\text{-}tar}$ corresponding to the target axle torque $T_{tar}$, and the turbine torque deviation $\Delta T_t$ corresponding to the axle torque deviation $\Delta T$ are calculated in the same manner as in the ordinary running. Further, in the same manner as in the ordinary running, the pump torque calculator 152 calculates the target pump torque $T_{p\text{-}tar}$ corresponding to the target turbine torque $T_{t\text{-}tar}$, and the pump torque deviation $\Delta T_p$ corresponding to the turbine torque deviation $\Delta T_t$, while the engine torque calculator 153 calculates the target engine torque $T_{e\text{-}tar}$ corresponding to the target pump torque $T_{p\text{-}tar}$ and the engine torque deviation $\Delta T_e$ corresponding to the pump torque deviation $\Delta T_p$. In the PID-control engine torque deviation calculator 154, the engine torque deviation $\Delta T_e$ calculated by the engine torque calculator 153 is converted into the PID-control engine torque deviation $\Delta T_e'$. The gains for use in the conversion are derived by the gain calculator 155 in correspondence with the engine r.p.m. $N_e$ measured by the engine r.p.m. sensor 73. The target engine torque $T_{e\text{-}tar}$ calculated by the engine torque calculator 153, and the engine torque deviation $\Delta T_e'$ calculated by the PID-control engine torque deviation calculator 154 are both supplied to the correctional engine torque calculation portion 156. The correctional engine torque calculation portion 156 calculates the sum $T_e$ ($=T_{e\text{-}tar}+\Delta T_e'$) of the target engine torque $T_{e\text{-}tar}$ and the engine torque deviation $\Delta T_e'$, and delivers the value $T_e$ to the throttle valve opening calculation portion 157. In the same manner as in the ordinary running, the throttle valve opening calculation portion 157 calculates the throttle valve opening θ corresponding to the engine torque $T_e$ delivered from the correctional engine torque calculation portion 156 and then delivers the calculated throttle valve opening θ to the actuator of the electronic throttle valve 17a.

Figure 24:
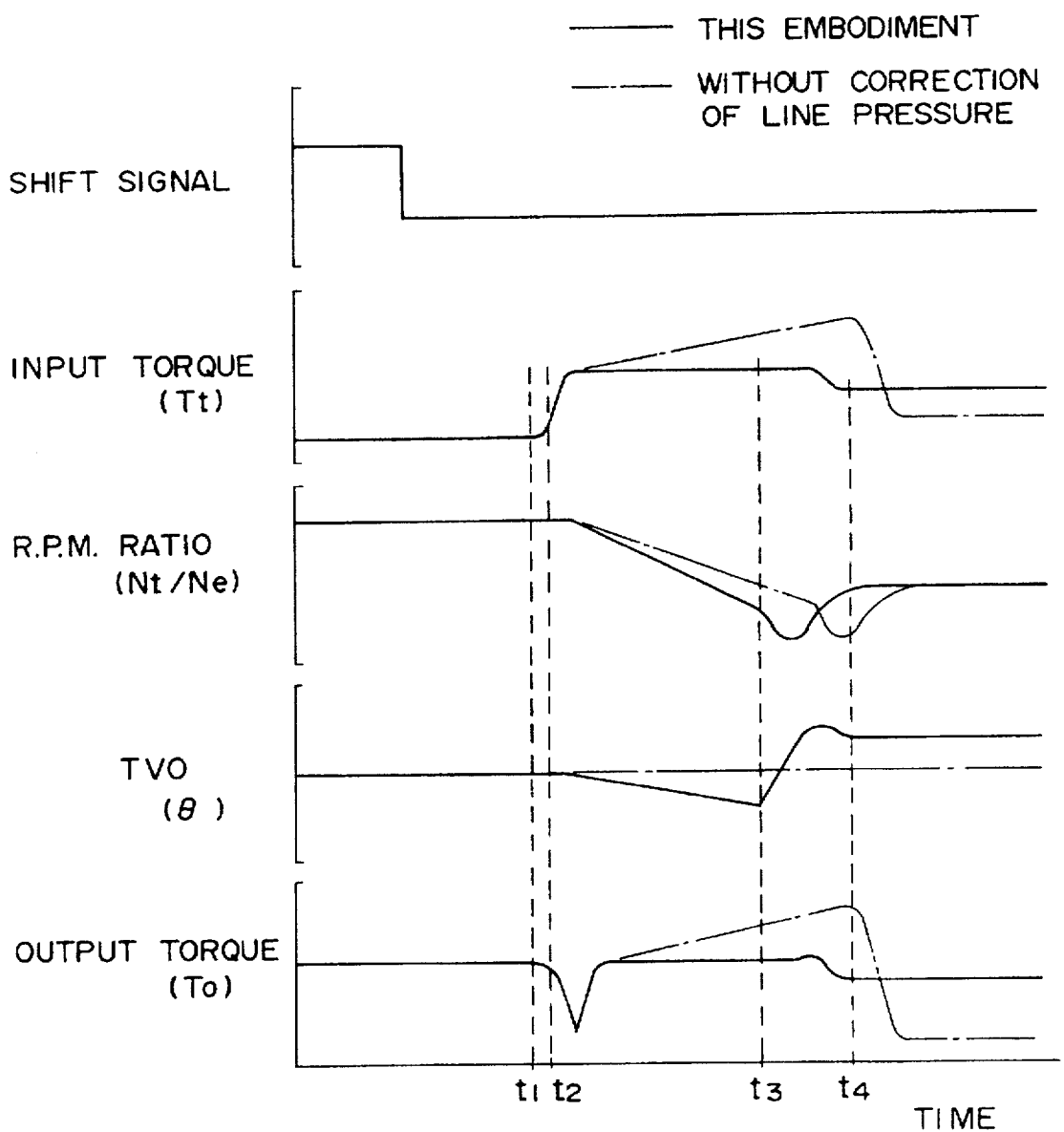
FIG. 24 is a time chart of an upshift operation in the third embodiment of the present invention.

Next, the effects of this embodiment will be explained in conjunction with a time chart relevant to the upshift operation as shown in FIG. 24.

In this embodiment, the shift start is recognized on the basis of the change of the input torque (turbine torque) (the point of time at which the shift start is recognized is $t_2$) in the same manner as in the first embodiment. It is therefore possible to recognize the shift start time early and reliably.

Moreover, in this embodiment, during a time period from the shift start recognition time $t_2$ to a shift end recognition time $t_3$, the actual axle torque (output torque) $T_o$ increases relative to the target axle torque $T_{tar}$, and hence, the correction of decreasing the throttle valve opening θ is made so as to reduce the deviation T of both the torques. In consequence, the input torque $T_t$ does not increase, with the result that the undergoing shift axle torque does not increase. Thus, the shift shock can be relieved.

In general, even when the engine torque is held constant, the upshift increases the change gear ratio, with the result that the axle torque becomes smaller after the gear shift than before the gear shift. The change of the axle torque on this occasion appears as the shift shock. It is accordingly preferable to reduce the difference between the axle torque before the gear shift and the axle torque after the gear shift as much as possible. In the case of this embodiment, the target axle torque $T_{tar}$ is set in accordance with the vehicle speed V and the accelerator pedal opening α, irrespective of whether or not the gear shift is progressing. Consequently, when the vehicle speed V and the accelerator pedal opening α are constant, the target axle torque $T_{tar}$ before the gear shift remains unchanged even after the end of the gear shift. In this embodiment, therefore, the throttle valve opening θ is enlarged after the shift end in order to restrain the actual axle torque $T_o$ from becoming lower than the same target axle torque $T_{tar}$ as before the gear shift. As a result, even when the change gear ratio has been increased by the upshift, the engine torque increases to prevent the axle torque $T_o$ from decreasing. In this embodiment, accordingly, the shift shock can be relieved more effectively. Usually, however, the actual axle torque $T_o$ is greater than the target axle torque $T_{tar}$ at the upshift end recognition time $t_3$, and the throttle valve opening θ does not begin to enlarge at this point of time. Therefore, the throttle valve opening θ should preferably be enlarged after the upshift end recognition time $t_3$ as shown in FIG. 24, in anticipation of the fact that the actual axle torque $T_o$ becomes smaller than the target axle torque $T_{tar}$ after the actual shift end.

In this embodiment, during the gear shift operation, the line pressure correction is not made, and the correction of reducing the throttle valve opening θ is made. Accordingly, the line pressure of the hydraulic circuit is not lowered, and the input torque $T_t$ decreases. Consequently, the magnitude of slip of the stepped automatic transmission mechanism 30 diminishes, and the time period of the gear shift can be shortened. By the way, in FIG. 24, symbol $t_1$ denotes the point of time at which the gear shift is actually started, and symbol $t_4$ denotes the point of time at which the gear shift is actually completed.

Although, in this embodiment, the throttle valve opening is controlled in order to control the engine output, the quantity of fuel injection may well be controlled by a similar technique. Regarding an engine whose output is manipulated by controlling the quantity of fuel injection, for example, a diesel engine, it is a matter of course that a fuel injection quantity correction control ought to be performed instead of the throttle valve opening correction control.

Figure 25:
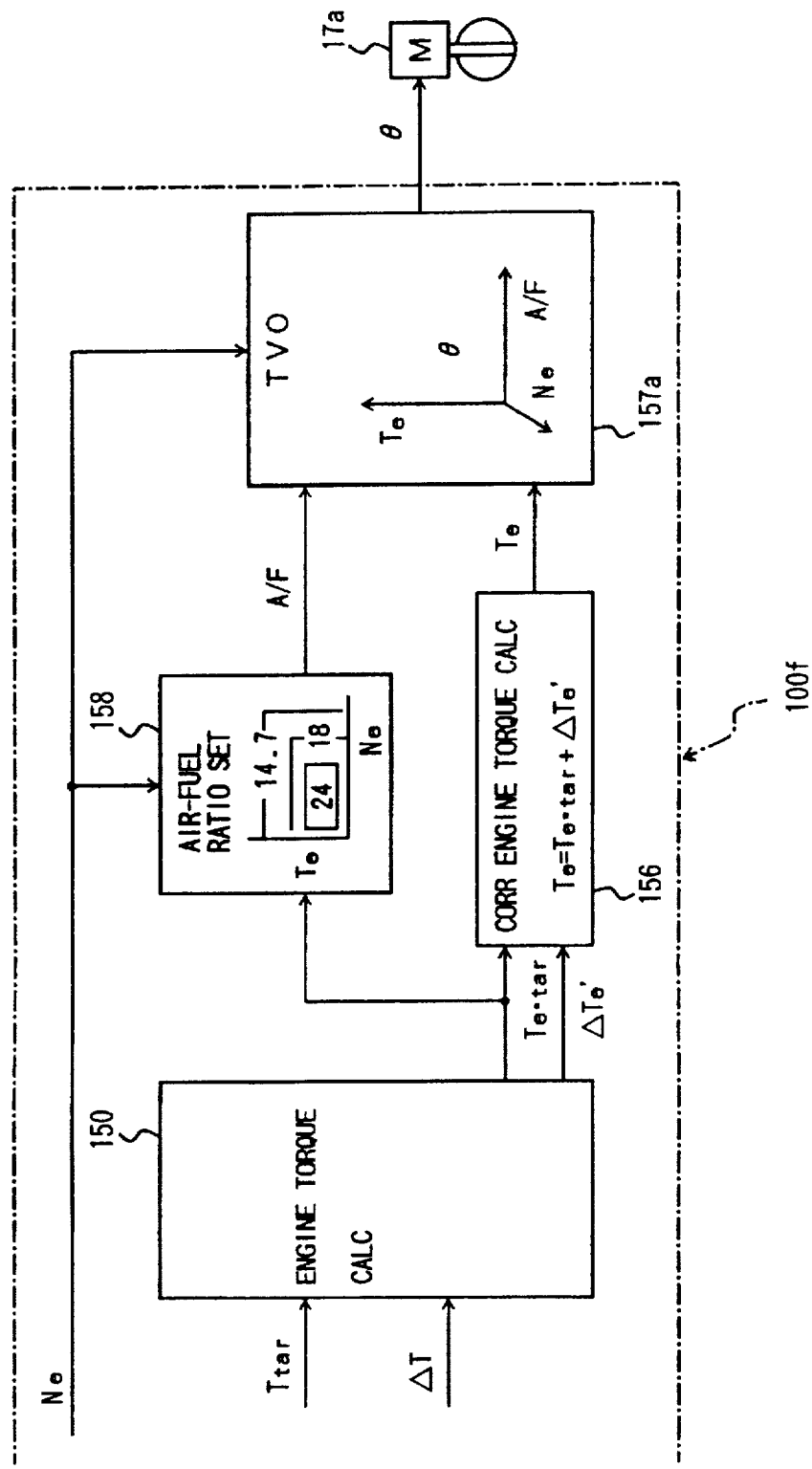
FIG. 25 is a functional block diagram of the essential portions of a controller in a modification (corresponding to a lean mixture combustion engine) to the third embodiment of the present invention.

Now, a modification to the third embodiment according to the present invention will be described with reference to FIG. 25.

In recent years, lean mixture combustion engines have been developed in order to reduce fuel costs. In the lean mixture combustion engines, combustions are performed at air-fuel ratios of, for example, 18.0 and 24.0 other than the theoretical air-fuel ratio of 14.7. This modification consists in adapting the controller 100e of the third embodiment to such a lean mixture combustion engine.

A controller 100f in this modification replaces the throttle valve opening calculation portion 157 in the third embodiment with a throttle valve opening calculation portion 157a which calculates the throttle valve opening θ in accordance with the engine r.p.m. $N_e$, engine torque $T_e$ and air-fuel ratio A/F, and an air-fuel ratio setting portion 158 which sets the air-fuel ratio A/F for use in calculating the throttle valve opening θ. The other functional construction of the controller 100f of this modification is the same as that of the controller 100e of the third embodiment. The air-fuel ratio setting portion 158 is furnished with an air-fuel ratio map which is used for setting the air-fuel ratio A/F (14.7, 18 or 24) with the target engine torque $T_{e\text{-}tar}$ and the engine r.p.m. $N_e$ as parameters. Using the air-fuel ratio map, the air-fuel ratio setting portion 158 sets the air-fuel ratio A/F which corresponds to the target engine torque $T_{e\text{-}tar}$ delivered from the engine torque calculation portion 150 and the engine r.p.m. $N_e$ measured by the engine r.p.m. sensor 73. On the other hand, the throttle valve opening calculation portion 157a is furnished with an engine characteristics map which is used for calculating the throttle valve opening θ with the engine r.p.m. $N_e$, the engine torque $T_e$ and the air-fuel ratio A/F as parameters. Using the engine characteristics map, the throttle valve opening calculation portion 157a calculates the throttle valve opening θ which corresponds to the engine r.p.m. $N_e$ measured by the engine r.p.m. sensor 73, the engine torque $T_e$ evaluated by the correctional engine torque calculation portion 156 and the air-fuel ratio A/F set by the air-fuel ratio setting portion 158. The calculated value θ is delivered to the actuator of the electronic throttle valve 17a.

When the map for determining the throttle valve opening θ with the air-fuel ratio A/F as one of the parameters is stored as stated above, the engine torque $T_e$ can be controlled to reduce the shift shock even in the lean mixture combustion engine.

Figure 26:
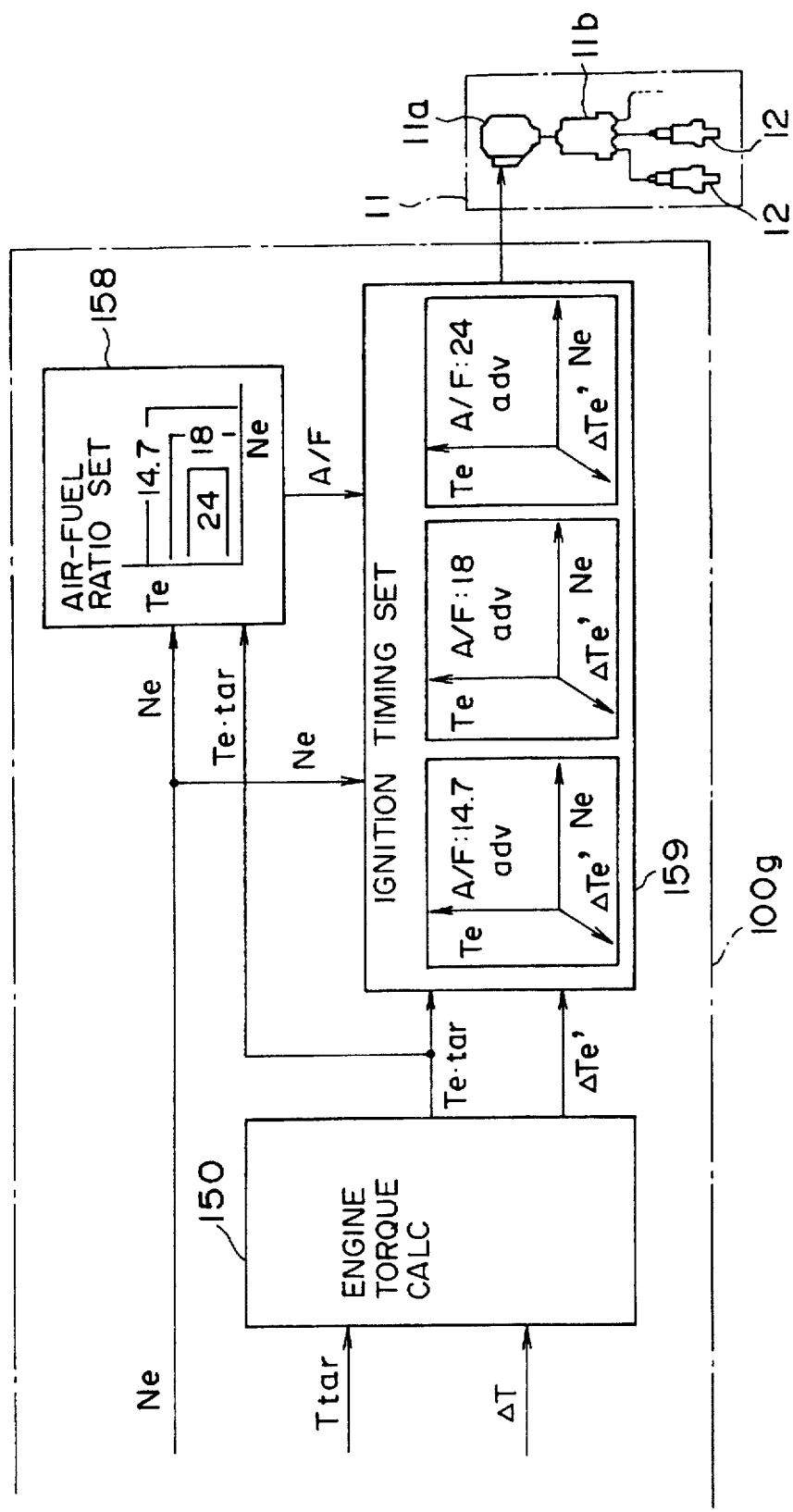
FIG. 26 is a functional block diagram of the essential portions of a controller in another modification (corresponding to the lean mixture combustion engine) to the third embodiment of the present invention.

Now, another modification to the third embodiment according to the present invention will be described with reference to FIG. 26.

This modification consists in coping with the shift shock in such a way that the engine torque $T_e$ of the lean mixture combustion engine is controlled by making the ignition timings of the ignition plugs (12 in FIG. 2) different for the respective air-fuel ratios A/F.

A controller 100g in this modification includes an ignition timing setting portion 159 which sets the ignition timings adv in accordance with the target engine torque $T_{e\text{-}tar}$ and engine torque deviation $\Delta T_e'$ calculated by the engine torque calculation portion 150, and an air-fuel ratio setting portion 158 which sets the air-fuel ratio A/F in accordance with the engine r.p.m. $N_e$ measured by the engine r.p.m. sensor 73 and the target engine torque Te-tar calculated by the engine torque calculation portion 150. As in the foregoing modification, the air-fuel ratio setting portion 158 contains the air-fuel ratio map and uses it for setting the air-fuel ratio A/F which corresponds to the engine r.p.m. $N_e$ measured by the engine r.p.m. sensor 73 and the target engine torque $T_{e\text{-}tar}$ calculated by the engine torque calculation portion 150. On the other hand, the ignition timing setting portion 159 contains the ignition timing maps of the respective air-fuel ratios A/F (14.7, 18 and 24) for setting the ignition timings adv with the engine torque deviation $\Delta T_e'$, target engine torque $T_{e\text{-}tar}$ and engine r.p.m. $N_e$ as parameters. The ignition timing setting portion 159 selects one of the plurality of ignition timing maps in accordance with the air-fuel ratio A/F set by the air-fuel ratio setting portion 158, and refers to the selected map to determine the ignition timings adv which correspond to the engine r.p.m. $N_e$ measured by the engine r.p.m. sensor 73 and the target engine torque $T_{e\text{-}tar}$ as well as the engine torque deviation $\Delta T_e'$ calculated by the engine torque calculation portion 150. A signal indicative of the ignition timings adv is delivered from the ignition timing setting portion 159 to the distributor 11b of the ignition device 11 through the igniter 11a thereof, whereby the ignition timings adv of the ignition plugs 12 are controlled.

Incidentally, since this modification controls the ignition timings of the ignition plugs 12 unlike the preceding modification or the third embodiment, it is applicable even to the automatic transmission system which is not equipped with the electronic throttle valve.

As indicated by the above embodiments and modifications, the controls of the axle torque during the gear shift operations intended to relieve the shift shocks can be performed by changing the oil line pressure of the automatic transmission system, the opening of the throttle valve and the ignition timings of the ignition plugs. Needless to say, the control can also be performed by changing the quantity of fuel injection.

Now, the fourth embodiment of the present invention will be described with reference to FIGS. 27 and 28. This embodiment pertains to the determination of the shift start, and it corresponds to any of the foregoing embodiments in relation to the other points such as the shift end and the shift shock reducing operation.

Figure 28:
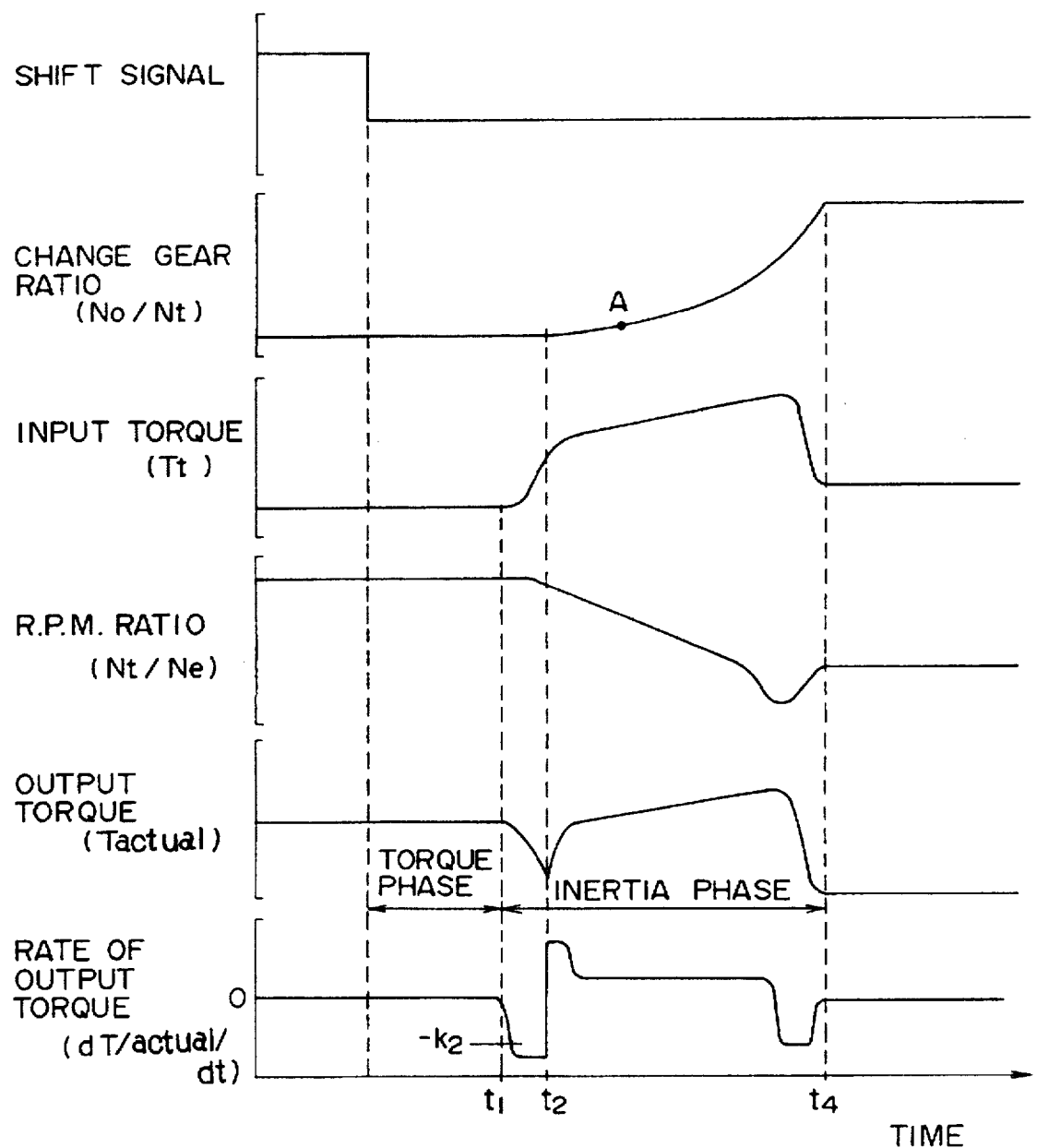
FIG. 28 is a time chart of an upshift operation in the fourth embodiment of the present invention.

As shown in FIG. 28, when the shift signal sol for the upshift has been delivered, the actual axle torque $T_{actual}$ once begins to fall abruptly at the point of time $t_1$ of the mechanical shift start. Thereafter, the actual axle torque $T_{actual}$ increases, and it becomes stable at the point of time $t_4$ of the mechanical shift end. Therefore, the timing of the mechanical shift start can be determined comparatively early by sensing the abrupt fall or depression of the actual axle torque $T_{actual}$ (the shift start is recognized at the point of time $t_2$ in this embodiment). According to this embodiment, from such a standpoint, a torque sensor 79 is mounted on the driving axle 62 (in FIG. 2), and the mechanical shift start is determined in accordance with the change of the torque value measured by the torque sensor.

Figure 27:
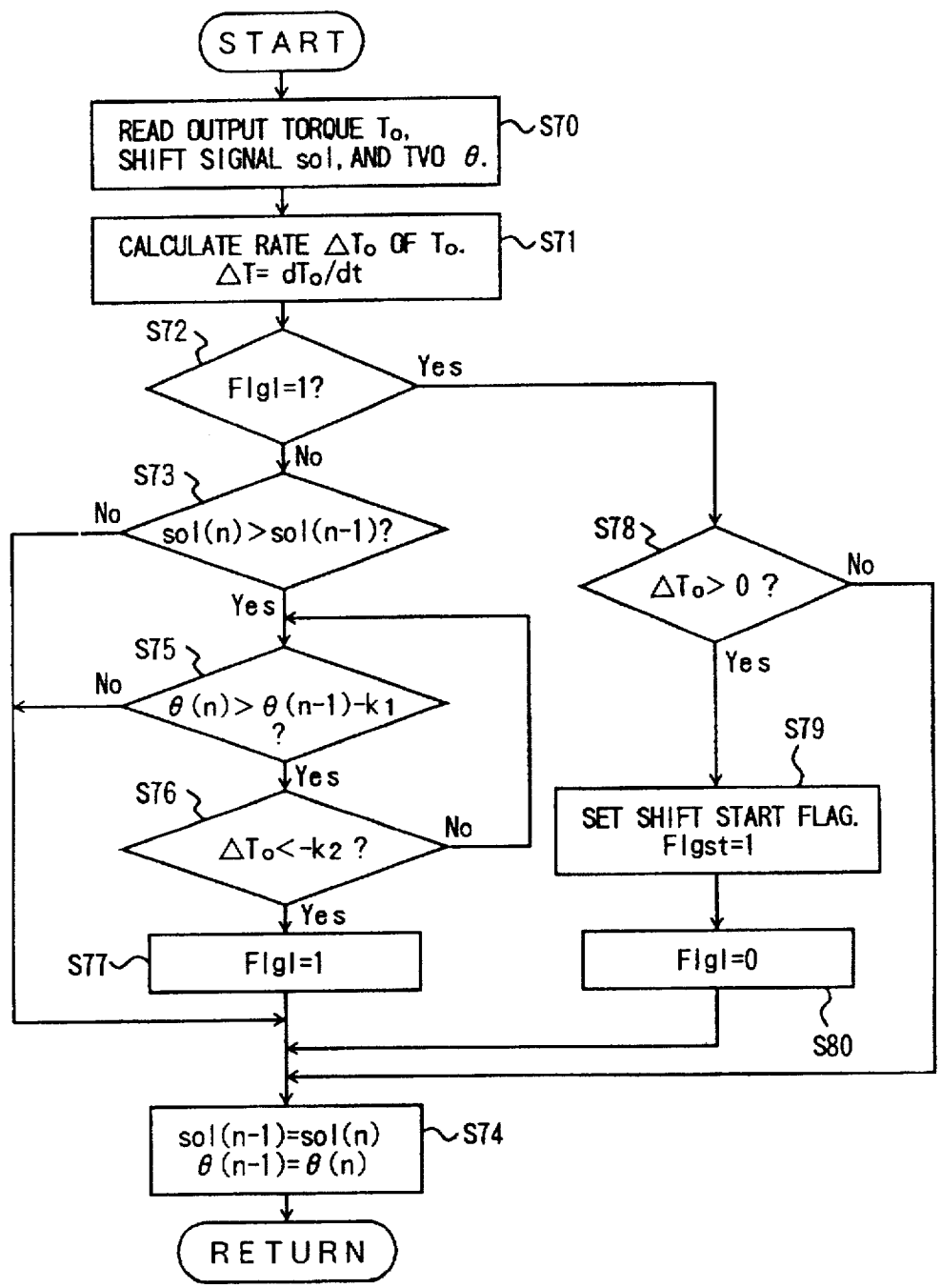
FIG. 27 is a flow chart showing shift start recognition steps in the fourth embodiment of the present invention.

FIG. 27 is a flow chart of shift start determination processing in the upshift operation.

At a step S70, the corresponding portions of the controller read the output torque $T_o$ measured by the torque sensor 79, the shift signal sol and the throttle valve opening θ. Subsequently, at a step S71, the rate of change $\Delta T_o = dT_o/dt$ of the output torque (axle torque) $T_o$ is calculated. At a step S72, whether an inertia phase start flag FlgI is "1" or "0" is decided (FlgI=1 holds when the inertia phase indicated in FIG. 28 has been started). When FlgI=0 holds at the step S72, the routine proceeds to a step S73, at which if the current shift signal sol(n) is greater than the last shift signal sol(n−1) is decided. In a case where the current shift signal sol(n) is not greater than the last shift signal sol(n−1), no gear shift is performed. At a step S74, therefore, the last shift signal sol(n−1) is set as the current shift signal sol(n), and the last throttle valve opening θ(n−1) is set as the current throttle valve opening θ(n). In a case where the current shift signal sol(n) has been decided greater than the last shift signal sol(n−1) at the step S73, the routine proceeds to a step S75. Whether or not the current throttle valve opening θ(n) exceeds a value obtained by subtracting a specified constant $k_1$ (which varies depending upon the stage of the gear shift to be performed) from the last throttle valve opening θ(n−1), is determined at the step S75. The upshift is performed when the throttle valve opening has abruptly enlarged to some extent. For this reason, the step S75 is executed in order to exclude an occasion where the throttle valve opening is merely changed to change the output torque without the performance of the upshift. In a case where the current throttle valve opening θ(n) does not exceed the value obtained by subtracting the specified constant $k_1$ from the last throttle valve opening θ(n−1), it is decided that the operation of the automatic transmission system is not in the inertia phase of the gear shift. Then, the routine proceeds to the step S74 stated before. On the other hand, in a case where the relation θ(n)>θ(n−1)−$k_1$ holds, the routine proceeds to a step S76, at which if the rate of change $\Delta T_o$ of the output torque $T_o$ is smaller than a constant −$k_2$ (which varies depending upon the stage of the gear shift to be performed) is determined. Here, when the rate of change $\Delta T_o$ of the output torque $T_o$ is not smaller than the constant −$k_2$, the state of the automatic transmission system is decided as being before the inertia phase, and the routine recedes to the step S75. In contrast, when the rate of change $\Delta T_o$ of the output torque $T_o$ is smaller than the constant −$k_2$, the state of the automatic transmission system is decided as being at the start of the inertia phase, and the routine proceeds to a step S77. The inertia phase start decision flag FlgI is set to "1" at the step S77, which is followed by the step S74. Thereafter, the routine returns. Meanwhile, when FlgI=1 holds at the step S72, whether or not the rate of change $\Delta T_o$ of the output torque $T_o$ has become greater than 0 (zero) is determined at a step S78. In a case where the rate of change $\Delta T_o$ of the output torque $T_o$ is greater than 0, it is decided that the mechanical shift has been started. In this case, a shift start flag Flgst is set to "1" at a step S79, and the inertia phase start decision flag FlgI is set to "0" at a step S80. Thereafter, the routine proceeds to the step S74 and then returns. On the other hand, in a case where the rate of change $\Delta T_o$ of the output torque $T_o$ is not greater than 0 at the step S78, the routine proceeds directly to the step S74 and then returns.

In this embodiment, that point in the inertia phase at which the rate of change $\Delta T_o$ of the output torque $T_o$ has become greater than 0, that is, at which the output torque $T_o$ has fallen most as shown in FIG. 28 is grasped as the mechanical shift start (at the time $t_2$). It is therefore possible to grasp the shift start earlier than a shift start recognition time A in the prior art.

Although, in this embodiment, the torque sensor is mounted on the driving axle 62 so as to directly detect the axle torque, this measure is not exclusive. For example, the torque of the driving axle 62 may well be obtained in such a way that a torque sensor is mounted on the propeller shaft 60 so as to detect the torque of this shaft 60, and that the detected torque is multiplied by the gear ratio of the differential 61. An alternative expedient is such that, as in the first embodiment, the input torque $T_t$ of the stepped automatic transmission mechanism 30 is calculated from the engine r.p.m. $N_e$ and the turbine r.p.m. $N_t$ without employing any torque sensor, while the change gear ratio $g_r$ during the gear shift operation is estimated on the basis of the r.p.m. values $N_e$ and $N_r$, and that the axle torque is calculated from the the change gear ratio $g_r$ and the input torque $T_r$. With this expedient, however, the axle torque is calculated from the two estimated values of the estimated value of the input torque and that of the undergoing shift change gear ratio, and it is difficult to precisely grasp the change of the axle torque. Accordingly, in the case of grasping the shift start on the basis of the axle torque, it is preferable to use the axle torque measured by the torque sensor.

Now, the fifth embodiment of the present invention will be described with reference to FIGS. 29 and 30. Likewise to the fourth embodiment, this embodiment pertains to the recognition of the mechanical shift start.

Figure 30:
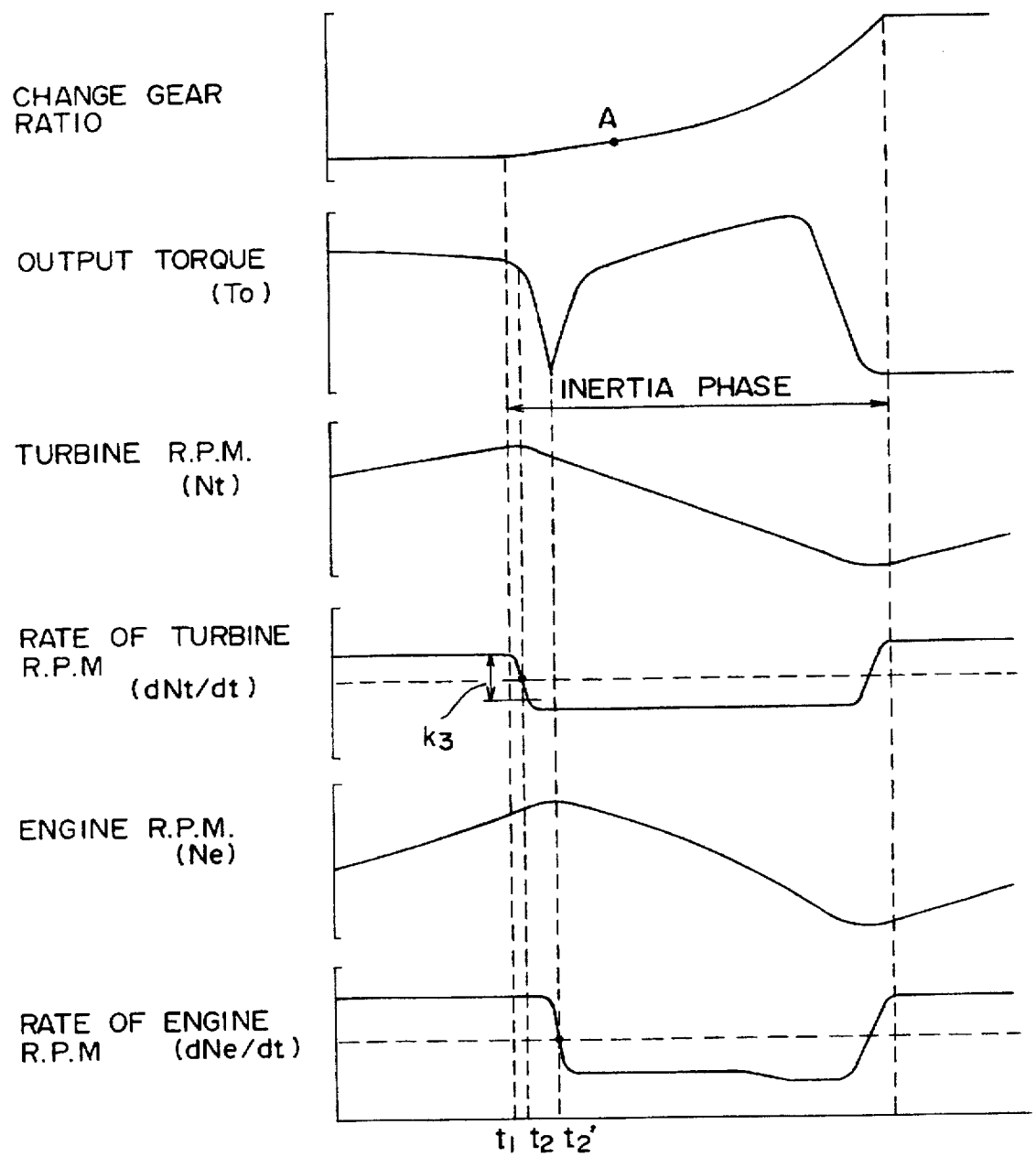
FIG. 30 is a time chart of an upshift operation in the fifth embodiment of the present invention.

As shown in FIG. 30, when the stepped automatic transmission mechanism 30 has really started the mechanical gear shift, also the rate of change $dN_r/dt$ of the turbine r.p.m. $N_t$ and the rate of change $dN_e/dt$ of the engine r.p.m. $N_e$ change abruptly. This embodiment therefore recognizes the mechanical shift start from the rate of change $dN_t/dt$ of the turbine r.p.m. $N_t$.

Figure 29:
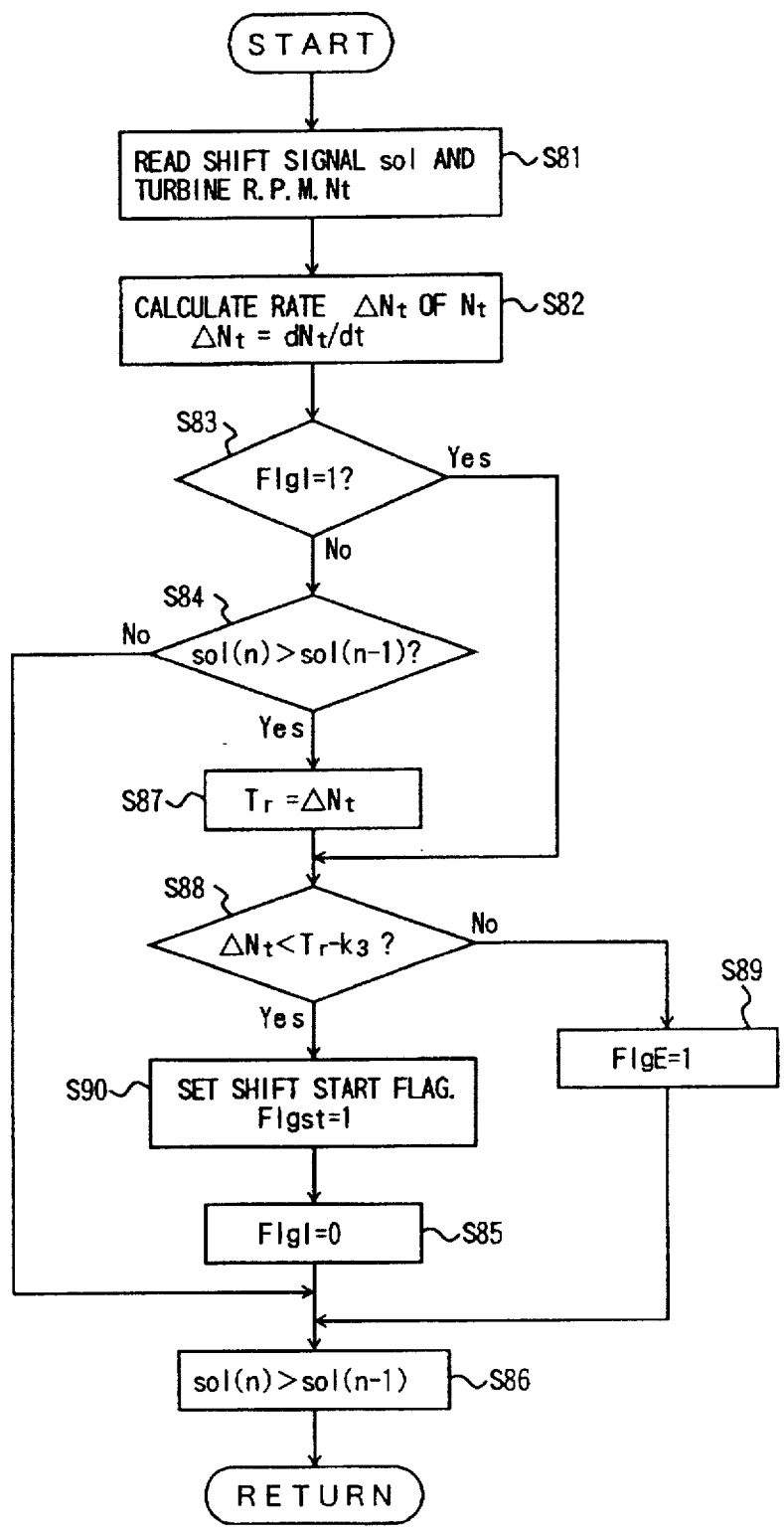
FIG. 29 is a flow chart showing shift start recognition steps in the fifth embodiment of the present invention.

FIG. 29 is a flow chart of shift start recognition processing in the upshift operation.

At a step S81, the turbine r.p.m. (torque-converter output shaft r.p.m.) $N_t$ and the shift signal sol are read. Subsequently, the rate of change $\Delta N = dN_t/dt$ of the turbine r.p.m. $N_t$ is calculated at a step S82. Thereafter, whether the inertia phase start flag FlgI is "1" or "0" is decided at a step S83. When FlgI=1 holds, the routine proceeds to a step S88. In contrast, when FlgI=0 holds, the routine proceeds to a step S84, at which if the current shift signal sol(n) is greater than the last shift signal sol(n−1) is determined. In a case where the current shift signal sol(n) is not greater than the last shift signal sol(n−1), no gear shift is performed. At a step S86, therefore, the last shift signal sol(n−1) is set as the current shift signal sol(n), whereupon the routine returns. In a case where the current shift signal sol(n) has been decided greater than the last shift signal sol(n−1) at the step S84, the gear shift is decided, and the routine proceeds to a step S87. Here at the step S87, the rate of change $\Delta N_t$ of the turbine r.p.m. $N_t$ is set as $T_r$. At the next step S88, whether or not the rate of change $\Delta N_t$ in the current cycle is smaller than a value obtained by subtracting a specified constant $k_3$ (which varies depending upon the r.p.m. $N_t$ at the shift start) from the magnitude $T_r$ (the rate of change $\Delta N_t$ of the turbine r.p.m. $N_t$ in the last cycle) is determined. When the current rate $\Delta N_t$ is smaller than the above difference of the subtraction at the step S88, it is decided that the mechanical gear shift has been started. Then, the shift start flag Flgs is set to "1" at a step S90, and the inertia phase start flag FlgI is set to "0" at a step S85. Thereafter, the step S86 is executed, and the routine returns. On the other hand, when the current rate $\Delta N_t$ is not smaller than the above difference of the subtraction at the step S88, the routine proceeds to a step S89, at which the shift signal change decision flag FlgE is set to "1". Thereafter, the step S86 is executed, and the routine returns.

As shown in FIG. 30, also in this embodiment, the shift start can be recognized (at the point of time $t_2$) earlier than the shift start recognition time A in the prior art. By the way, even when the rate of change different from the the rate of change $dN_t/dt$ of the turbine r.p.m. $N_t$, such as the aforementioned rate of change $dN_e/dt$ of the engine r.p.m. $N_e$ or the rate of change $dN_o/dt$ of the axle r.p.m. $N_o$, is used, the shift start can be recognized earlier than the shift start recognition time A in the prior art, in the same manner as in this embodiment.

Figure 31:
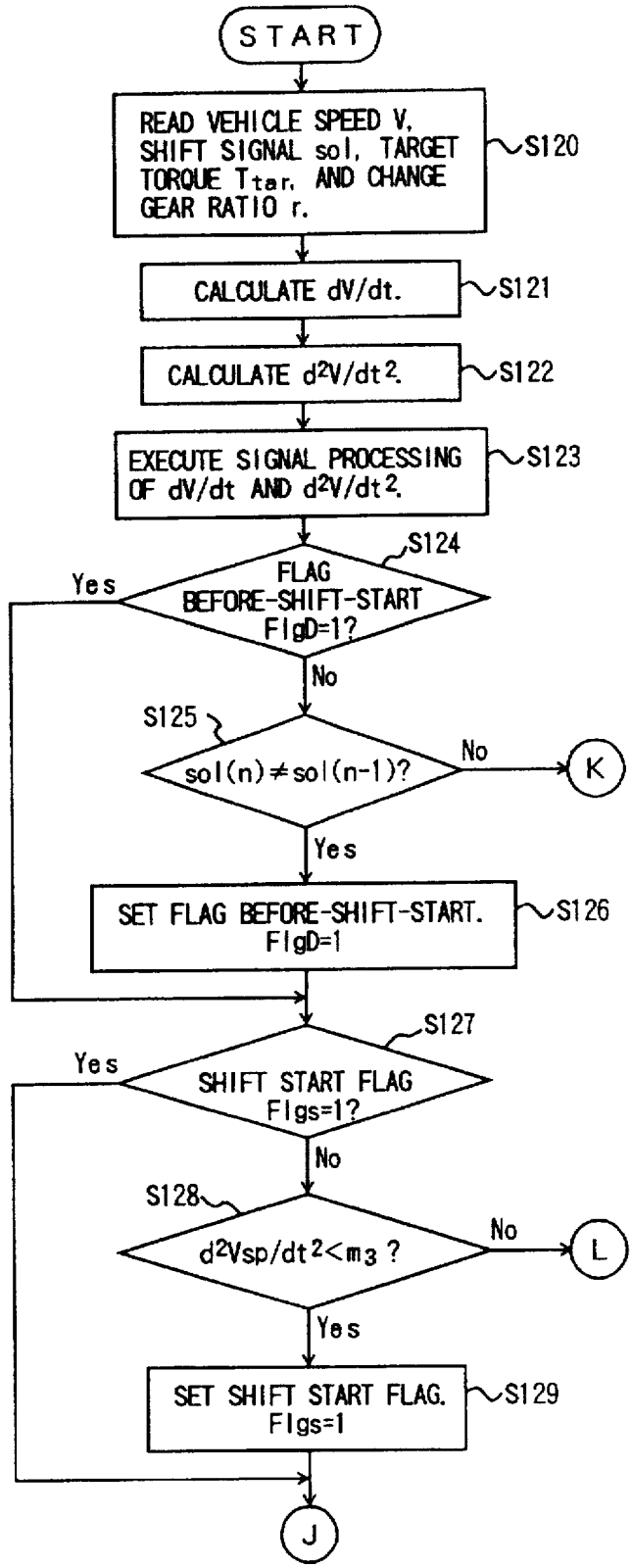
FIGS. 31 and 32 are flow charts showing a gear shift control operation in the sixth embodiment of the present invention.
Figure 32:
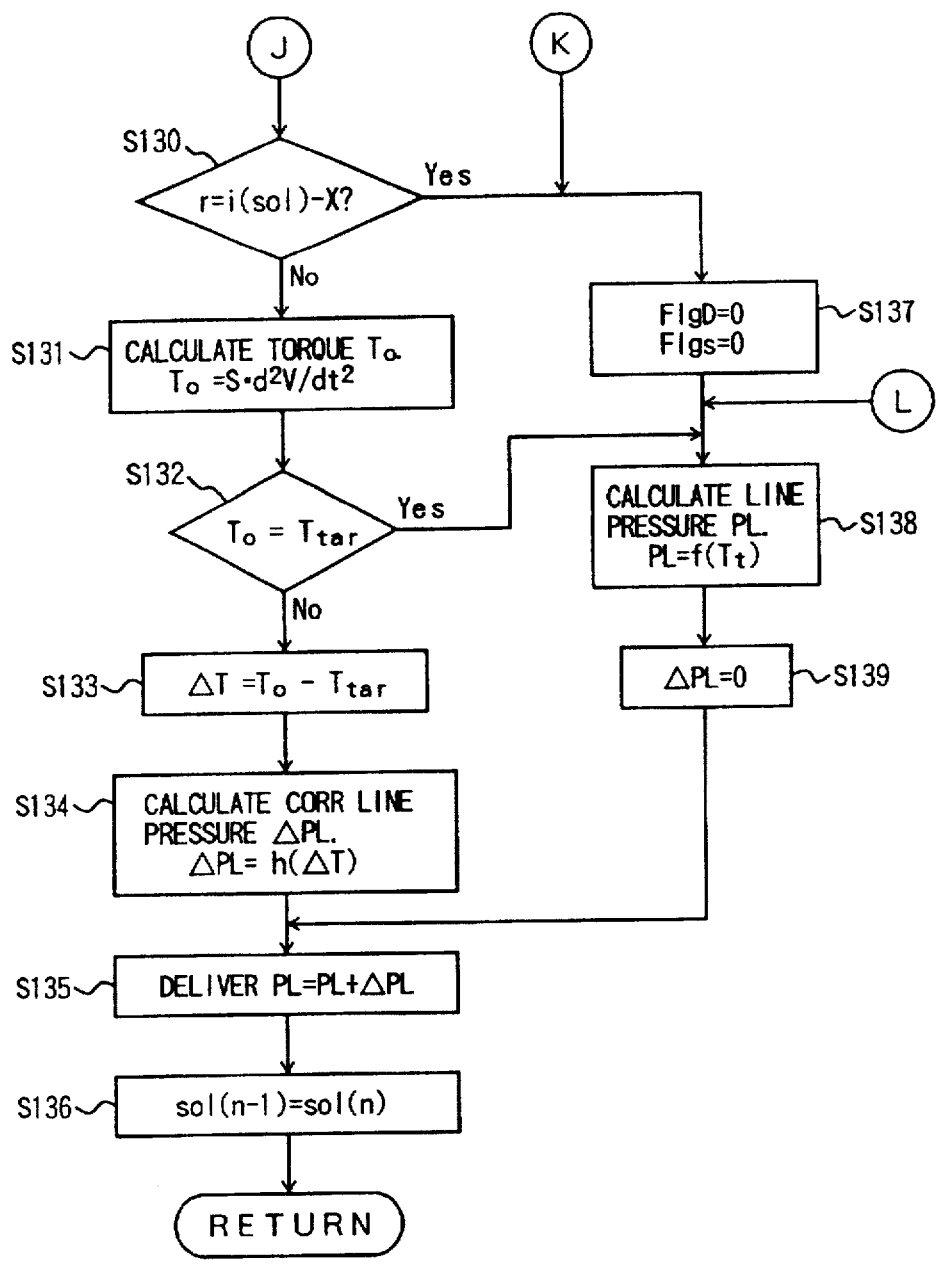

Now, the sixth embodiment of the present invention will be described with reference to FIGS. 31–33. Likewise to the fourth and fifth embodiments, this embodiment pertains to the recognition of the mechanical shift start.

Figure 33:
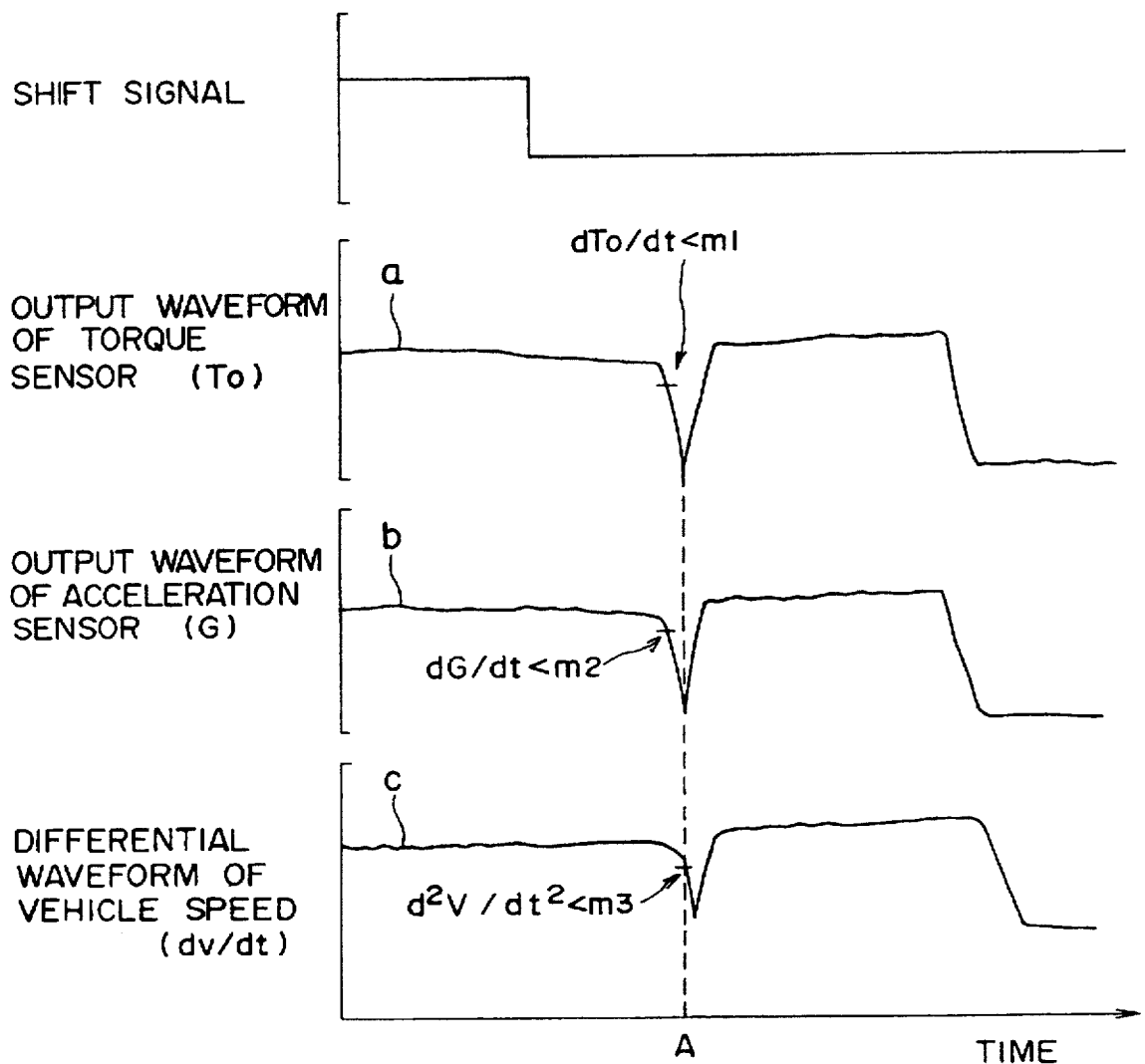
FIG. 33 is a graph showing the changes of an acceleration etc. during an upshift operation.

FIG. 33 shows waveforms which correspond to the output torque in the gear shift operation. Letter a indicates the output waveform of a torque sensor, letter b indicates the output waveform of an acceleration sensor, and letter c indicates the differential waveform of the speed of a vehicle. The acceleration of the vehicle and the differentiation of the vehicle speed are basically the same, and they are in proportional relationships with the torque of the driving axle. Accordingly, the mechanical shift start can be recognized from the change of the acceleration of the vehicle or the differentiation of the vehicle speed, in the same manner as in the fourth embodiment in which the mechanical shift start is recognized from the change of the axle torque. In FIG. 33, the shift start can be detected at each of points denoted by $dT_o/dt < m1$, $dG/dt < m2$ and $d^2V/dt^2 < m3$.

The case of recognizing the shift start by the use of the differentiation of the vehicle speed among these waveforms will be explained in conjunction with flow charts shown in FIGS. 31 and 32.

At a step S120, the vehicle speed v, shift signal sol, target axle torque $T_{tar}$ and undergoing shift change gear ratio r are read. Subsequently, $dV/dt$ and $d^2V/dt^2$ are respectively calculated at steps S121 and S122, and signal processing such as averaging the calculated values is executed at a step S123. Thereafter, whether or not a flag before-shift-start FlgD is "1" is decided at a step S124. When the flag FlgD is not "1", the routine proceeds to a step S125, and when the flag FlgD is "1", the routine proceeds to a step S127. At the step S125, if the current shift signal sol(n) differs from the last shift signal sol(n−1) is determined. When the signals sol(n) and sol(n−1) are not equal, the routine proceeds to a step S126. In contrast, when they are equal, it is decided that the gear shift has already ended, and the routine proceeds to a step S137 as indicated by (K). The flag before-shift-start FlgD is set to "1" at the step S126, which is followed by the step S127. Here at the step S127, whether or not the shift start flag Flgs is "1" is decided. When the flag Flgs is not "1", it is decided that the gear shift is not progressing, and the routine proceeds to a step S128. In contrast, when the flag Flgs is "1", it is decided that the gear shift is progressing, and the routine proceeds to a step S130 as indicated by (J). At the step S128, whether or not the stepped automatic transmission mechanism 30 is at the shift start is decided depending upon whether or not the differential value $d^2V/dt^2$ of the acceleration (the differentiation of the vehicle speed) is smaller than the constant $m_3$. When the differential value $d^2V/dt^2$ is smaller, the shift start is decided, and the routine proceeds to a step S129. In contrast, when the differential value $d^2V/dt^2$ is not smaller, it is decided that the mechanism 30 is still in a state before the gear shift, and the routine proceeds to a step S138 as indicated by (L). The shift start flag Flgs is set to "1" at the step S129, which is followed by the step S130. Here at the step S130, whether or not the gear shift has ended is determined in conformity with the change gear ratio r=i (sol)−x. When the gear shift has ended, the routine proceeds to the step S137, and when not, the routine proceeds to a step S131. At the step S130, the shift end is decided depending upon whether or not the undergoing shift change gear ratio r has exceeded a value obtained by subtracting a predetermined value X from a change gear ratio i (sol) indicated by the shift signal sol. At the step S131, the actual axle torque $T_o$ is calculated in conformity with $T_o = S \cdot (d^2V/dt^2)$ (where S denotes an inertial load during the rotation of the driving axle 62) by the use of the acceleration value $d^2V/dt^2$ obtained before. Subsequently, whether or not the actual axle torque $T_o$ and the target axle torque $T_{tar}$ are equal is decided at a step S132. The routine proceeds to the step S138 when the torques $T_o$ and $T_{tar}$ are equal, and to a step S133 when not. The difference $\Delta T$ between the torques $T_o$ and $T_{tar}$ is calculated at the step S133, and a correctional line pressure $\Delta PL$ is calculated at a step S134 by substituting the difference $\Delta T$ into a function $\Delta PL=h(\Delta T)$ prepared beforehand. Further, at a step S135, $PL=PL+\Delta PL$ is calculated, and the duty value of the line pressure of the hydraulic control circuit 50 is delivered to the solenoid of the line pressure control valve 52. Lastly, the current shift signal sol(n) is set as the last shift signal sol(n−1) at a step S136, whereupon the routine returns. Meanwhile, at the step S137 following the case where sol(n)≠sol(n−1) has held at the step S125 or the case where r=i(sol)−X has held at the step S130, the flag before-shift-start FlgD and the shift start flag Flgs are set to "0". Further, the line pressure PL is calculated in conformity with a function $f(T_t)$ of the input torque $T_t$ at the step S138, and the correctional line pressure $\Delta PL$ is set to 0 (zero) at a step S139. Thereafter, the routine proceeds to the step S135.

Figure 34:
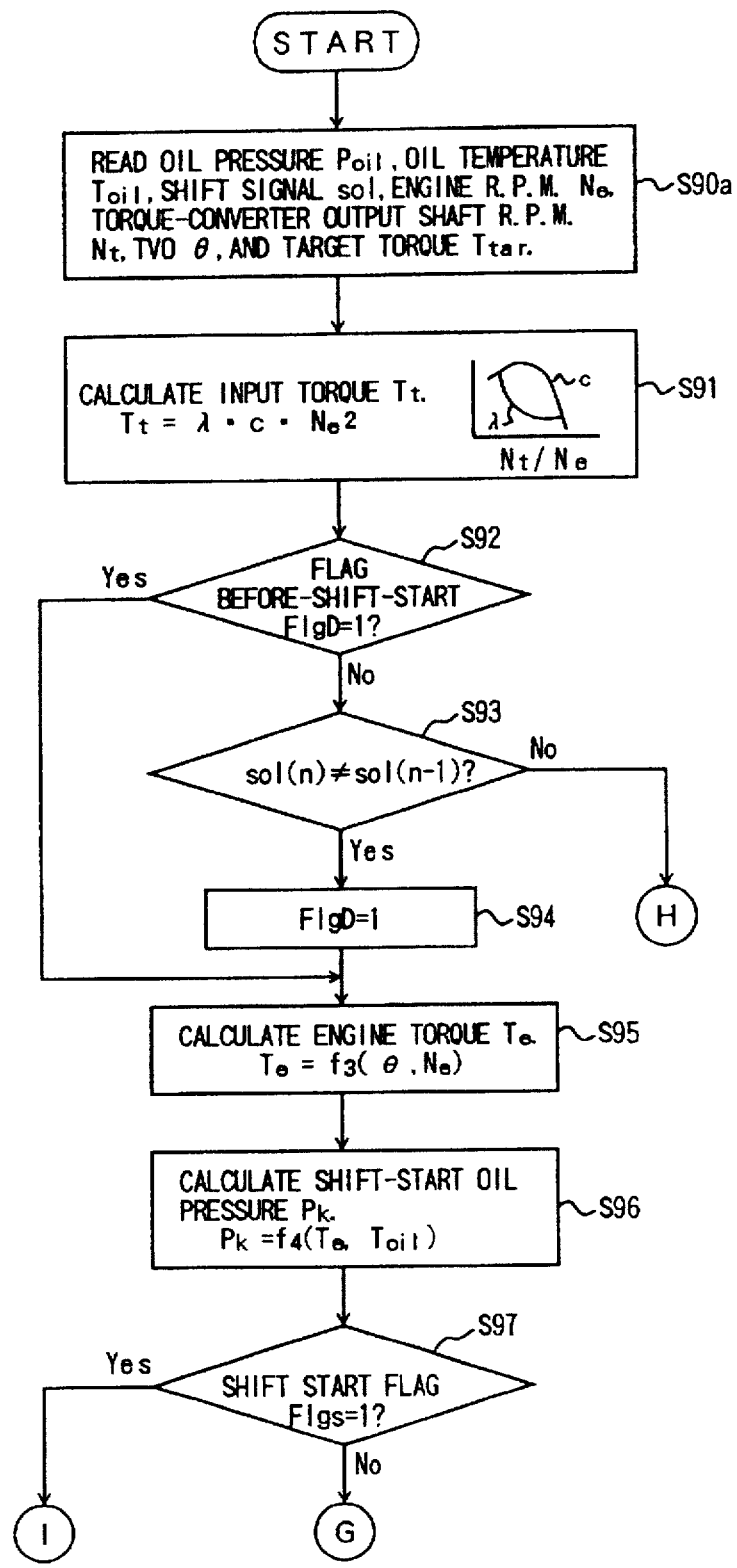
FIGS. 34 and 35 are flow charts showing a gear shift control operation in the seventh embodiment of the present invention.
Figure 35:
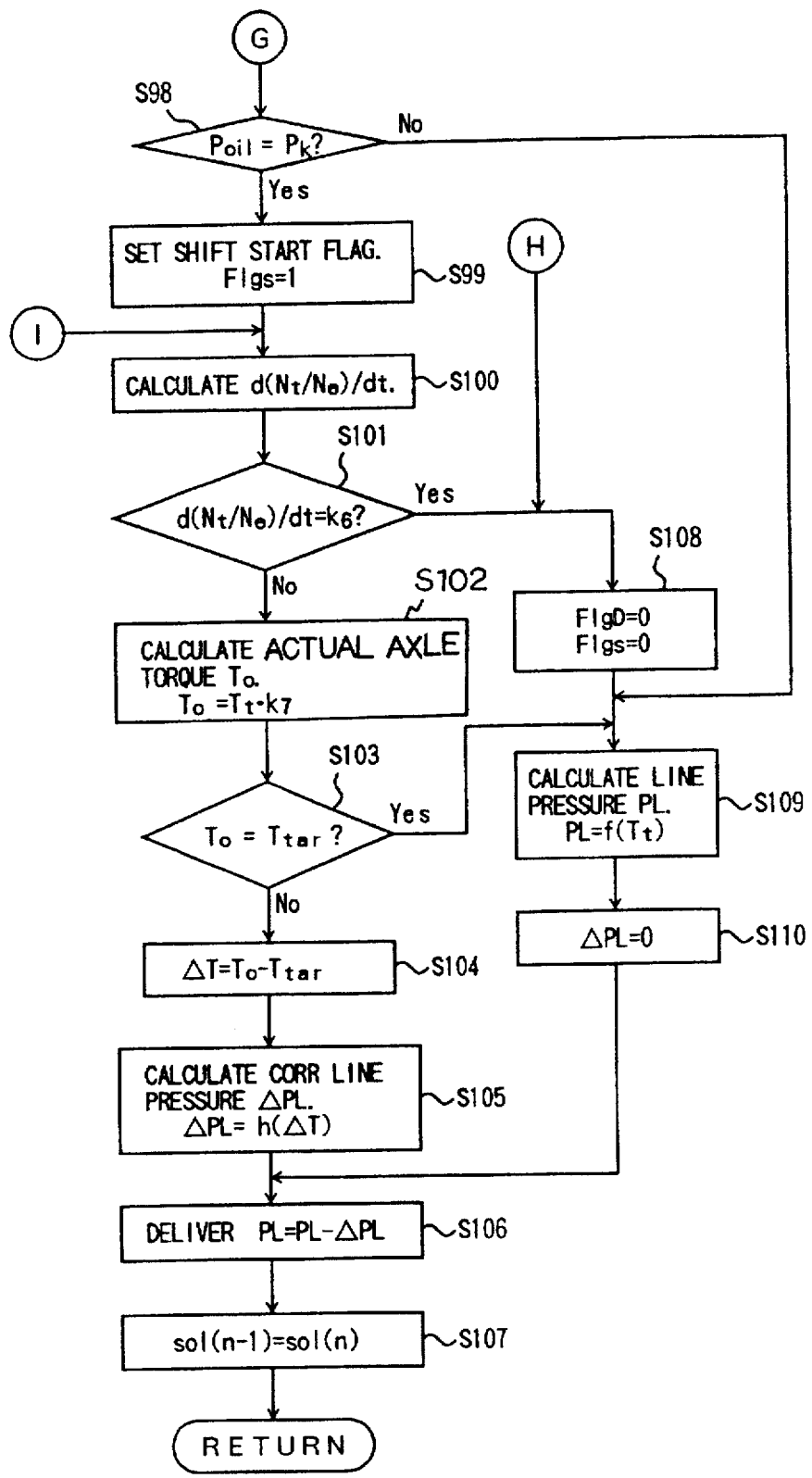

Now, the seventh embodiment of the present invention will be described with reference to FIGS. 34 and 35. This embodiment consists in that the shift start is recognized from the change of the oil pressure of the hydraulic control circuit 50 as sensed by the oil pressure sensor 76 (shown in FIG. 2). By the way, this embodiment is identical in the hardware architecture to the first embodiment and is different in the software architecture therefrom. Accordingly, the software architecture of this embodiment shall be described in relation to the operation thereof based on flow charts shown in FIGS. 34 and 35.

At a step S90a, the corresponding portions of the controller 100 read the oil pressure $P_{oil}$ and oil temperature $T_{oil}$ of the hydraulic control circuit 50, the shift signal sol, the engine r.p.m. $N_e$, the torque-converter output shaft r.p.m. (turbine r.p.m.) $N_t$, the throttle valve opening $\theta$ and the target axle torque $T_{tar}$. Subsequently, the input torque $T_t$ of the stepped automatic transmission mechanism 30 is calculated from the engine r.p.m. $N_e$ and torque converter characteristics at a step S91, which is followed by a step S92. Here at the step S92, whether or not the flag before-shift-start FlgD is "1" is determined. The routine proceeds to a step S95 when the flag FlgD is "1", and to a step S93 when not. At the step S93, whether or not the current shift signal sol(n) differs from the last shift signal sol (n−1) is determined. When the shift signals sol(n) and sol(n−1) are different, the routine proceeds to a step S94, and when they are equal, the routine proceeds to a step S108 as indicated by symbol Ⓗ. At the step S94, the flag before-shift-start FlgD is set to "1". At the step S95, the engine torque $T_e$ is calculated by a function $f_3(\theta, N_e)$. The characteristics of the torque converter 25 change depending upon the oil temperature $T_{oil}$. Therefore, the oil temperature $T_{oil}$ needs to be considered also in the case of recognizing the shift start in accordance with the value of the oil pressure $P_{oil}$. In order to set an oil pressure level $P_k$ for deciding the time of the shift start, accordingly, the oil pressure level $P_k$ is calculated at a step S96 in such a way that the engine torque $T_e$ and oil temperature $T_{oil}$ during the gear shift operation are substituted into a function $f_4(T_e, T_{oil})$ prepared beforehand.

Subsequently, whether or not the shift start flag Flgs is "1" is determined at a step S97. When the flag Flgs is "1", the routine proceeds to a step S100 as indicated by symbol Ⓘ, and when not, the routine proceeds to a step S98 as indicated by symbol Ⓖ. At the step S98, whether or not the value $P_{oil}$ delivered from the oil pressure sensor 76 agrees with the oil pressure $P_k$ obtained at the step S96 is determined. When the values $P_{oil}$ and $P_k$ do not agree, the routine proceeds to a step S109. In contrast, when the values $P_{oil}$ and $P_k$ agree, the state of the transmission mechanism 30 is decided as being at the shift start, the routine proceeds to a step S99, at which the shift start flag Flgs is set to "1". At the next step S100, the differential value $d(N_t/N_e)/dt$ of the r.p.m. ratio $(N_t/N_e)$ is calculated. Further, whether or not the value $d(N_t/N_e)/dt$ is smaller than a constant $k_6$ is determined at a step S101. When the value $d(N_t/N_e)/dt$ is not smaller than the constant $k_6$, the state of the transmission mechanism 30 is decided as being at the shift end, and the routine proceeds to the step S108. On the other hand, when the value $d(N_t/N_e)/dt$ is smaller than the constant $k_6$, the state of the transmission mechanism 30 is decided as being in the duration of gear shift operation, and the routine proceeds to a step S102. Here at the step S102, the actual axle torque $T_o$ is calculated. Subsequently, whether or not the actual axle torque $T_o$ and the target axle torque $T_{tar}$ are equal is determined at a step S103. The routine proceeds to the step S109 when the torques $T_o$ and $T_{tar}$ are equal, and to a step S104 when not. The difference $\Delta T$ between the torques $T_o$ and $T_{tar}$ is calculated at the step S104, and a correctional line pressure $\Delta PL$ is calculated at a step S05 by substituting the difference $\Delta T$ into a function $h(\Delta T)$ prepared beforehand. Further, at a step S106, $PL=PL+\Delta PL$ is calculated, and the duty value of the line pressure of the hydraulic control circuit 50 is delivered to the solenoid of the line pressure control valve 52. Lastly, the current shift signal sol(n) is set as the last shift signal sol(n−1) at a step S107, whereupon the routine returns. Meanwhile, at the step S108 following the case where sol(n)=sol(n−1) has held at the step S93, the case where $P_k \neq P_{oil}$ has held at the step S98, or the case where $d(N_t/N_e)/dt=k_6$ has held at the step S101, the flag before-shift-start FlgD and the shift start flag Flgs are set to "0". Further, the line pressure PL is calculated in conformity with a function $f(T_t)$ of the input torque $T_t$ at the step S109, and the correctional line pressure $\Delta PL$ is set to 0 (zero) at a step S110. Thereafter, the routine proceeds to the step S106.

As stated above, according to this embodiment, the shift start time of the stepped automatic transmission mechanism 30 is recognized on the basis of that change of the oil pressure of the shifting hydraulic control circuit 50 which forms the beginning of the change of the change gear ratio. Therefore, the shift start time can be recognized earlier than in the case of recognizing the mechanical shift start time on the basis of the change gear ratio.

The line pressure correction controls are performed in the sixth and seventh embodiments. Also in these embodiments, the throttle valve opening correction control may well be performed as in the third embodiment.

Now, the eighth embodiment of the present invention will be described with reference to FIGS. 36–39.

Figure 36:
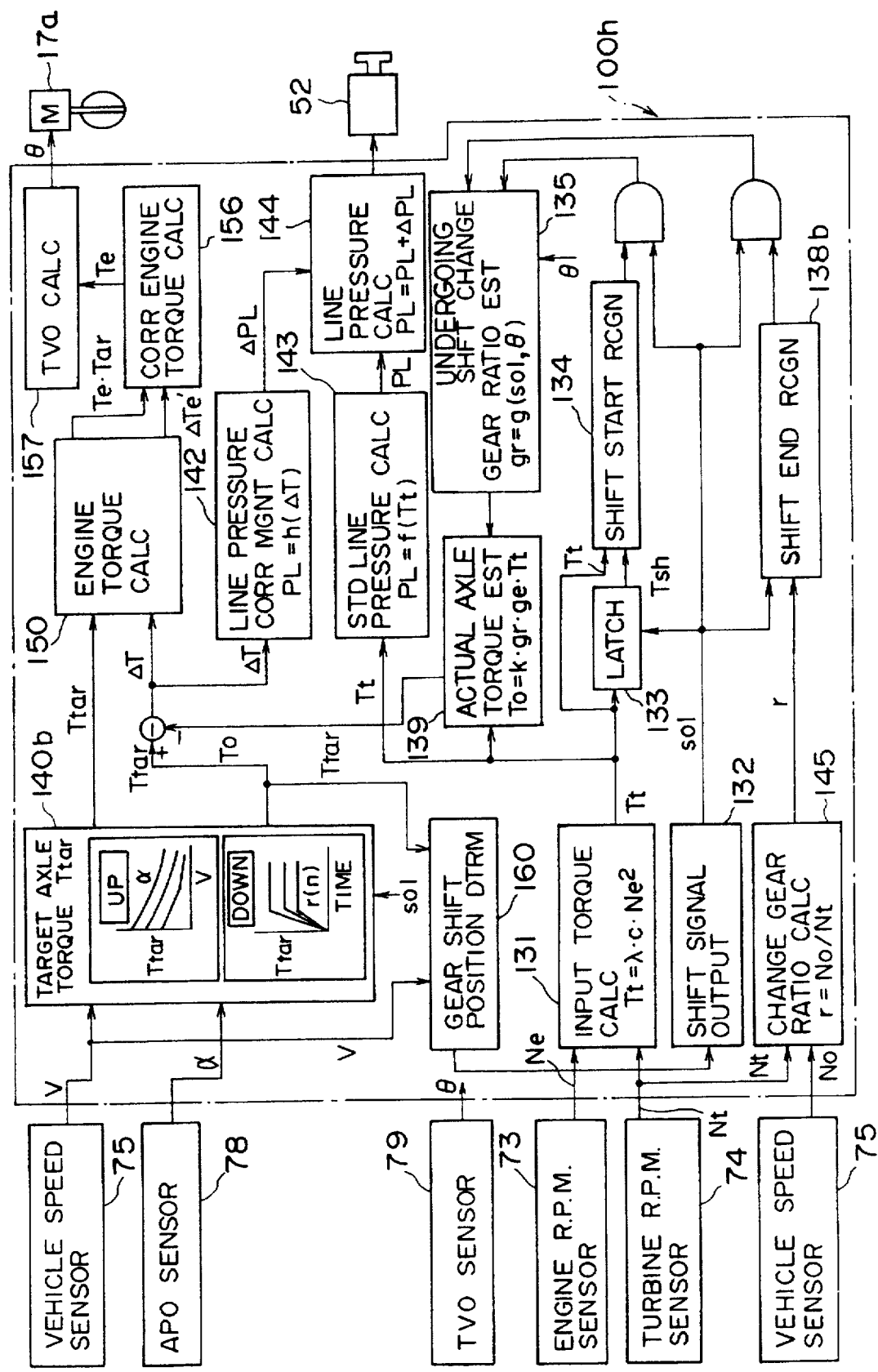
FIG. 36 is a functional block diagram of a controller in the eighth embodiment of the present invention.

This embodiment consists in combining the modification (in FIG. 15) of the first embodiment in which the line pressure correction control is performed, and the third embodiment (in FIG. 22) in which the throttle valve opening correction control is performed, in order to perform both the line pressure correction control and the throttle valve opening correction control in the gear shift operation. As shown in FIG. 36, accordingly, a controller 100h in this embodiment is the same as in the modification (in FIG. 15) of the first embodiment in relation to the recognition of the mechanical shift start as well as shift end and the functions concerning the line pressure correction control (131, . . . , 135, 138b, 139, 141, . . . 144), and it is basically the same as in the third embodiment (in FIG. 22) in relation to the functions concerning the throttle valve opening correction control (140b, 150, 156, 157). In this regard, unlike the target axle torque calculation portion 140a in the third embodiment, the target axle torque calculation portion 140b contains an upshifting target axle torque map for determining target axle torques in the upshift operation and in the operation other than during the gear shift operation, and a downshifting target axle torque map for determining a target axle torque in the downshift operation. The upshifting target axle torque map is the same as in the third embodiment, and is used for deriving the target axle torque $T_{tar}$ in accordance with the vehicle speed V and the accelerator pedal opening α. On the other hand, the downshifting target axle torque map is used for deriving the target axle torque $T_{tar}$ in accordance with the gear shift position indicated by the shift signal sol and a time period elapsed since the shift start recognition time $t_2$.

Figure 37:
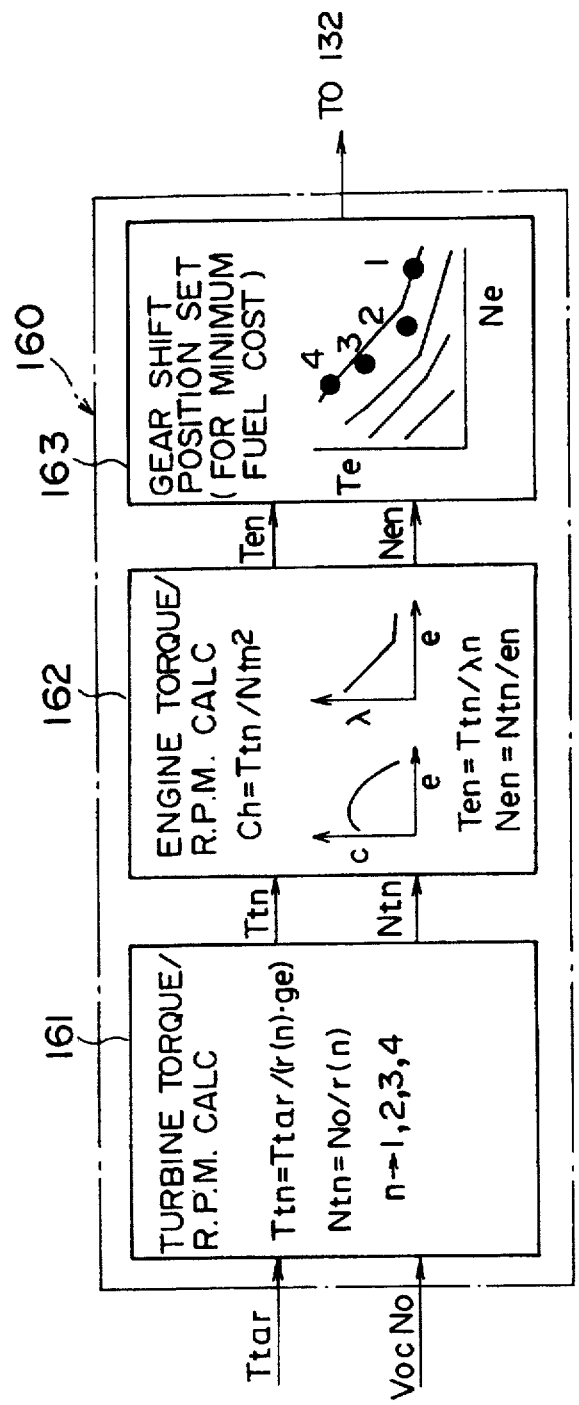
FIG. 37 is a functional block diagram of a gear shift position determining portion in the eighth embodiment of the present invention.

Besides, in order to enhance the fuel cost performance of the engine 10, the controller 100h of this embodiment includes a shift position determination portion 160 for determining the gear shift position which affords the minimum fuel cost. As shown in FIG. 37, the shift position determination portion 160 includes a turbine torque/r.p.m. calculator 161, an engine torque/r.p.m. calculator 162 and a shift position setter 163. The turbine torque/r.p.m. calculator 161 calculates the turbine r.p.m. $N_{tn}$ (n: 1, 2, 3, 4 in case of a 4-speed change gear) of each gear shift position in such a way that the r.p.m. $N_o$ of the propeller shaft 60 measured by the vehicle speed sensor 75 is divided by the change gear ratio $r(n)$ at the corresponding gear shift position. It also calculates the target turbine torque $T_{tn}$ (n: 1, 2, 3, 4 in the case of the 4-speed change gear) of each gear shift position in such a way that the target axle torque $T_{tar}$ is divided by the change gear ratio $r(n)$ at the corresponding gear shift position and the gear ratio $g_e$ of the differential 61. Besides, the turbine r.p.m. $N_{tn}$ of each gear shift position and the target turbine torque $T_{tn}$ thereof are respectively converted into the engine r.p.m. $N_{en}$ of each gear shift position and the target engine torque $T_{en}$ thereof on the basis of the characteristics of the torque converter 25 by the engine torque/r.p.m. calculator 162. Further, the shift position setter 163 sets the gear shift position of the minimum fuel cost in accordance with the engine r.p.m. $N_{en}$ of each gear shift position and the target engine torque $T_{en}$ thereof.

Now, the operation of the controller 100h of this embodiment will be described.

Figure 38:
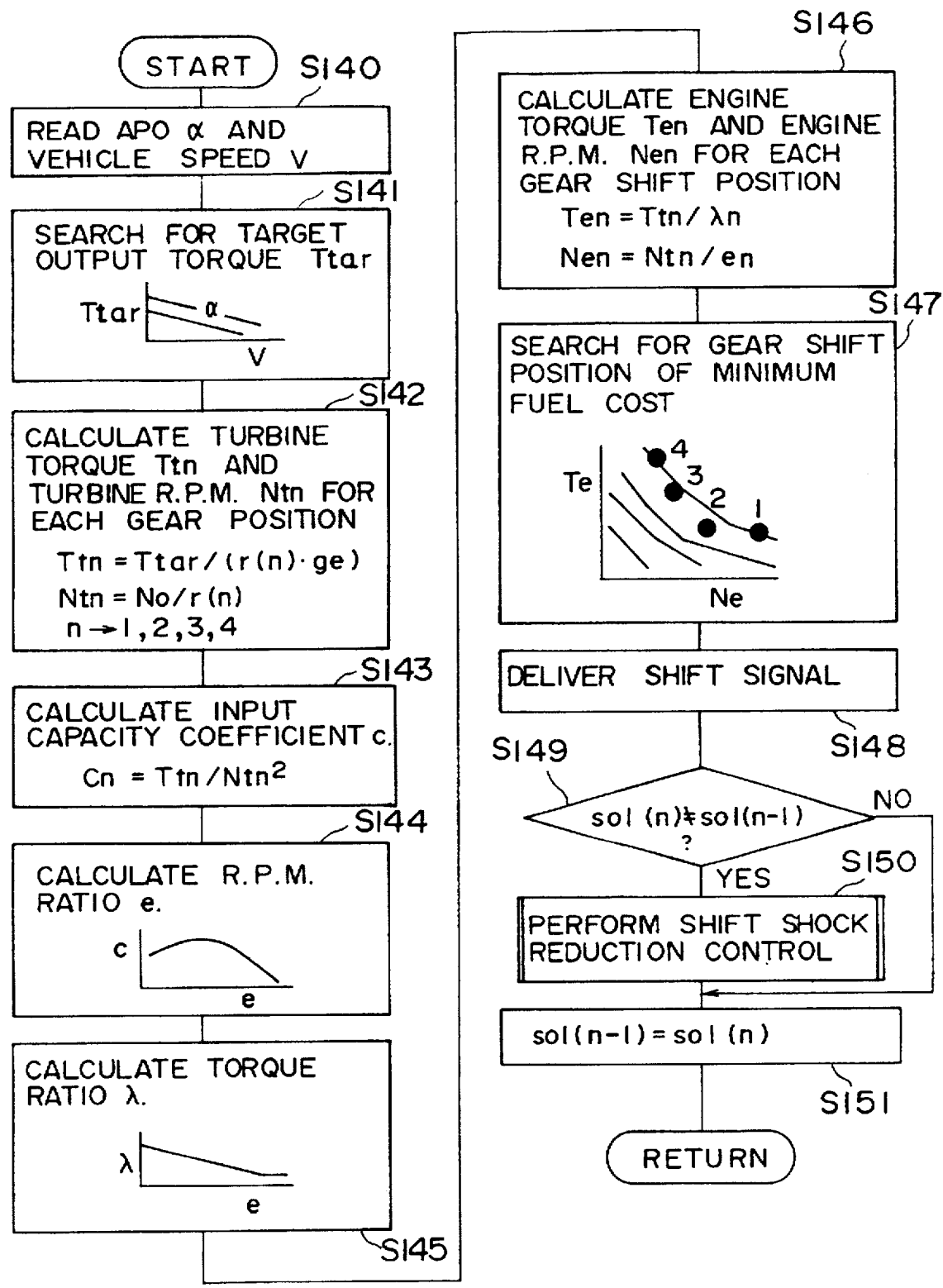
FIG. 38 is a flow chart showing shift position determination steps for the minimum fuel cost in the eighth embodiment of the present invention.

First, the operation of setting the gear shift position of the minimum fuel cost will be explained in conjunction with a flow chart shown in FIG. 38.

At a step S140, the accelerator pedal opening α and the vehicle speed V are read. Subsequently, the target axle torque $T_{tar}$ corresponding to the read values α and V is searched for at a step S141 by the use of the upshifting target axle torque map which serves to determine the target axle torque in the operation other than the gear shift operation or in the upshift operation. At a step S142, the turbine torque/r.p.m. calculator 161 of the shift position determination portion 160 calculates the turbine r.p.m. values $N_{tn}$ (n: 1, 2, 3, 4 in the case of the 4-speed change gear) of the respective gear shift positions in the way that the r.p.m. $N_o$ of the propeller shaft 60 measured by the vehicle speed sensor 75 is divided by the change gear ratios $r(n)$ at the corresponding gear shift positions, and it also calculates the target turbine torques $T_{tn}$ (n: 1, 2, 3, 4 in the case of the 4-speed change gear) of the respective gear shift positions in the way that the target axle torque $T_{tar}$ is divided by the change gear ratios $r(n)$ at the corresponding gear shift positions and the gear ratio $g_e$ of the differential 61. At a step S143, the input capacity coefficients $c_n$ ($=T_{tn}/N_{tn}^2$) of the torque converter 25 at the respective gear shift positions are calculated by the use of the target turbine torques $T_{tn}$ and turbine r.p.m. values $N_{tn}$ obtained at the step S142. At a step S144, the r.p.m. ratios en of the torque converter 25 at the respective gear shift positions are evaluated from the torque converter characteristics and the input capacity coefficients $c_n$ obtained at the step S143. Further, at a step S145, the torque ratios $λ_n$ of the torque converter 25 at the respective gear shift positions are evaluated from the torque converter characteristics and the r.p.m. ratios $e_n$ obtained at the step S144. At the next step S146, the engine r.p.m. values $N_{en}$ ($=N_{tn}/e_n$) at the respective gear shift positions are calculated using the r.p.m. ratios $e_n$ obtained at the step S144, and the engine torques $T_{en}$ ($=T_{tn}/λ_n$) at the respective gear shift positions are calculated using the torque ratios $λ_n$ obtained at the step S145. The above steps S143–S146 are executed by the engine torque/r.p.m. calculator 162 of the shift position determination portion 160. At a step S147, the shift position setter 163 plots points which are determined depending upon the engine torques $T_{en}$ and engine r.p.m. values $N_{en}$ for the respective gear shift positions, in a map of fuel consumption quantities $Q_f$. Besides, it decides the gear shift position of the point nearest the origin of the map, as the gear shift position of the minimum fuel cost, and it delivers the decided gear shift position to the shift signal output portion 132. Then, the shift signal output portion 132 delivers the shift signal sol indicative of the gear shift position set by the shift position setter 163, at a step S148. Subsequently, whether or not the above shift signal sol(n) differs from the last shift signal sol(n−1) is determined at a step S149. The routine proceeds to a step S151 when the shift signals sol(n) and sol(n−1) are not different, and to a step S150 when they are different. A subroutine for a shift shock reduction control is executed at the step S150, which is followed by the step S151. Lastly, the current shift signal sol(n) is set as the last shift signal sol(n−1) at the step S151, whereupon the routine returns.

Next, the operation of the shift shock reduction control will be explained.

Figure 10:
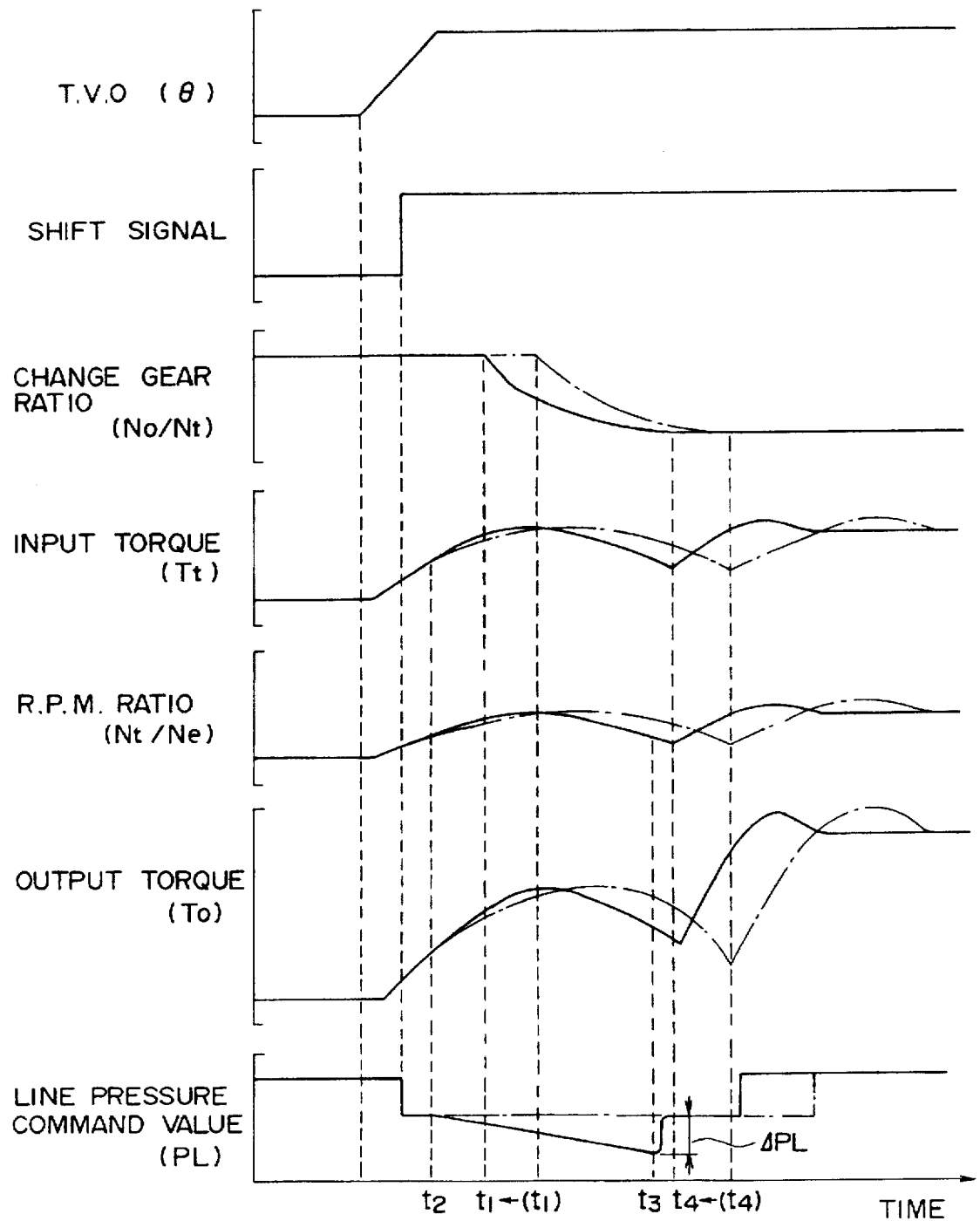
FIG. 10 is a time chart of a downshift operation in the first embodiment of the present invention.
Figure 39:
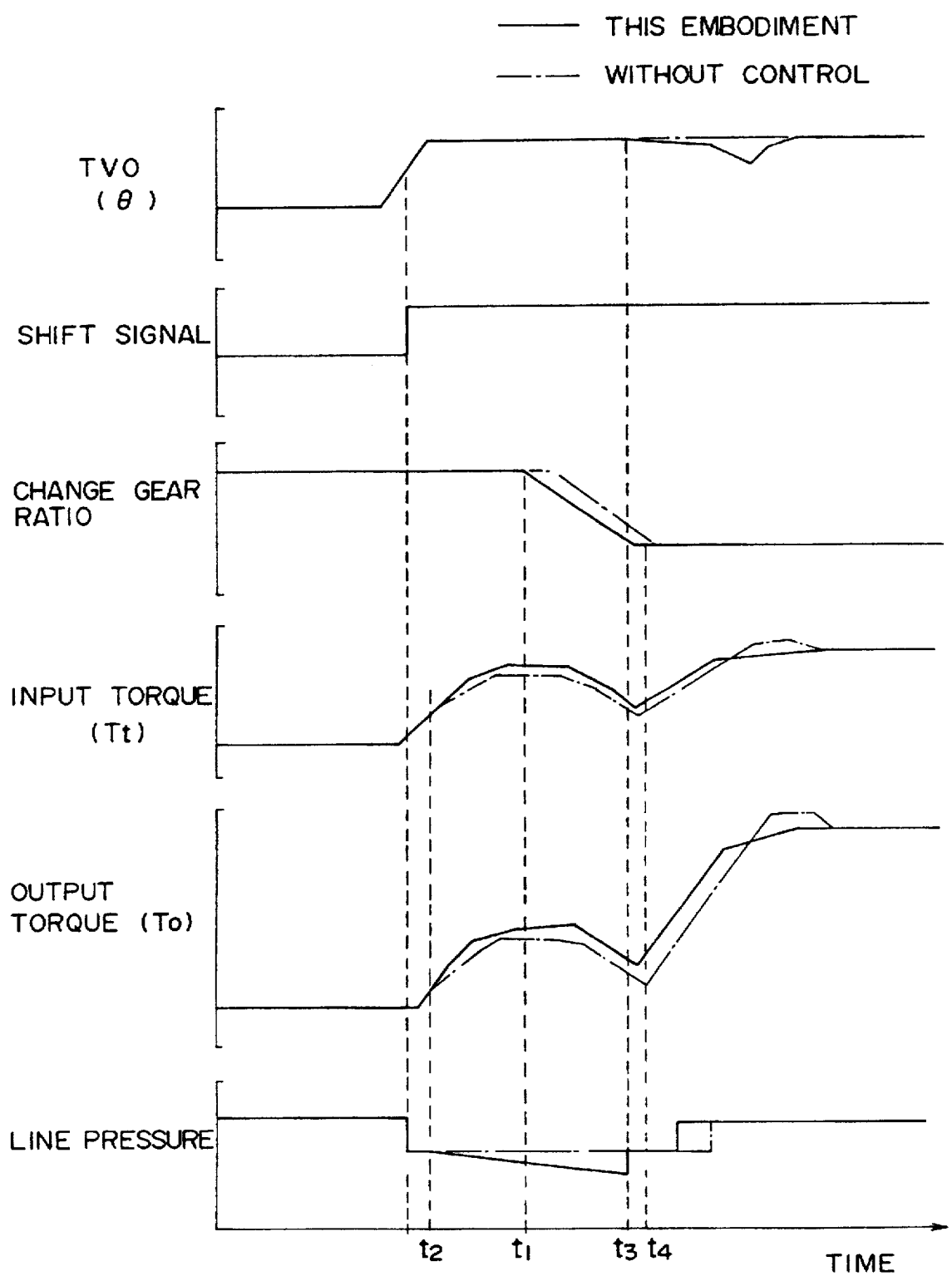
FIG. 39 is a time chart of a downshift operation in the eighth embodiment of the present invention.

As stated before with reference to FIG. 10, the downshift operation is performed in the course in which the accelerator pedal 66 is depressed in to abruptly enlarge the throttle valve opening θ. As shown in FIG. 39, therefore, the shift signal sol changes after the lapse of a certain time period from the throttle valve opening θ begins to enlarge. The input torque (turbine torque) $T_t$ increases with the enlargement of the throttle valve opening θ, and it exhibits first peak value in the vicinity of an actual shift start time $t_1$. Thereafter, it decreases till an actual shift end time $t_4$. After the actual shift end time $t_4$, the input torque $T_t$ increases and overshoots until it becomes stable. In addition, the output torque $T_o$ changes similarly to the input torque $T_t$. The output torque $T_o$, however, changes more abruptly than the input torque $T_t$ due to the torque amplifying action of the stepped automatic transmission mechanism 30. In this embodiment, therefore, a shift shock to develop in a time period from a shift start recognition time $t_2$ to a shift end recognition time $t_3$ is coped with by the line pressure correction control, and the overshoot of the output torque $T_o$ to develop after the shift end recognition time $t_3$ is coped with by the throttle valve opening correction control.

In the upshift operation, in the same manner as in the first embodiment, the line pressure correction magnitude ΔPL is calculated in accordance with the deviation ΔT between the target axle torque $T_{tar}$ determined by the target axle torque calculation portion 140b and the actual axle torque $T_o$ calculated by the actual axle torque estimation portion 139, and the line pressure correction control is performed in accordance with the correctional magnitude ΔPL. On this occasion, however, this embodiment differs from the first embodiment in that the target axle torque $T_{tar}$ corresponding to the accelerator pedal opening α and vehicle speed V is evaluated by the use of the upshifting target axle torque map.

In the downshift operation, the target axle torque $T_{tar}$ is determined by the use of the downshifting target axle torque map. The target axle torque calculation portion 140b selects either of the upshifting target axle torque map or the downshifting target axle torque map to be used, in accordance with the shift signal sol applied thereto. The downshifting target axle torque map has target axle torque curves versus the time period elapsed from the shift start recognition time $t_2$, for the respective gear shift positions which are indicated by the shift signal sol. During the time period from the shift start recognition time $t_2$ to the shift end recognition time $t_3$, the line pressure correction magnitude ΔPL is calculated in accordance with the deviation ΔT between the target axle torque $T_{tar}$ determined with the downshifting target axle torque map and the actual axle torque $T_o$ calculated by the actual axle torque estimation portion 139, and the line pressure correction control is performed in accordance with the calculated correctional magnitude ΔPL. During a predetermined time period from the shift end recognition time $t_3$, the engine torque correction magnitude $\Delta T_e'$ is calculated by the engine torque calculation portion 150 in accordance with the same deviation ΔT between the target axle torque $T_{tar}$ determined with the downshifting target axle torque map and the actual axle torque $T_o$ calculated by the actual axle torque estimation portion 139, and the throttle valve opening correction control is performed in accordance with the calculated correctional magnitude $\Delta T_e'$. Thus, in the downshift operation, the throttle valve opening correction control is performed even after the shift end recognition time $t_3$, whereby a shift shock ascribable to the overshoot of the axle torque as stated before can be relieved as illustrated in FIG. 39.

Although, in this embodiment, only the line pressure correction control is performed during the time period from the shift start recognition time $t_2$ to the shift end recognition time $t_3$, the throttle valve opening correction control may well be performed conjointly. Besides, the throttle valve opening correction control since the shift end recognition time $t_3$ in the downshift operation may well be replaced with an ignition timing correction control in order to suppress the engine torque. In the case of controlling the axle torque in order to reduce the shift shock in this manner, the axle torque may well be controlled by combining different manipulated variables capable of changing the axle torque, for example, by combining the line pressure and the ignition timing, the line pressure and the fuel injection quantity, or the line pressure, the ignition timing and the throttle valve opening.

The input torque and output torque of a stepped automatic transmission mechanism, the rate of change of engine r.p.m., the rate of change of torque-converter output shaft r.p.m., the rate of change of the r.p.m. of the output shaft of the stepped automatic transmission mechanism, and the acceleration of a vehicle change greatly when the stepped automatic transmission mechanism actually starts a mechanical gear shift. Therefore, the physical quantities can be utilized for precisely recognizing the time of the shift start. Accordingly, the present invention in which the shift start is recognized on the basis of, e. g., the input torque of the transmission mechanism can perform an oil pressure correction control, an engine output correction control, or the like during the gear shift of the transmission mechanism at an appropriate timing and can sufficiently relieve the shock of the vehicle attributed to the gear shift.

Moreover, the oil pressure of a hydraulic circuit for driving and controlling the transmission mechanism changes earlier than the point of time at which the transmission mechanism actually starts the mechanical gear shift. Therefore, even in the aspect of the present invention in which the shift start is recognized on the basis of the oil pressure of the hydraulic circuit, the recognition of the shift start time does not delay considerably. Accordingly, the present invention can perform an oil pressure correction control, an engine output correction control, or the like during the gear shift at an appropriate timing and can sufficiently relieve the shift shock.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. An axle torque estimating system in a vehicle including an engine with an output shaft, a torque converter connected to said output shaft of the engine and having an output shaft, an automatic transmission mechanism connected to said output shaft of the torque converter and having an output shaft, and a driving axle connected to said output shaft of the automatic transmission mechanism, for estimating axle torque of the driving axle, comprising:

shift signal output means for outputting a shift signal which indicates a shift change ratio of said automatic transmission mechanism;

input torque detecting means for detecting an input torque of said automatic transmission mechanism;

shift start recognition means for recognizing an actual mechanical shift start timing of said automatic transmission mechanism;

undergoing shift change ratio setting means for setting an undergoing shift change ratio from said actual mechanical shift start timing of said automatic transmission mechanism in accordance with a change of said shift signal; and axle torque calculating means for calculating said axle torque under shifting, when said actual mechanical shift start timing is recognized by said shift start recognition means, by multiplying said undergoing shift change ratio, set by said undergoing shift change ratio setting means, by said input torque, detected by said input torque detecting means.

2. An axle torque estimating system according to claim 1, wherein said undergoing shift change ratio setting means sets said undergoing shift change ratio which changes linearly, or by steps, from a shift change ratio indicated by said shift signal before said change to a shift change ratio indicated by the shift signal after said change.

3. An axle torque estimating system according to claim 1, wherein said input torque detecting means comprises:

engine r.p.m. detecting means for detecting an r.p.m. of said output shaft of said engine; and input torque calculating means for calculating said input torque in accordance with said r.p.m. detected by said engine r.p.m. detecting means by utilizing torque converter characteristics of said torque converter.

4. An axle torque controlling system for a vehicle including an engine with an output shaft, a torque converter connected to said output shaft of the engine and having an output shaft, an automatic transmission mechanism connected to said output shaft of the torque converter and having an output shaft, and a driving axle connected to said output shaft of the automatic transmission mechanism and axle torque manipulation means for changing an axle torque of the driving axle, for controlling the axle torque by outputting a manipulated variable to the axle torque manipulation means, comprising:

an axle torque estimating system having shift signal output means for outputting a shaft signal which indicates a shift change ratio of said automatic transmission mechanism;

input torque detecting means for detecting an input torque of said automatic transmission mechanism;

shift start recognition means for recognizing an actual mechanical shift start timing of said automatic transmission mechanism;

undergoing shift change ratio setting means for setting an undergoing shift change ratio from said actual mechanical shift start timing of said automatic transmission mechanism in accordance with a change of said shift signal; and axle torque calculating means for calculating said axle torque under shifting, when said actual mechanical shift start timing is recognized by said shift start recognition means, by multiplying said shift change ratio, set by said undergoing shift change ratio setting means, by said input torque detected by said input torque detecting means;

target axle torque setting means for setting a target torque of said driving axle in accordance with a condition of said vehicle; and manipulated variable calculation means for calculating a deviation between said axle torque calculated by said axle torque estimating system and said target axle torque set by said target axle torque setting means so as to calculate said manipulated variable which allows the deviation to be smaller in order to output the manipulated variable to said axle torque manipulation means.

5. An axle torque controlling system according to claim 4, wherein said undergoing shift change ratio setting means sets said undergoing shift change ratio which changes linearly, or by steps, from a shift change ratio indicated by said shift signal before said change to a shift change ratio indicated by the shift signal after said change.

6. An axle torque controlling system according to claim 4, wherein said input torque detecting means comprises:

engine r.p.m. detecting means for detecting an r.p.m. of said output shaft of said engine; and input torque calculating means for calculating said input torque in accordance with said r.p.m. detected by said engine r.p.m. detecting means by utilizing torque converter characteristics of said torque converter.

7. An axle torque controlling system according to claim 4, wherein said target axle torque setting means determines said target axle torque under shifting in accordance with said axle torque for a period from when said shift signal output by said shift signal output means changes, until said shift start recognition means recognizes said actual mechanical shift start timing.

8. An axle torque controlling system according to claim 5, wherein said target axle torque setting means determines said target axle torque under shifting in accordance with said axle torque for a period from when said shift signal output by said shift signal output means changes, until said shift start recognition means recognizes said actual mechanical shift start timing.

9. An axle torque controlling system according to claim 5, wherein said target axle torque setting means determines said target axle torque under shifting in accordance with said axle torque for a period from when said shift signal output by said shift signal output means changes, until said shift start recognition means recognizes said actual mechanical shift start timing.

10. An axle torque controlling system according to claim 4, wherein said axle torque manipulation means comprises at least one member selected from a group consisting of line pressure control means for controlling an oil pressure of a hydraulic circuit in a case of said vehicle having the hydraulic circuit for actuating said automatic transmission mechanism, a throttle valve for regulating a flow rate of air flowing into said engine, a fuel injection valve for feeding said engine with fuel and ignition means for igniting said engine at appropriate timings.

11. An axle torque controlling system according to claim 5, wherein said axle torque manipulation means comprises at least one member selected from a group consisting of line pressure control means for controlling an oil pressure of a hydraulic circuit in a case of said vehicle having the hydraulic circuit for actuating said automatic transmission mechanism, a throttle valve for regulating a flow rate of air flowing into said engine, a fuel injection valve for feeding said engine with fuel and ignition means for igniting said engine at appropriate timings.

12. An axle torque controlling system according to claim 6, wherein said axle torque manipulation means comprises at least one member selected from a group consisting of line pressure control means for controlling an oil pressure of a hydraulic circuit in a case of said vehicle having the hydraulic circuit for actuating said automatic transmission mechanism, a throttle valve for regulating a flow rate of air flowing into said engine, a fuel injection valve for feeding said engine with fuel and ignition means for igniting said engine at appropriate timings.

13. An axle torque controlling system according to claim 7, wherein said axle torque manipulation means comprises at least one member selected from a group consisting of line pressure control means for controlling an oil pressure of a hydraulic circuit in a case said vehicle having the hydraulic circuit for actuating said automatic transmission mechanism, a throttle valve for regulating a flow rate of air flowing into said engine, a fuel injection valve for feeding said engine with fuel and ignition means for igniting said engine at appropriate timings.

14. An axle torque controlling system according to claim 8, wherein said axle torque manipulation means comprises at least one member selected from a group consisting of line pressure control means for controlling an oil pressure of a hydraulic circuit in a case of said vehicle having the hydraulic circuit in a case of said vehicle having for actuating said automatic transmission mechanism, a throttle valve for regulating a flow rate of air flowing into said engine, a fuel injection valve for feeding said engine with fuel and ignition means for igniting said engine at appropriate timings.

15. An axle torque controlling system according to claim 9, wherein said axle torque manipulation means comprises at least one member selected from a group consisting of line pressure control means for controlling an oil pressure of a hydraulic circuit in a case of said vehicle having the hydraulic circuit in a case of said vehicle having for actuating said automatic transmission mechanism, a throttle valve for regulating a flow rate of air flowing into said engine, a fuel injection valve for feeding said engine with fuel and ignition means for igniting said engine at appropriate timings.

16. Apparatus for estimating an axle torque of a driving axle in a vehicle having an engine with an output shaft, a torque converter connected to the output shaft of the engine and having an output shaft, an automatic transmission mechanism connected to the output shaft of the torque converter and having an output shaft, and a driving axle connected to the output shaft of the automatic transmission mechanism, said apparatus comprising:

input torque detecting means for detecting an input torque of said automatic transmission mechanism; and a computer readable storage medium containing a program, said program including a shift signal output routine for outputting a shift signal which indicates a shift change ratio of said automatic transmission mechanism;

a shift start recognition routine for recognizing an actual mechanical shift start timing of said automatic transmission mechanism;

an undergoing shift change ratio setting routine for setting an undergoing shift change ratio from said actual mechanical shift start timing of said automatic transmission mechanism in accordance with a change of said shift signal; and an axle torque calculating routine for calculating said axle torque under shifting, when said actual mechanical shift start timing is recognized by said shift start recognition routine, by multiplying said undergoing shift change ratio, by said input torque detected by said input torque detecting means.

17. Apparatus according to claim 16, wherein said undergoing shift change ratio setting routine sets said undergoing shift change ratio which changes linearly, or by steps, from a shift change ratio indicated by said shift signal before said change to a shift change ratio indicated by the shift signal after said change.

18. Apparatus according to claim 16, wherein said input torque detecting means comprises:

engine r.p.m. detecting means for detecting an r.p.m. of said output shaft of said engine; and input torque calculating means for calculating said input torque in accordance with said r.p.m. detected by said engine r.p.m. detecting means by utilizing torque converter characteristics of said torque converter.

19. Apparatus for estimating an axle torque of a driving axle in a vehicle having an engine with an output shaft, a torque converter connected to the output shaft of the engine and having an output shaft, an automatic transmission mechanism connected to the output shaft of the torque converter and having an output shaft, and a driving axle connected to the output shaft of the automatic transmission mechanism, said apparatus comprising:

input torque detecting means for detecting an input torque of said automatic transmission mechanism; and a computer system having a computer readable medium containing a program, said program including a shift signal output routine for outputting a shift signal which indicates a shift change ratio of said automatic transmission mechanism;

a shift start recognition routine for recognizing an actual mechanical shift start timing of said automatic transmission mechanism;

an undergoing shift change ratio for setting routine for setting an undergoing shift change ratio from said actual mechanical shift start timing of said automatic transmission mechanism in accordance with a change of said shift signal; and an axle torque calculating means for calculating said axle torque under shifting, when said actual mechanical shift start timing is recognized by said shift start recognition routine, by multiplying said undergoing shift change ratio, by said input torque detected by said input torque detecting means.

20. Apparatus according to claim 19, wherein said undergoing shift change ratio setting routine sets said undergoing shift change ratio which changes linearly, or by steps, from a shift change ratio indicated by said shift signal before said change to a shift change ratio indicated by the shift signal after said change.

21. Apparatus according to claim 19, wherein said input torque detecting means comprises:

engine r.p.m. detecting means for detecting an r.p.m. of said output shaft of said engine; and input torque calculating means for calculating said input torque in accordance with said r.p.m. detected by said engine r.p.m. detecting means by utilizing torque converter characteristics of said torque converter.

22. An axle torque estimating system in a vehicle including an engine with an output shaft, a torque converter connected to said output shaft of the engine and having an output shaft, an automatic transmission mechanism connected to said output shaft of the torque converter and having an output shaft, and a driving axle connected to said output shaft of the automatic transmission mechanism, for estimating axle torque of the driving axle, comprising:

shift signal output means for outputting a shift signal which indicates a shift change ratio of said automatic transmission mechanism;

input torque detecting means for detecting an input torque of said automatic transmission mechanism;

a shift start recognition parameter detector for detecting a shift start recognition parameter based on one member selected from a group consisting of an input torque of said automatic transmission mechanism, a rate of change of speed of said output shaft of said engine, a rate of change of speed of said output shaft of said automatic transmission mechanism, a rate of change of speed of said output shaft of said torque converter, a change in acceleration of said vehicle;

shift start recognition means for recognizing an actual mechanical shift start timing of said automatic transmission mechanism in response to a predetermined change of said shift start recognition parameter when the shift signal delivered by said shift signal output means has changed;

undergoing shift change ratio setting means for setting an undergoing shift change ratio from said actual mechanical shift start timing of said automatic transmission mechanism in accordance with a change of said shift signal; and axle torque calculating means for calculating said axle torque under shifting, when said actual mechanical shift start timing is recognized by said shift start recognition means, by multiplying said undergoing shift change ratio, set by said undergoing shift change ratio setting means, by said input torque, detected by said input torque detecting means.

23. An axle torque controlling system for a vehicle including an engine with an output shaft, a torque converter connected to said output shaft of the engine and having an output shaft, an automatic transmission mechanism connected to said output shaft of the torque converter and having an output shaft, and a driving axle connected to said output shaft of the automatic transmission mechanism and axle torque manipulation means for changing an axle torque of the driving axle, for controlling the axle torque by outputting a manipulated variable to the axle torque manipulation means, comprising:

an axle torque estimating system having shift signal output means for outputting a shaft signal which indicates a shift change ratio of said automatic transmission mechanism;

input torque detecting means for detecting an input torque of said automatic transmission mechanism;

a shift start recognition parameter detector for detecting a shift start recognition parameter based on one member selected from a group consisting of an input torque of said automatic transmission mechanism, a rate of change of speed of said output shaft of said engine, a rate of change of speed of said output shaft of said automatic transmission mechanism, a rate of change of speed of said output shaft of said torque converter, a change in acceleration of said vehicle;

shift start recognition means for recognizing an actual mechanical shift start timing of said automatic transmission mechanism in response to a predetermined change of said shift start recognition parameter when the shift signal delivered by said shift signal output means has changed;

undergoing shift change ratio setting means for setting an undergoing shift change ratio from said actual mechanical shift start timing of said automatic transmission mechanism in accordance with a change of said shift signal; and axle torque calculating means for calculating said axle torque under shifting, when said actual mechanical shift start timing is recognized by said shift start recognition means, by multiplying said undergoing shift change ratio, set by said undergoing shift change ratio setting means, by said input torque, detected by said input torque detecting means;

target axle torque setting means for setting a target torque of said driving axle in accordance with a condition of said vehicle; and manipulated variable calculation means for calculating a deviation between said axle torque calculated by said axle torque estimating system and said target axle torque set by said target axle torque setting means so as to calculate said manipulated variable which allows the deviation to be smaller in order to output the manipulated variable to said axle torque manipulation means.

* * * * *

UNITED STATES PATENT AND TRADEMARK OFFICE
CERTIFICATE OF CORRECTION

PATENT NO. : 5,792,021
DATED : August 11, 1998
INVENTOR(S) : Minowa et al.

It is certified that error appears in the above-identified patent and that said Letters Patent is hereby corrected as shown below:

On the title page, item [75], change "Junich" to --Junichi--.

Signed and Sealed this

Nineteenth Day of January, 1999

Attest:

Attesting Officer

*Acting Commissioner of Patents and Trademarks*